United States Patent
Kim et al.

(10) Patent No.: US 12,192,766 B2
(45) Date of Patent: Jan. 7, 2025

(54) METHOD AND APPARATUS FOR ENHANCING SECURITY OF MAC LAYER ENTITY IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/581,461

(22) Filed: Jan. 21, 2022

(65) Prior Publication Data

US 2022/0240094 A1 Jul. 28, 2022

(30) Foreign Application Priority Data

Jan. 22, 2021 (KR) .................... 10-2021-0009285

(51) Int. Cl.
*H04W 12/108* (2021.01)
*H04W 12/71* (2021.01)
*H04W 80/02* (2009.01)

(52) U.S. Cl.
CPC ......... *H04W 12/108* (2021.01); *H04W 12/71* (2021.01); *H04W 80/02* (2013.01)

(58) Field of Classification Search
CPC ... H04W 12/108; H04W 12/71; H04W 80/02; H04W 12/03; H04W 12/106; H04W 12/10; H04W 12/30; H04W 12/37
See application file for complete search history.

(56) References Cited

U.S. PATENT DOCUMENTS

| | | | |
|---|---|---|---|
| 10,254,413 B2 | 4/2019 | Jin et al. | |
| 10,455,456 B2 | 10/2019 | Jang et al. | |
| 10,660,124 B2 | 5/2020 | Kim et al. | |
| 11,419,153 B2* | 8/2022 | Choe | H04W 72/23 |
| 2019/0254114 A1 | 8/2019 | Son | |
| 2020/0236537 A1 | 7/2020 | Lee et al. | |
| 2020/0337112 A1* | 10/2020 | Liu | H04W 28/06 |
| 2023/0105582 A1* | 4/2023 | Low | H04L 69/18 |
| | | | 370/328 |

(Continued)

FOREIGN PATENT DOCUMENTS

| | | |
|---|---|---|
| EP | 3445020 B1 | 10/2020 |
| KR | 10-2070877 B1 | 1/2020 |
| WO | 2020168128 A1 | 8/2020 |

OTHER PUBLICATIONS

International Search Report and Written Opinion of the International Searching Authority dated Apr. 29, 2022, in connection with International Application No. PCT/KR2022/001162, 8 pages.

(Continued)

*Primary Examiner* — Quazi Farooqui

(57) ABSTRACT

The disclosure relates to a 5G or 6G communication system for supporting a higher data transmission rate. It is possible to provide methods for enhancing security when a UE and a base station perform data communication in a next-generation mobile communication system according to an embodiment of the disclosure.

16 Claims, 34 Drawing Sheets

(56) References Cited

U.S. PATENT DOCUMENTS

2023/0188996 A1* 6/2023 Jo ..................... H04W 12/106
726/30

OTHER PUBLICATIONS

Supplementary European Search Report dated Jan. 31, 2024, in connection with European Application No. 22742887.7, 9 pages.
3GPP TS 33.501 V17.0.0 (Dec. 2020), Technical Specification, 3rd Generation Partnership Project; Technical Specification Group Services and System Aspects; Security architecture and procedures for 5G system (Release 17), Dec. 2020, 253 pages.

* cited by examiner

FIG. 1H
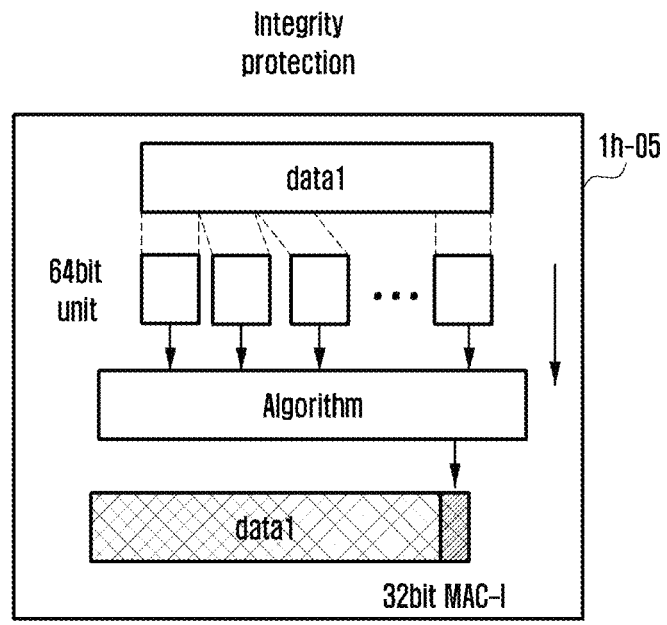
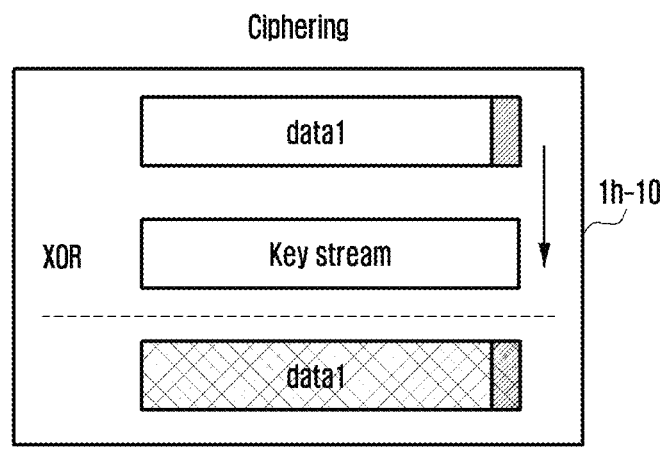
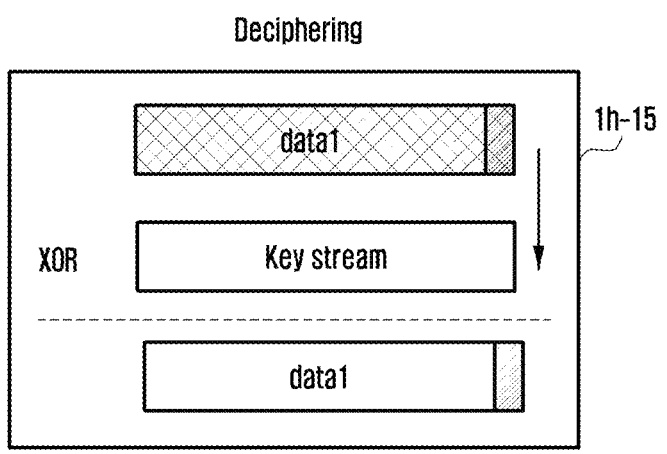

METHOD AND APPARATUS FOR ENHANCING SECURITY OF MAC LAYER ENTITY IN NEXT-GENERATION MOBILE COMMUNICATION SYSTEM

CROSS-REFERENCE TO RELATED APPLICATION

This application is based on and claims priority under 35 U.S.C. 119 to Korean Patent Application No. 10-2021-0009285, filed on Jan. 22, 2021, in the Korean Intellectual Property Office, the disclosure of which is herein incorporated by reference in its entirety.

BACKGROUND

1. Field

The disclosure relates to methods for enhancing security when a UE and a base station perform data communication in a next-generation mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

In a next-generation mobile communication system, a network or a base station may perform data communication with various devices or UEs such that various services are supported according to different requirements. Methods capable of enhancing security through base station implementation, UE implementation, or device implementation during the above-mentioned data communication may be considered, but such methods are not performed by a network (or base station) and a UE (or device) in a cooperative manner, and still have security vulnerability.

The technical subjects pursued in the disclosure may not be limited to the above mentioned technical subjects, and other technical subjects which are not mentioned may be clearly understood, through the following descriptions, by those skilled in the art to which the disclosure pertains.

In accordance with an aspect of the disclosure, a method performed by a transmitting apparatus in a wireless communication system is provided. The method comprises: generating at least one medium access control (MAC) sub protocol data unit (subPDU); generating a first field by applying an integrity protection procedure to the at least one MAC subPDU; generating a MAC PDU including the at least one MAC subPDU and the first field; and transmitting, to a receiving apparatus, the MAC PDU.

In one embodiment, the transmitting the MAC PDU comprising: ciphering the MAC PDU including the at least one MAC subPDU and the first field; and transmitting, to the receiving apparatus, the ciphered MAC PDU.

In one embodiment, the at least one MAC subPDU comprises at least one of a packet data convergence protocol (PDCP) control PDU, a radio link control (RLC) control PDU, a MAC control element (CE), a PDCP header, an RLC header, a MAC sub-header, a radio resource control (RRC) message, or system information.

In one embodiment, the MAC PDU further includes an indicator indicating that the at least one MAC subPDU is integrity protected.

In one embodiment, the first field is placed after the at least one MAC subPDU or before the at least one MAC subPDU.

The disclosure also provides a method performed by a receiving apparatus in a wireless communication system. The method comprises: receiving, from a transmitting apparatus, a MAC PDU including at least one MAC subPDU and a first field; identifying the first field; and verifying an integrity protection of the at least one MAC subPDU based on the first field.

In one embodiment, the method further comprises deciphering the MAC PDU in case that the MAC PDU including at least one MAC subPDU and the first field is ciphered.

In one embodiment, the at least one MAC subPDU comprises at least one of a PDCP control PDU, an RLC control PDU, a MAC CE, a PDCP header, an RLC header, a MAC sub-header, an RRC message, or system information.

In one embodiment, the MAC PDU further includes an indicator indicating that the at least one MAC subPDU is integrity protected.

In one embodiment, the first field is placed after the at least one MAC subPDU or before the at least one MAC subPDU.

The disclosure also provides a transmitting apparatus in a wireless communication system. The transmitting apparatus comprises: a transceiver; and a controller coupled with the transceiver and configured to: generate at least one MAC subPDU, generate a first field by applying an integrity protection procedure to the at least one MAC subPDU, generate a MAC PDU including the at least one MAC subPDU and the first field, and transmit, to a receiving apparatus, the MAC PDU.

The disclosure also provides a receiving apparatus in a wireless communication system. The receiving apparatus comprises: a transceiver; and a controller coupled with the transceiver and configured to: receive, from a transmitting apparatus, a MAC PDU including at least one MAC sub-PDU and a first field, identify the first field, and verifying an integrity protection of the at least one MAC subPDU based on the first field.

The disclosure proposes a method for enabling a protocol layer device (entity) to perform security enhancement such that a security threat that may occur in a next-generation mobile communication system, an error of the protocol layer device (entity) that may occur aggressively, data loss, performance degradation, or service quality degradation, thereby preventing the above-mentioned problems.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1GB illustrates a procedure that data received from an upper layer is processed by each protocol layer of a bearer and the data is transmitted, or the data received from a lower layer is processed by each protocol layer of a bearer and the data is delivered to the upper layer in the next-generation mobile communication system according to an embodiment of the disclosure;

FIG. 1GC illustrates a procedure that data received from an upper layer is processed by each protocol layer of a bearer and the data is transmitted, or the data received from a lower layer is processed by each protocol layer of a bearer and the data is delivered to the upper layer in the next-generation mobile communication system according to an embodiment of the disclosure;

FIG. 1H illustrates a diagram of an integrity protection or verification procedure, and a ciphering or deciphering procedure in a next-generation mobile communication system according to an embodiment of the disclosure;

FIG. 1KB illustrates a diagram of a data protection method 1-1 proposed for uplink data according to an embodiment of the disclosure;

FIG. 1KC illustrates a diagram of a data protection method 1-1 proposed for uplink data according to an embodiment of the disclosure;

FIG. 1LB illustrates a diagram of a data protection method 1-2 proposed for uplink data according to an embodiment of the disclosure;

FIG. 1LC illustrates a diagram of a data protection method 1-2 proposed for uplink data according to an embodiment of the disclosure;

FIG. 1MB illustrates a diagram of a data protection method 1-3 proposed for uplink data according to an embodiment of the disclosure;

FIG. 1MC illustrates a diagram of a data protection method 1-3 proposed for uplink data according to an embodiment of the disclosure;

FIG. 1OA illustrates a diagram of a data protection method 2-1 proposed for downlink data according to an embodiment of the disclosure;

FIG. 1OB illustrates a diagram of a data protection method 2-1 proposed for downlink data according to an embodiment of the disclosure;

FIG. 1OC illustrates a diagram of a data protection method 2-1 proposed for downlink data according to an embodiment of the disclosure;

FIG. 1PB illustrates a diagram of a data protection method 2-2 proposed for downlink data according to an embodiment of the disclosure;

FIG. 1PC illustrates a diagram of a data protection method 2-2 proposed for downlink data according to an embodiment of the disclosure;

FIG. 1RB illustrates a diagram of a data protection method 2-3 proposed for downlink data according to an embodiment of the disclosure;

FIG. 1RC illustrates a diagram of a data protection method 2-3 proposed for downlink data according to an embodiment of the disclosure;

DETAILED DESCRIPTION

Figure 1A:
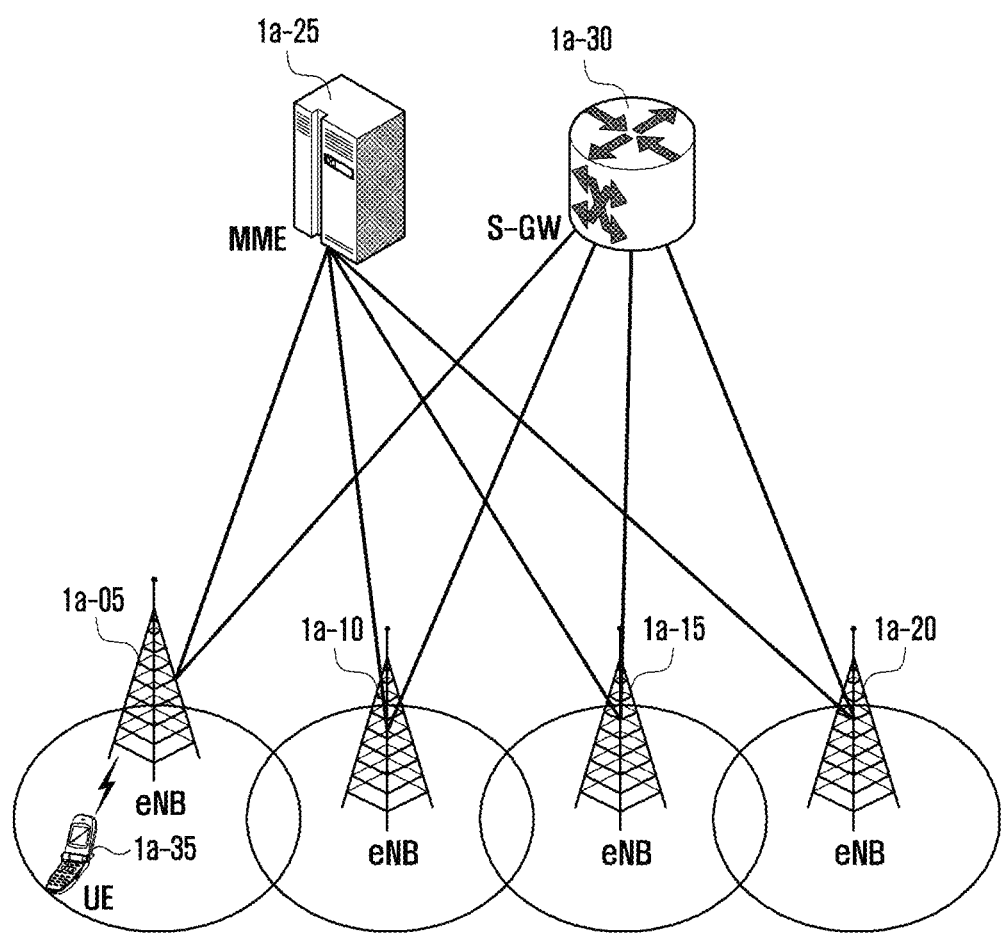
FIG. 1A illustrates a diagram of a structure of an LTE system according to an embodiment of the disclosure.
Figure 1B:
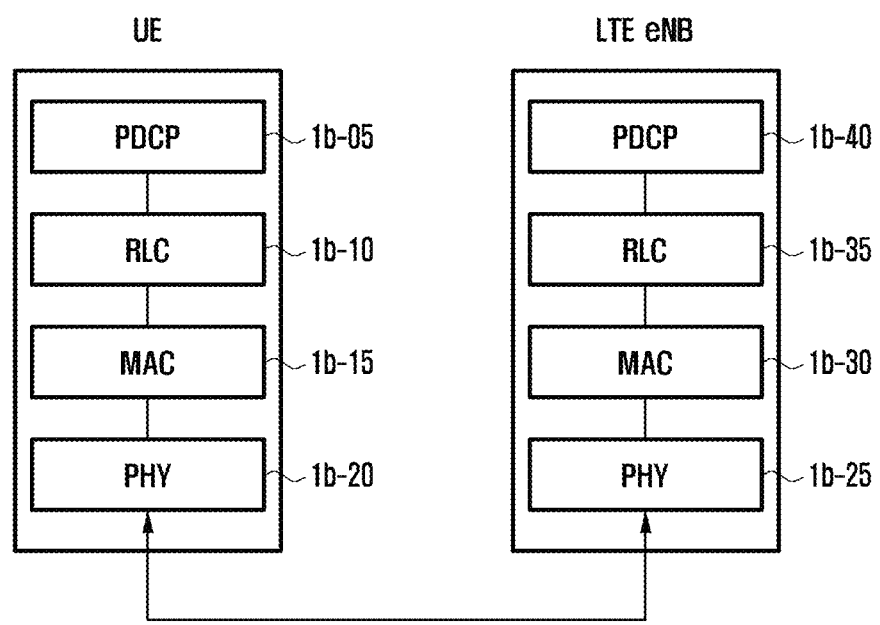
FIG. 1B illustrates a diagram of a radio protocol structure in an LTE system according to an embodiment of the disclosure.
Figure 1C:
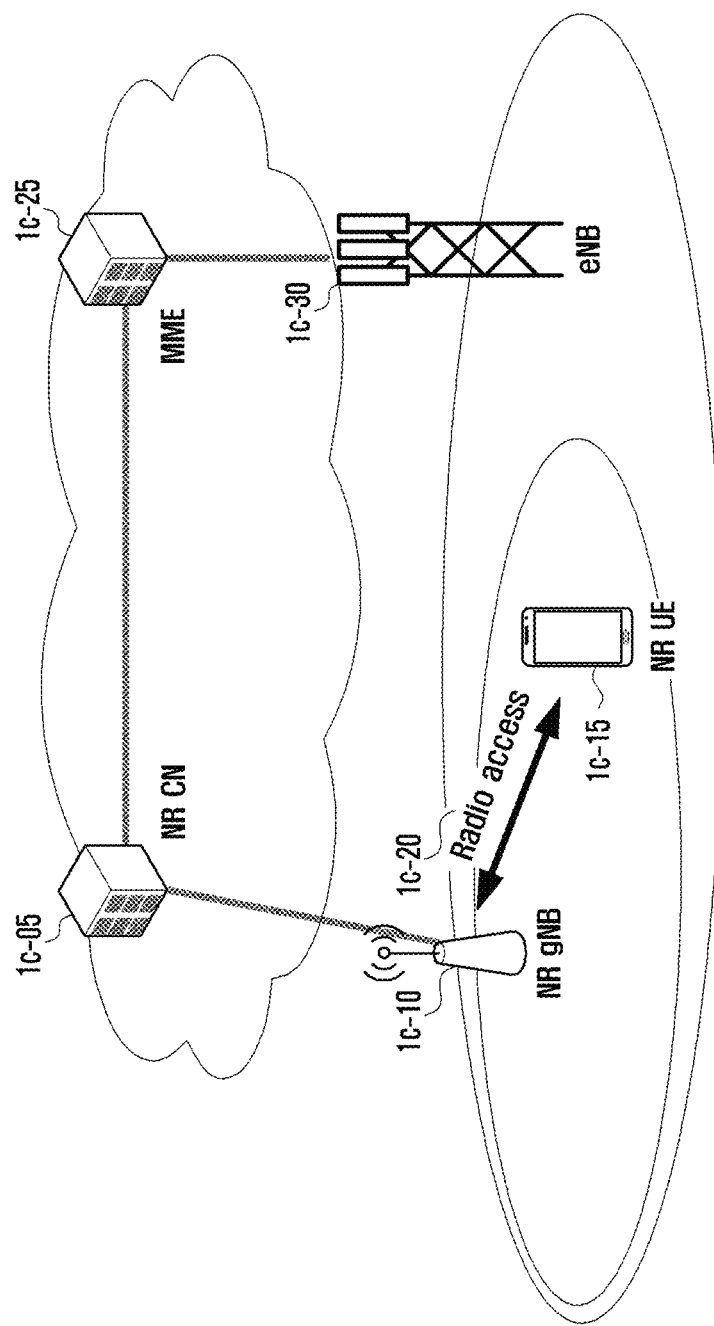
FIG. 1C illustrates a diagram of the structure of a next-generation mobile communication system according to an embodiment of the disclosure.
Figure 1D:
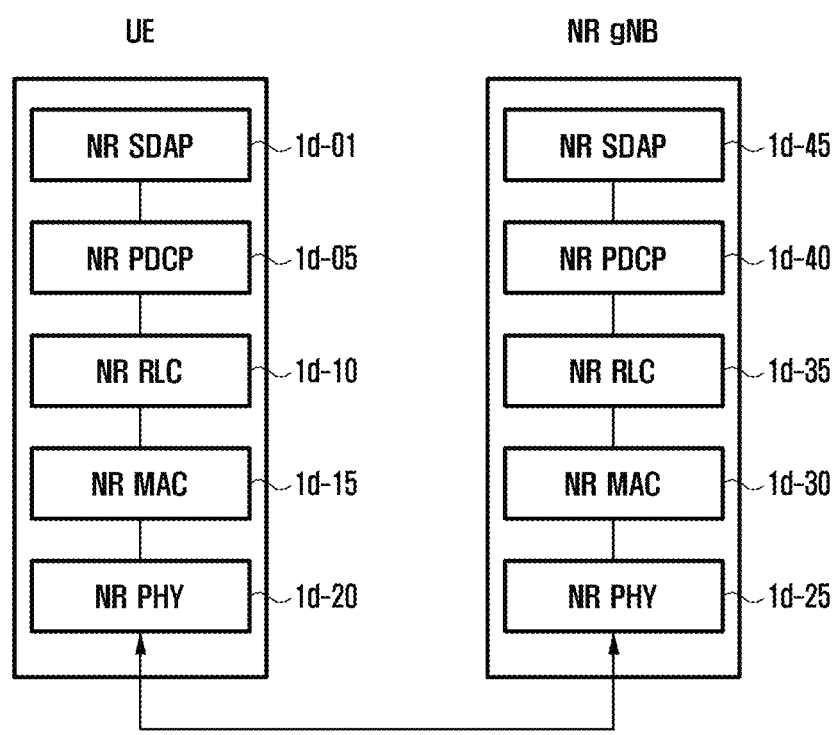
FIG. 1D illustrates a diagram of a radio protocol structure of a next-generation mobile communication system according to an embodiment of the disclosure.
Figure 1E:
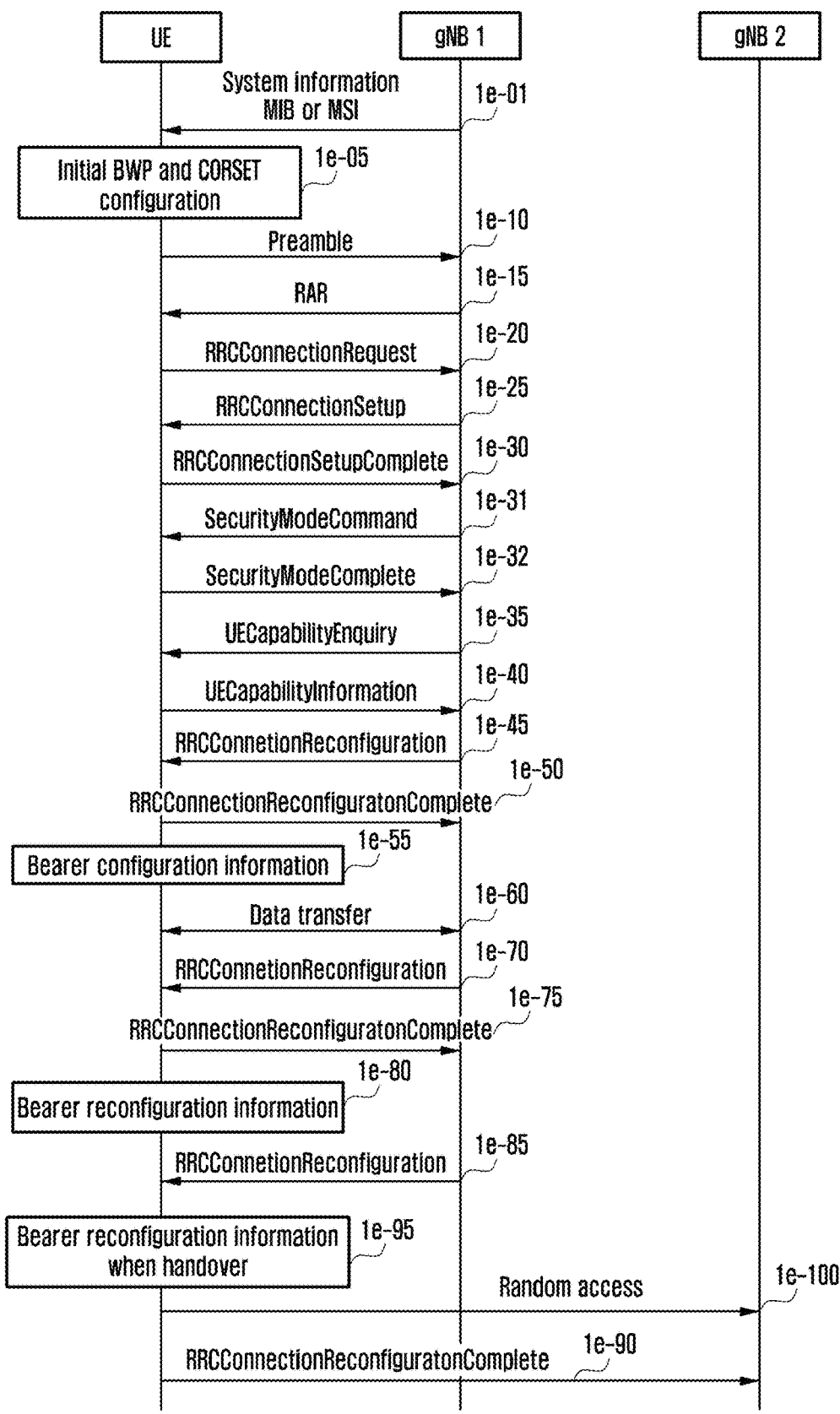
FIG. 1E illustrates a diagram of a procedure for a UE to switch from an RRC idle mode to an RRC connected mode in a next-generation mobile communication system according to an embodiment of the disclosure, and a diagram proposing a method for configuring a protocol layer (entity) or functions of the UE.
Figure 1F:
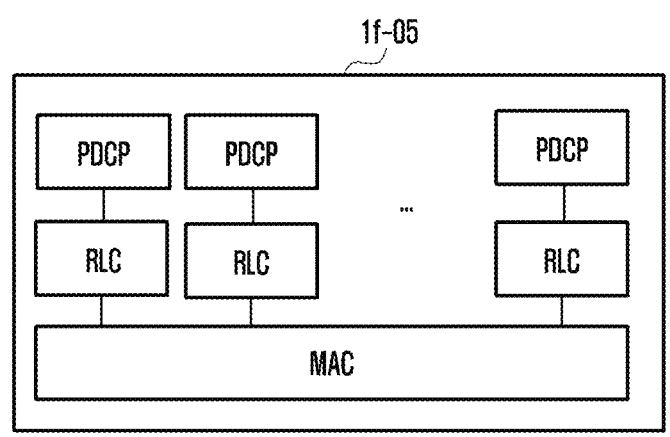
FIG. 1F illustrates a diagram of the structure of a protocol layer according to an embodiment of the disclosure.
Figure 1G:
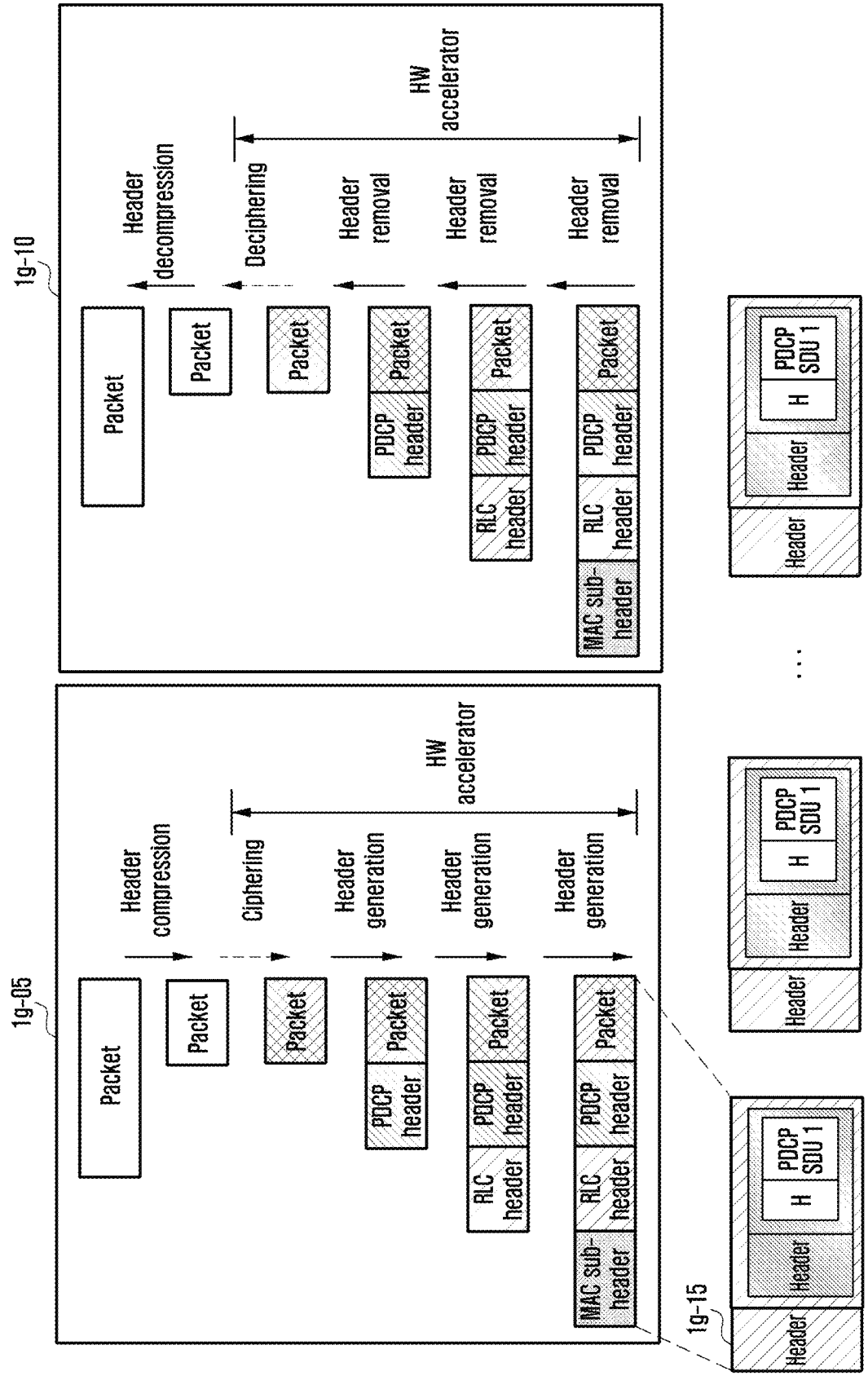
FIG. 1GA illustrates a procedure that data received from an upper layer (entity) is processed by each protocol layer (entity) of a bearer and the data is transmitted, or the data received from a lower layer (entity) is processed by each protocol layer of a bearer and the data is delivered to the upper layer in the next-generation mobile communication system according to an embodiment of the disclosure.
Figure 1G:
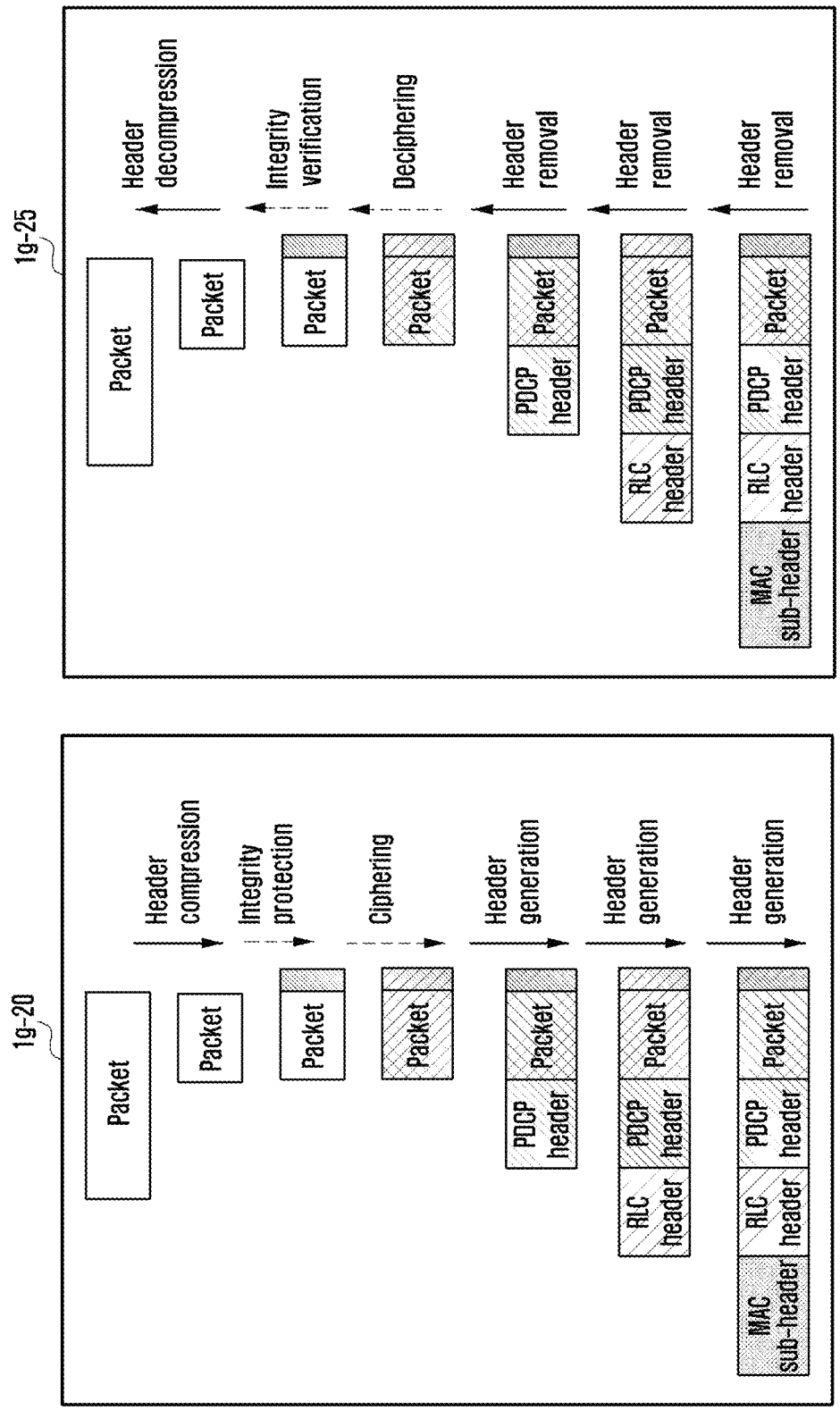
Figure 1G:
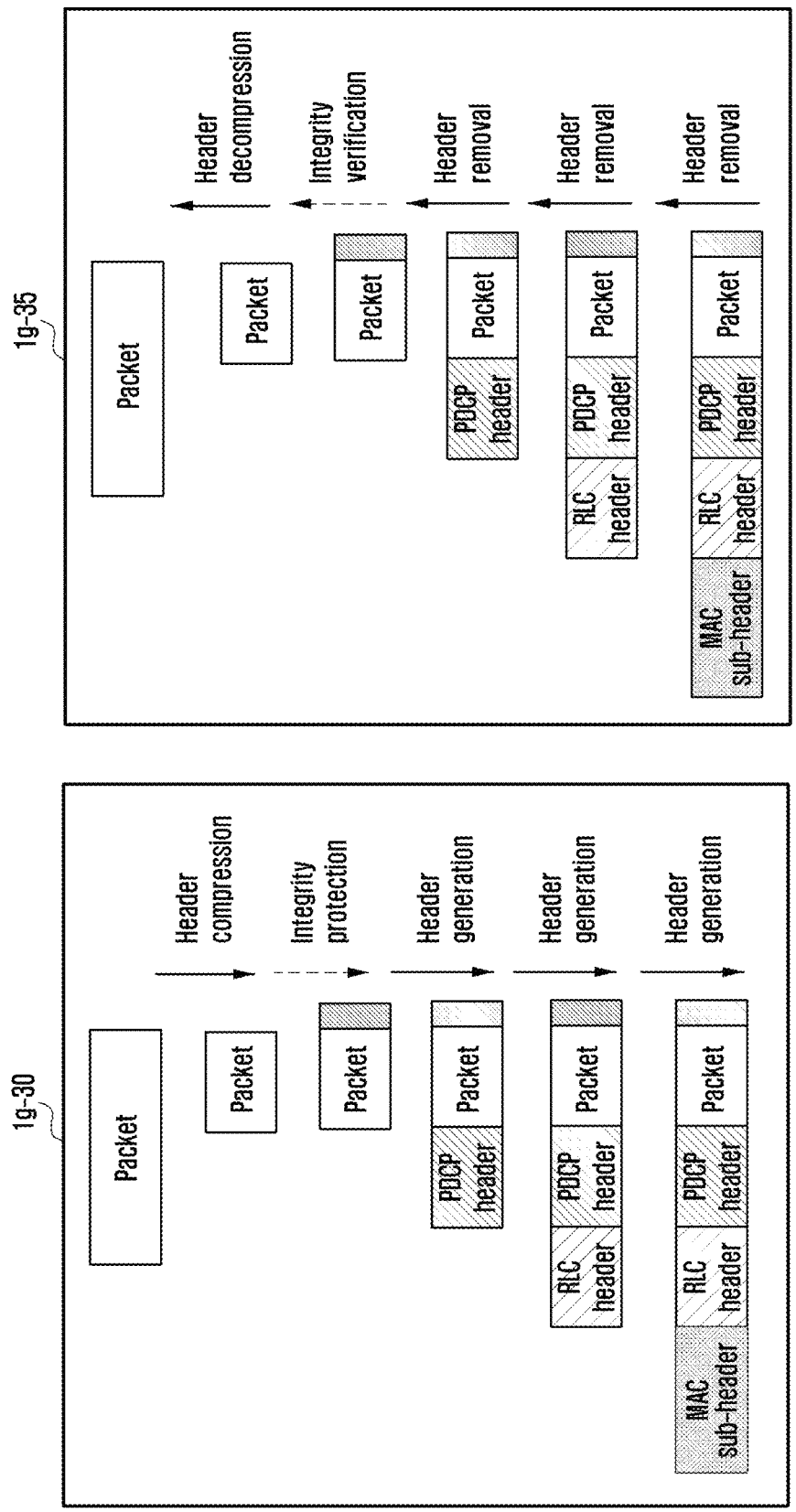
Figure 1I:
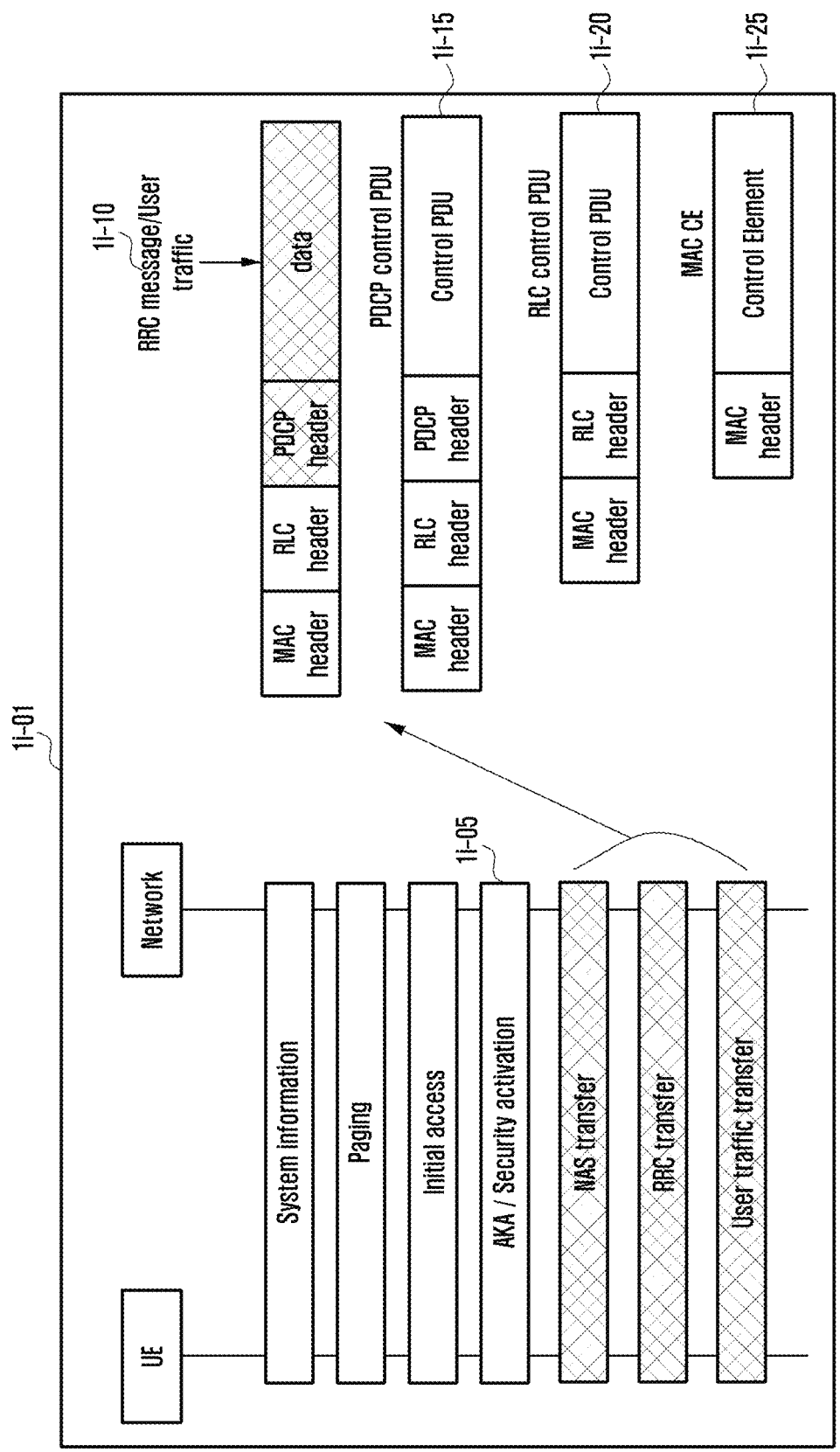
FIG. 1I illustrates a diagram of a security risk that may occur in a next-generation mobile communication system.
Figure 1J:
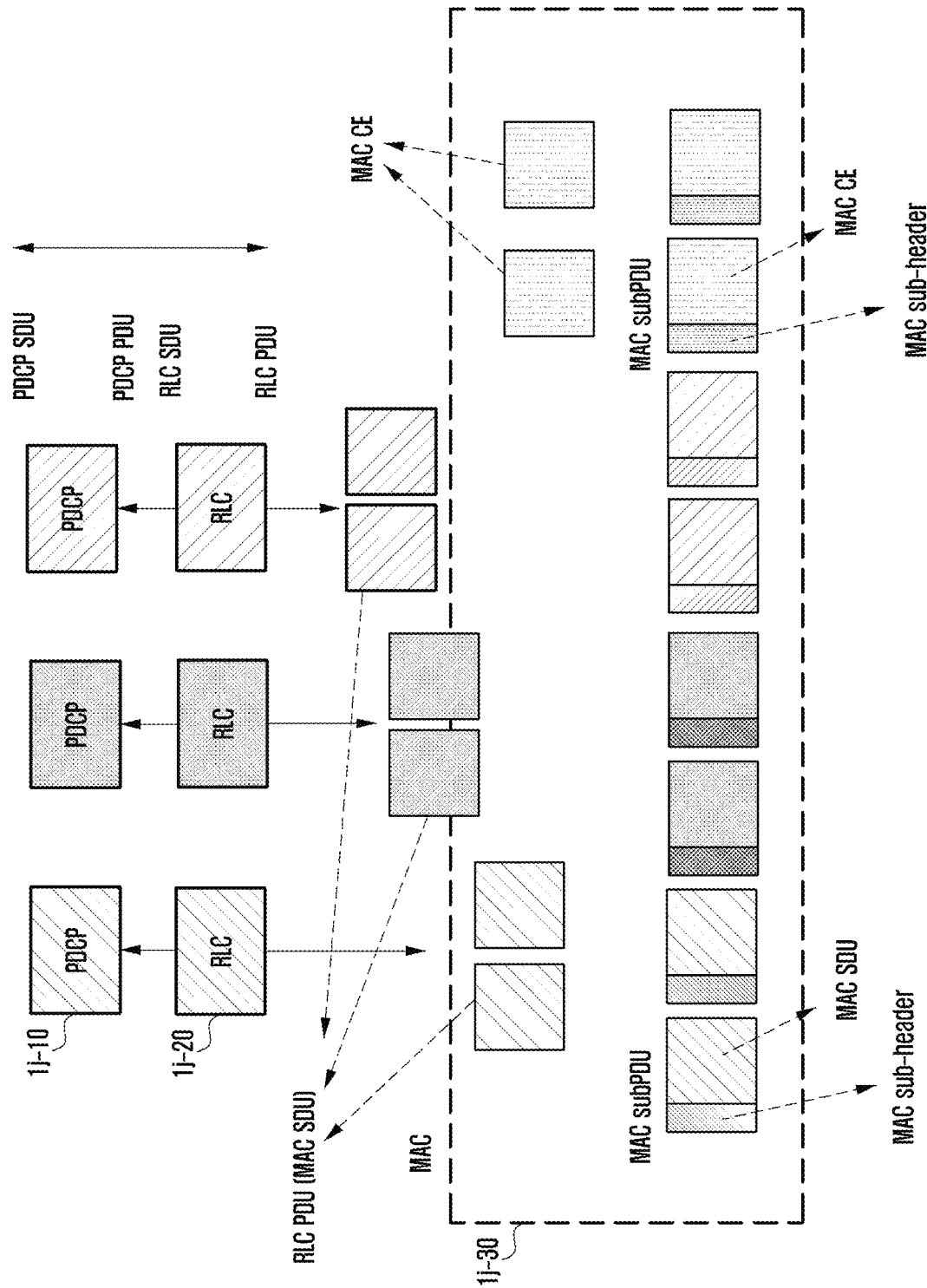
FIG. 1J illustrates a diagram of a procedure for processing data in protocol layer devices (entities) of a UE or a base station in a next-generation mobile communication system according to an embodiment of the disclosure.
Figure 1K:
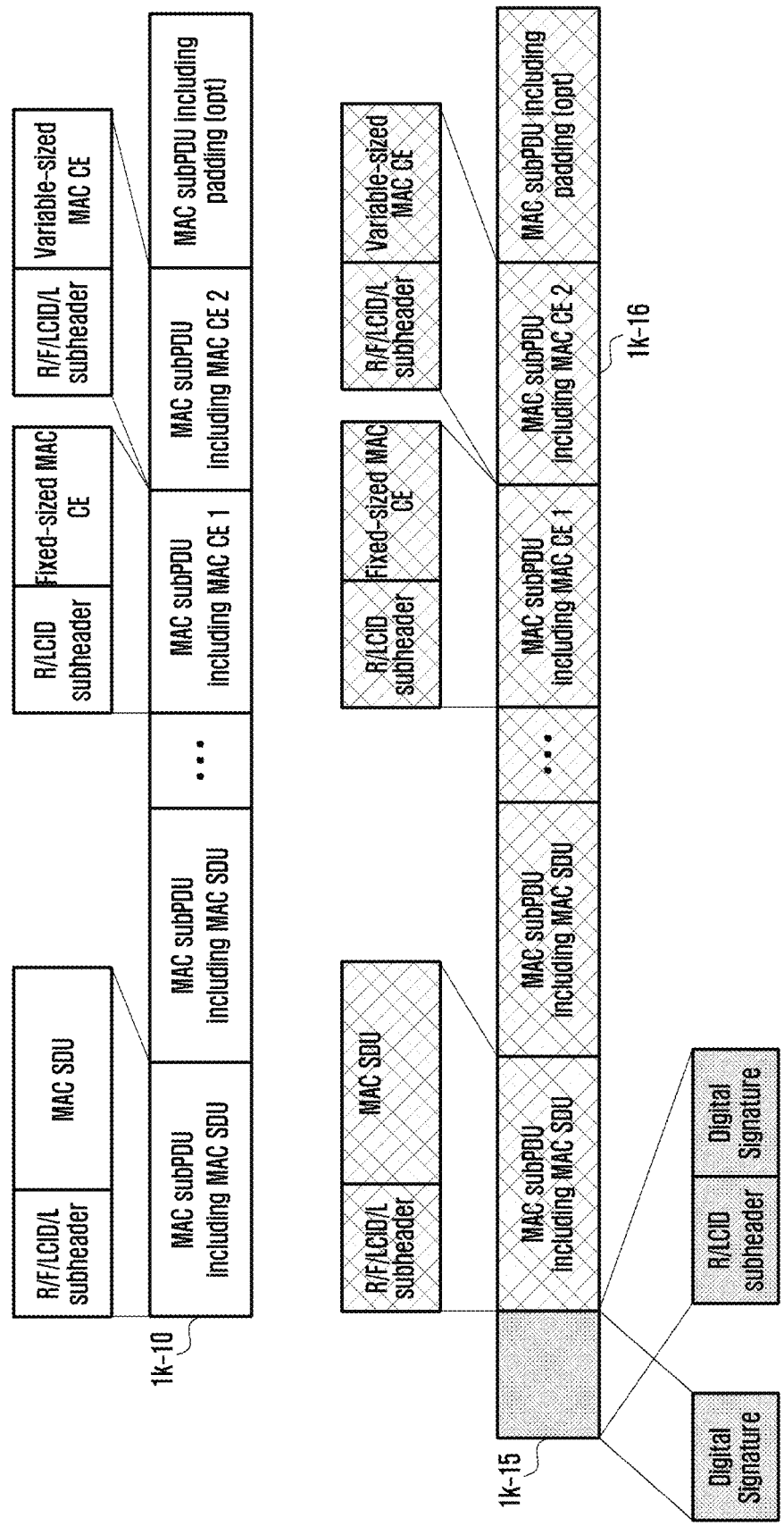
FIG. 1KA illustrates a diagram of a data protection method 1-1 proposed for uplink data according to an embodiment of the disclosure.
Figure 1K:
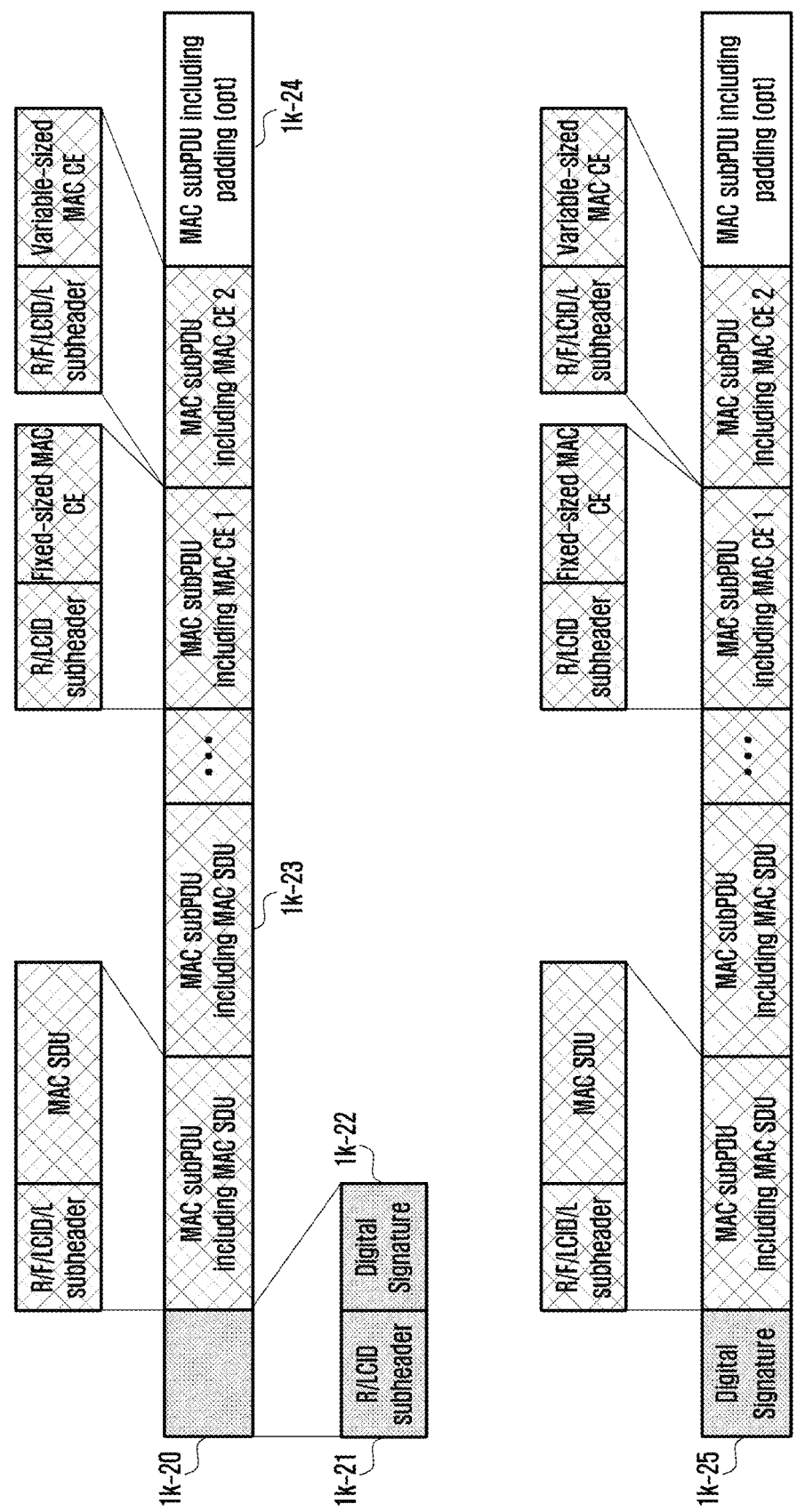
Figure 1K:
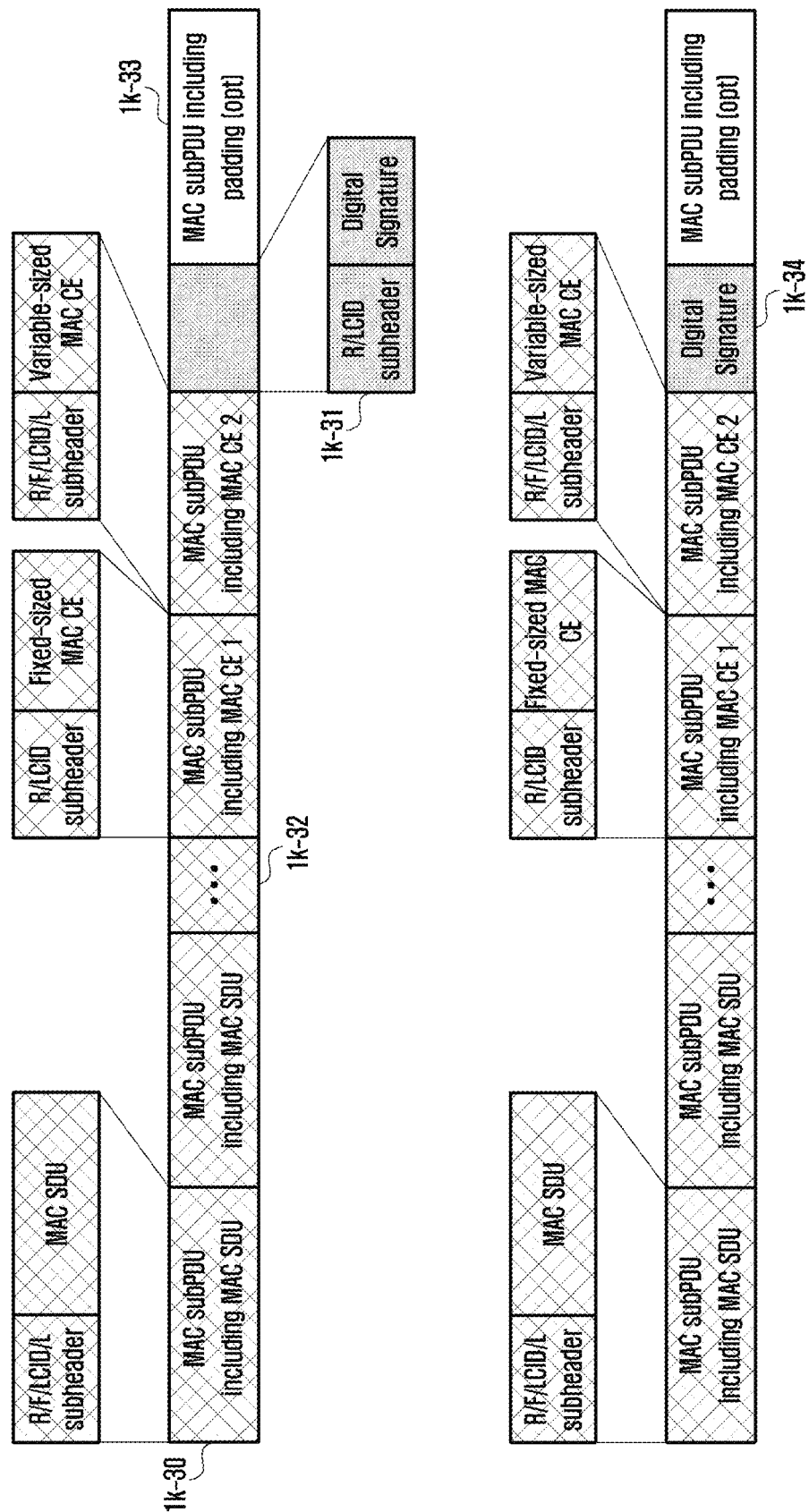
Figure 1L:
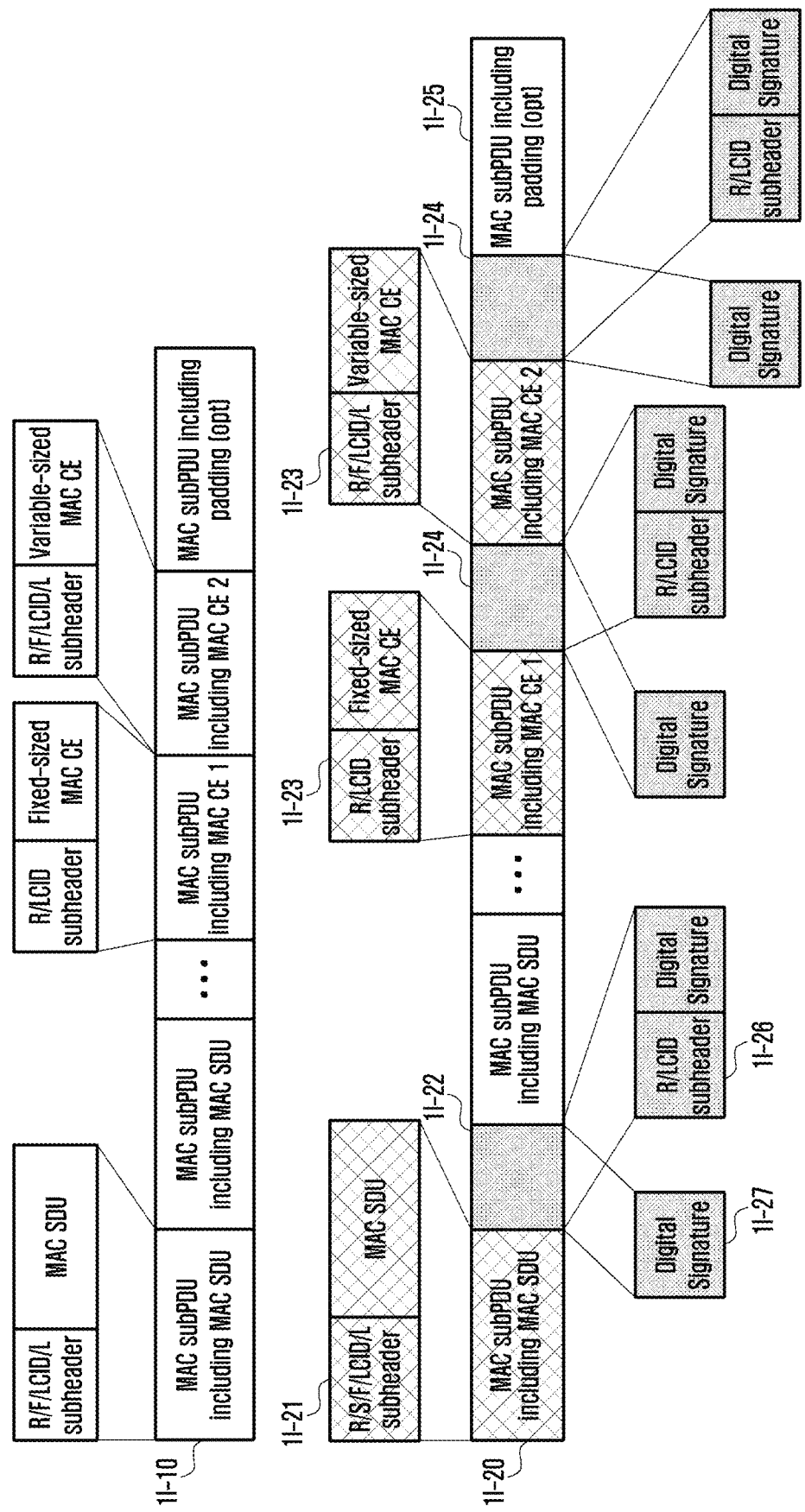
FIG. 1LA illustrates a diagram of a data protection method 1-2 proposed for uplink data according to an embodiment of the disclosure.
Figure 1L:
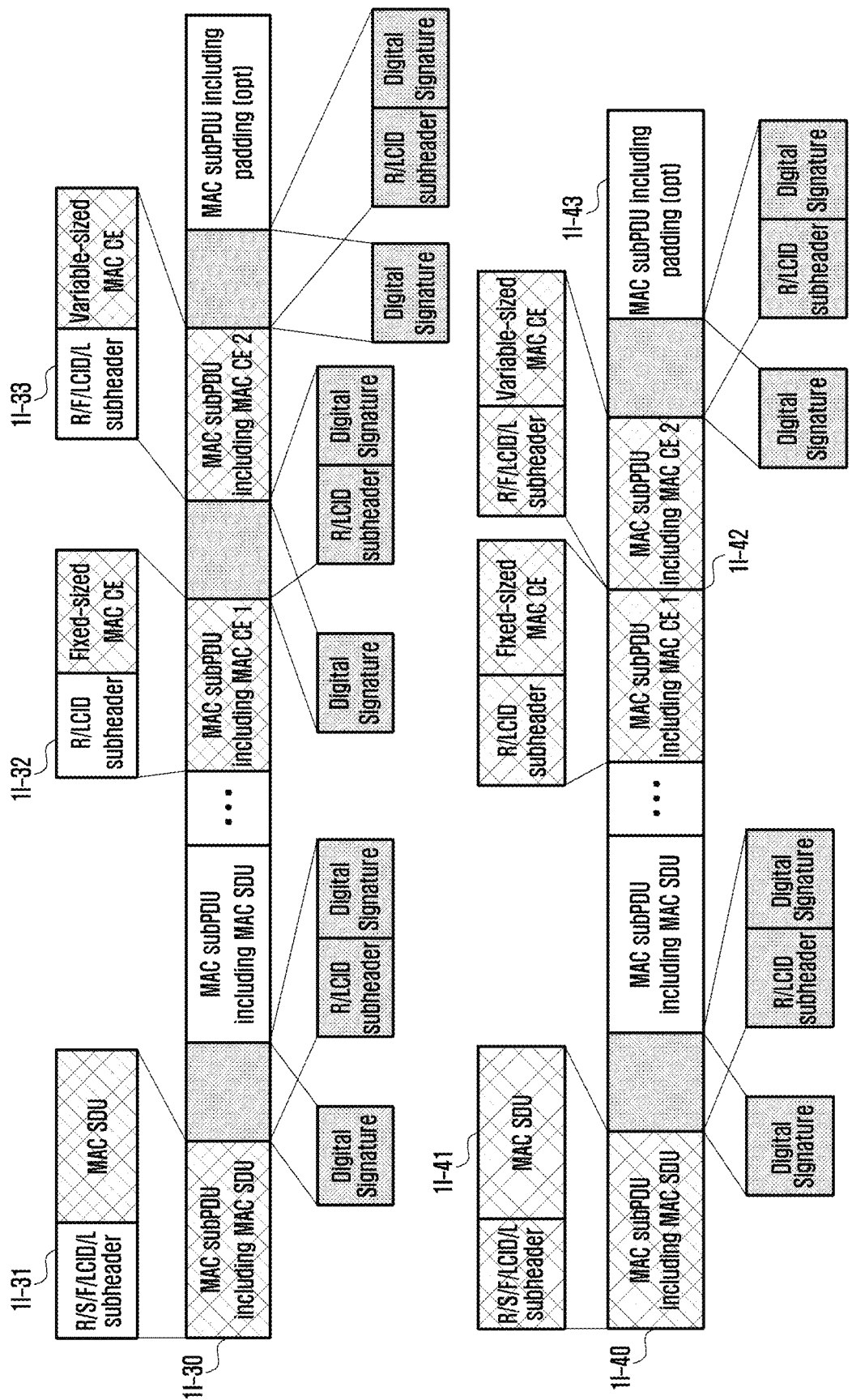
Figure 1L:
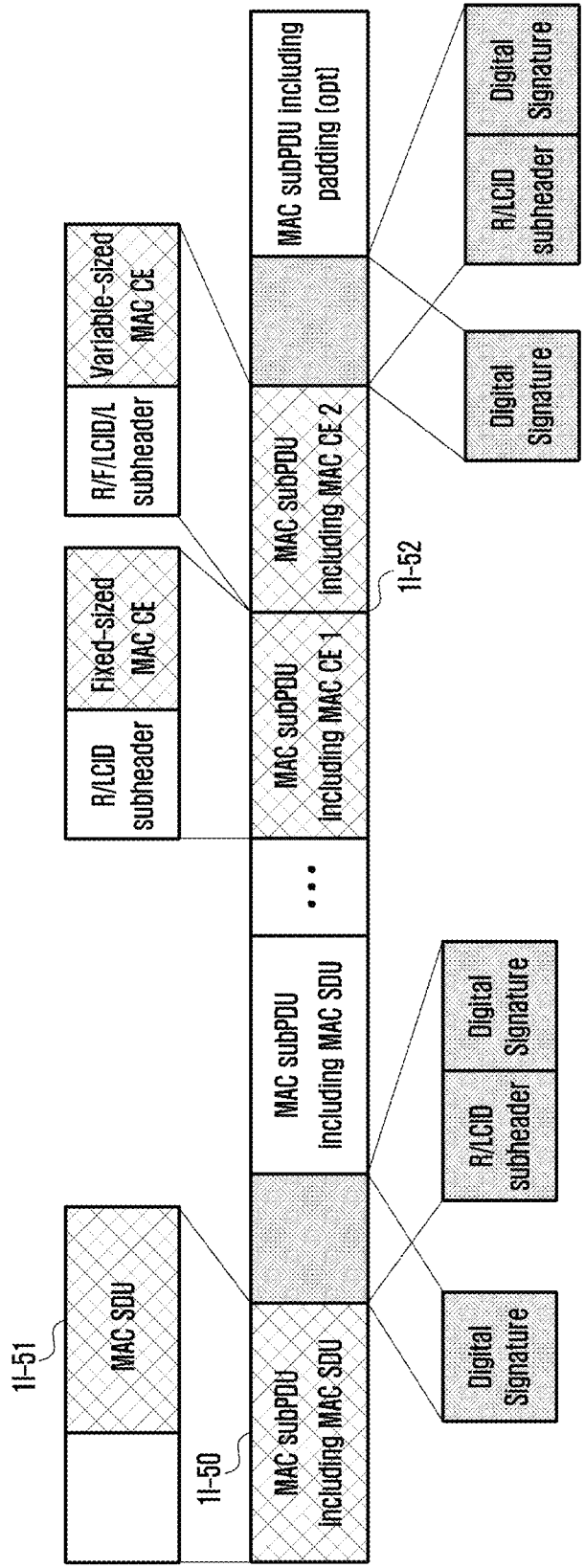
Figure 1M:
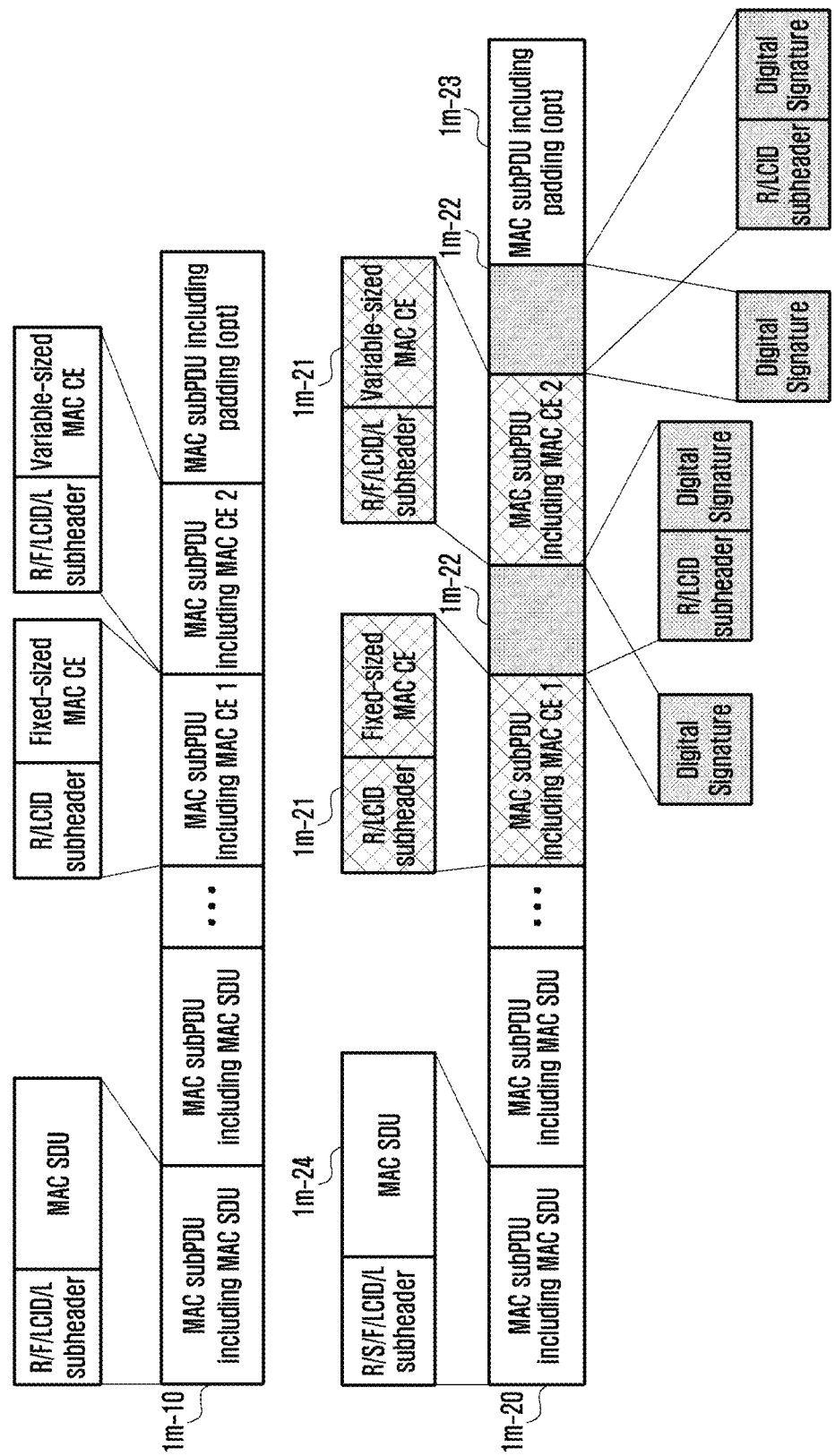
FIG. 1MA illustrates a diagram of a data protection method 1-3 proposed for uplink data according to an embodiment of the disclosure.
Figure 1M:
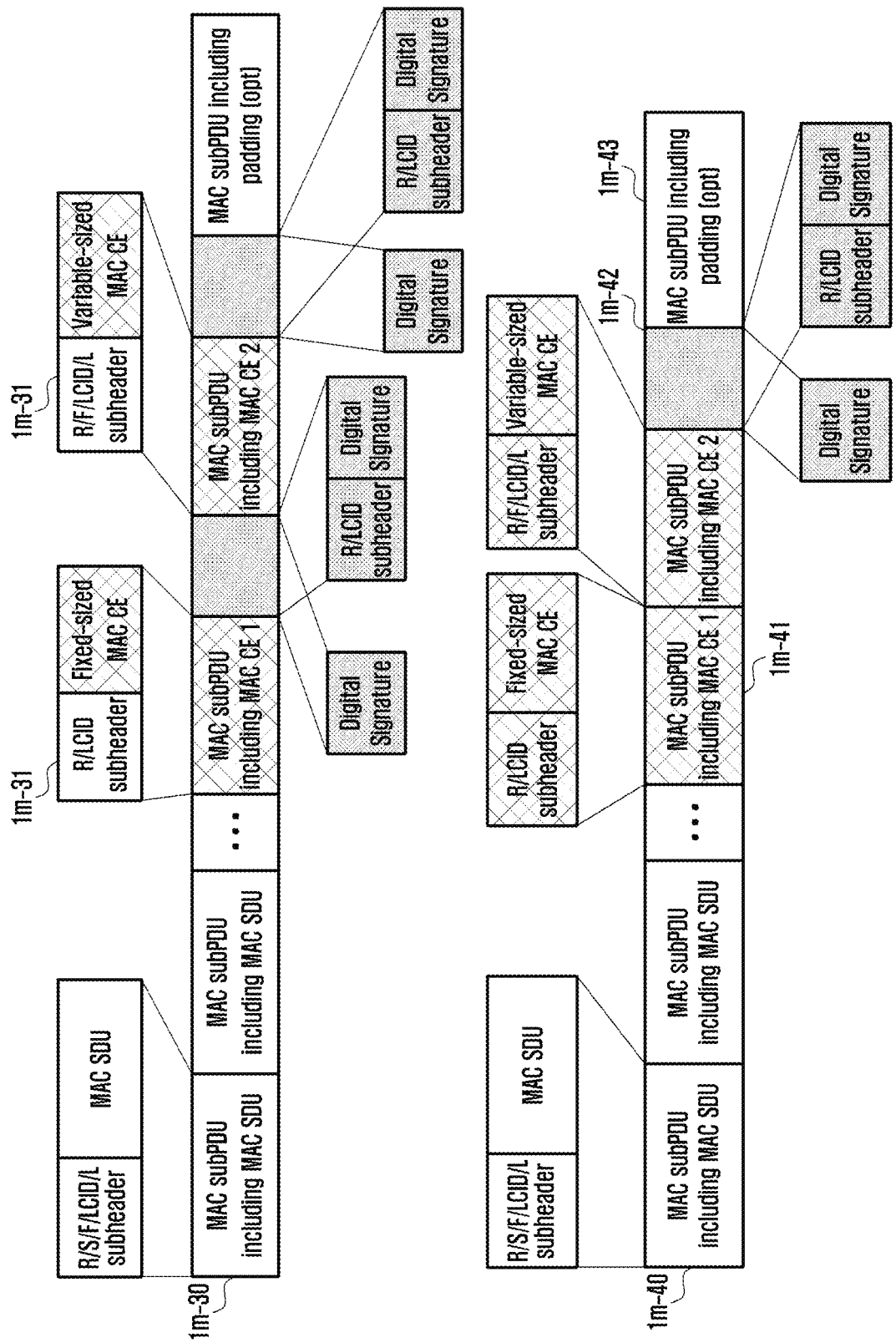
Figure 1M:
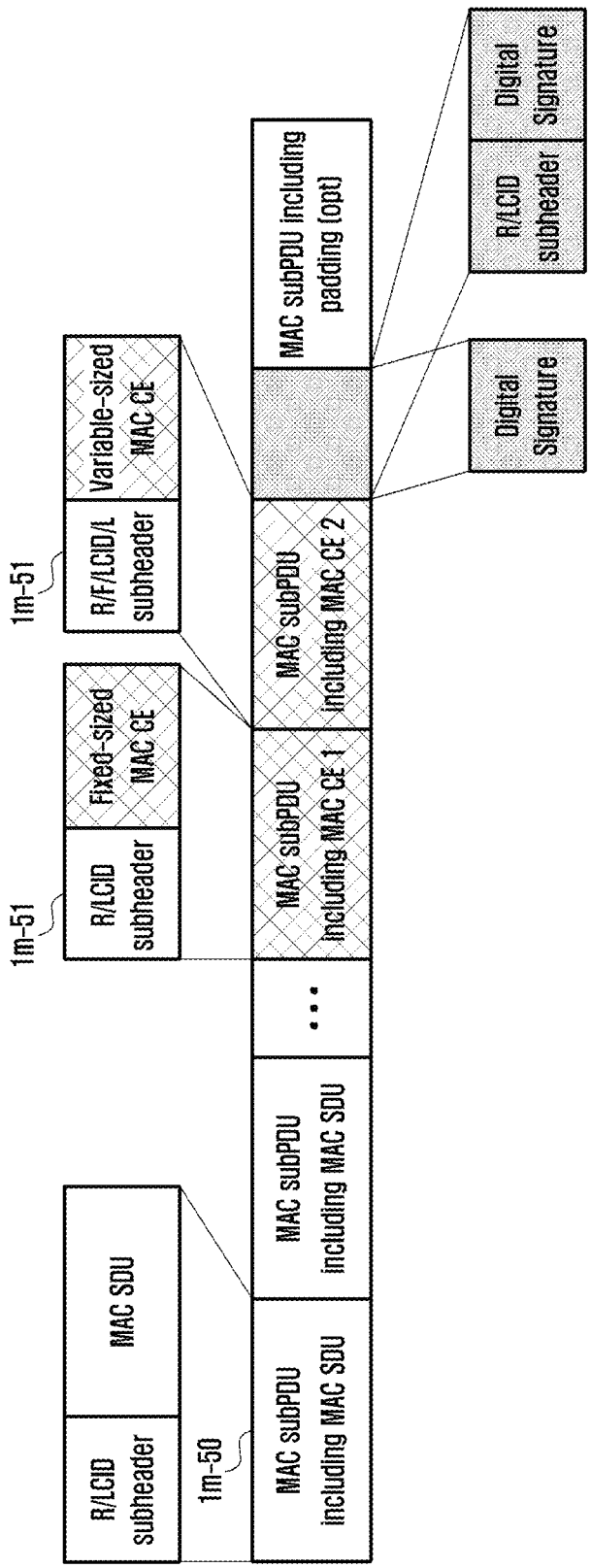
Figure 10A:
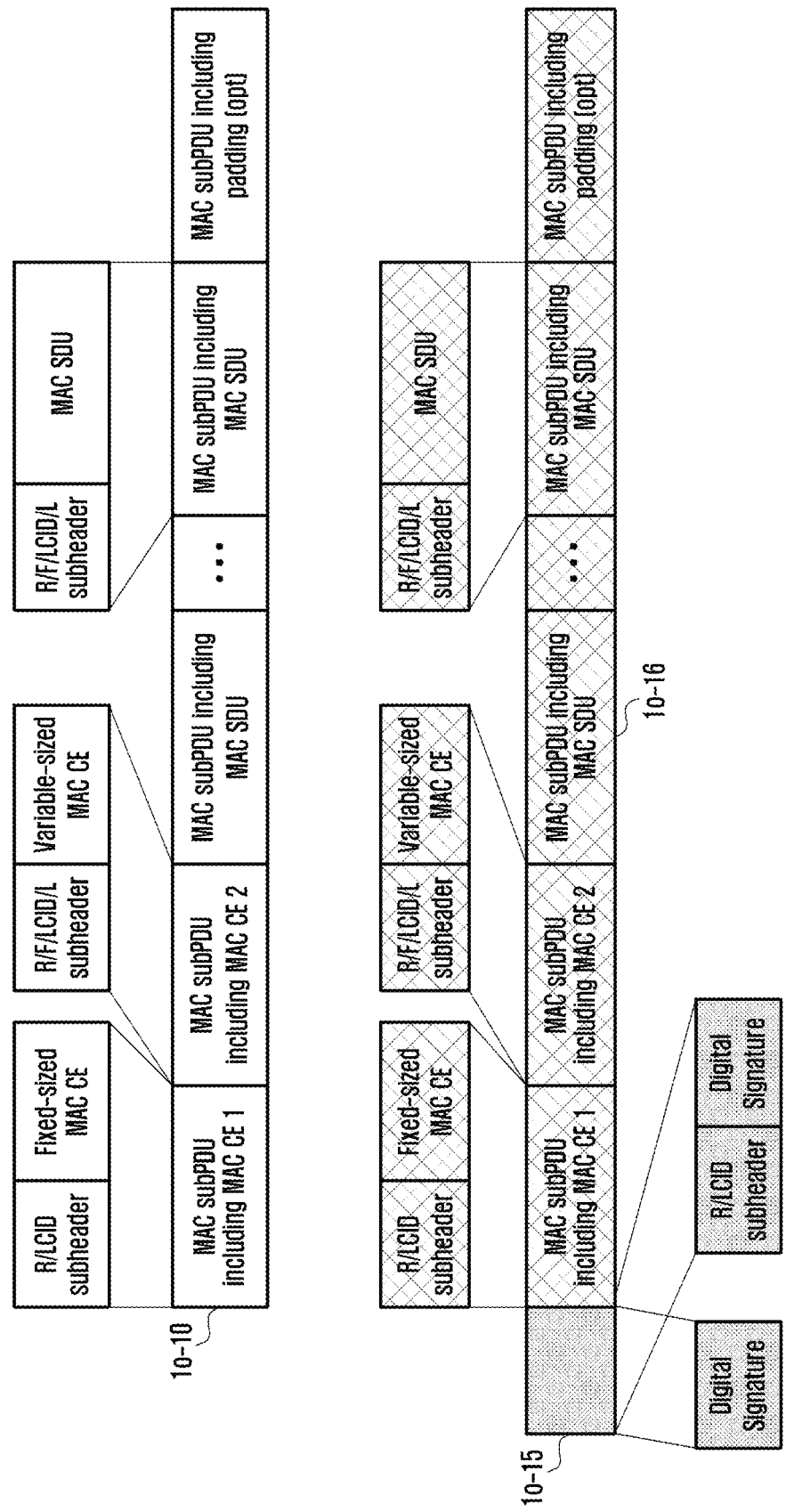
Figure 10B:
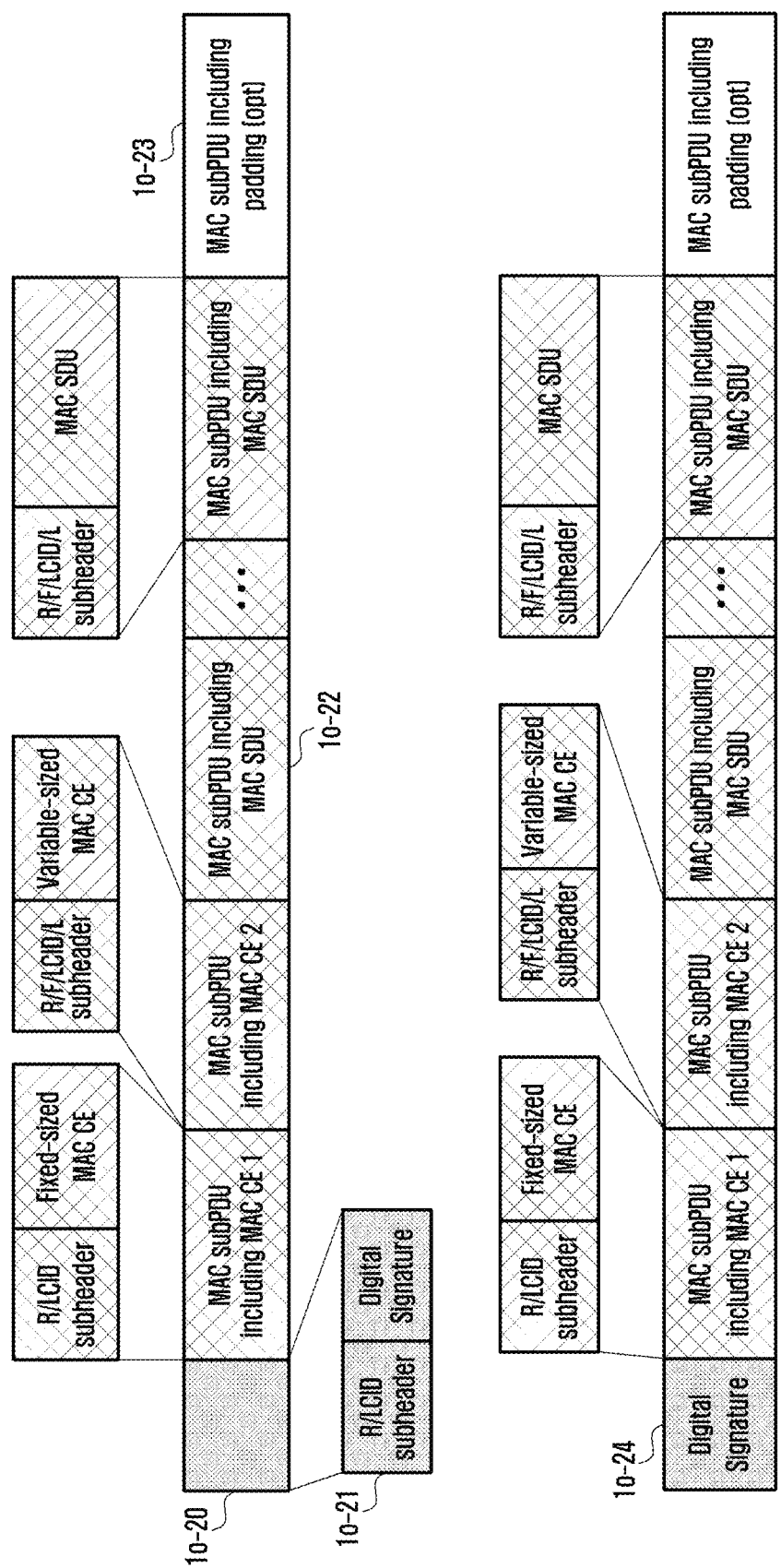
Figure 10C:
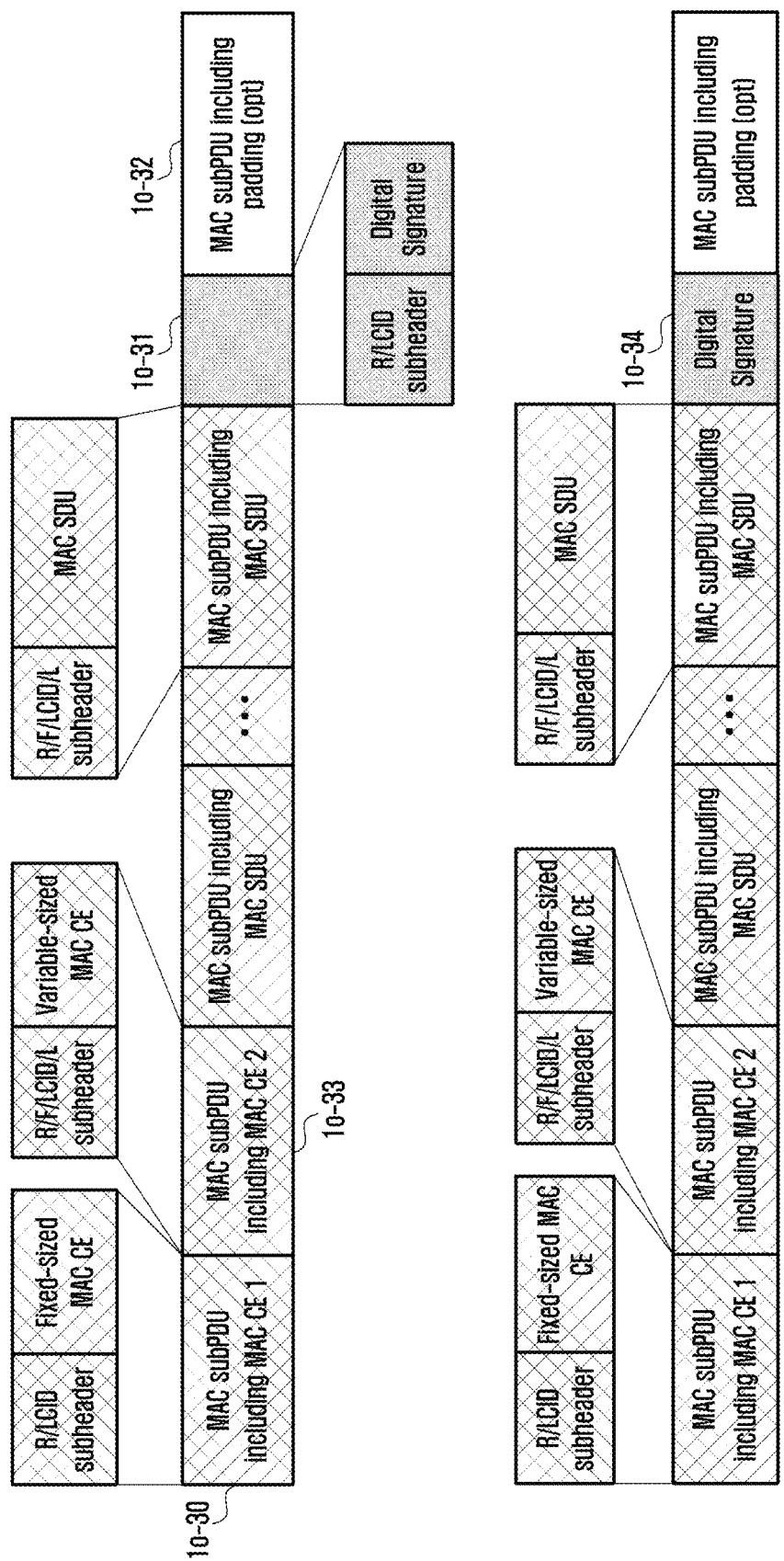
Figure 1P:
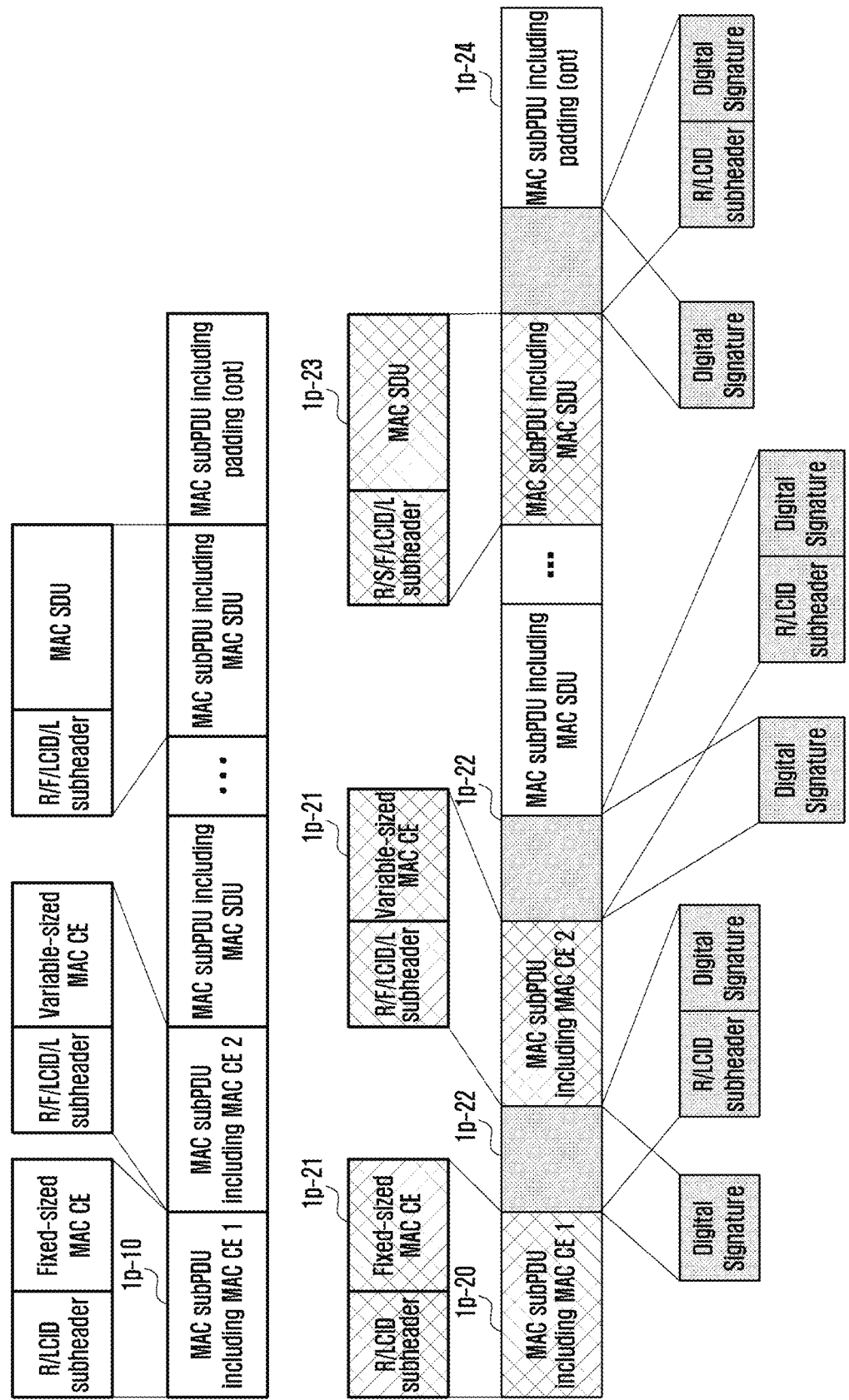
FIG. 1PA illustrates a diagram of a data protection method 2-2 proposed for downlink data according to an embodiment of the disclosure.
Figure 1P:
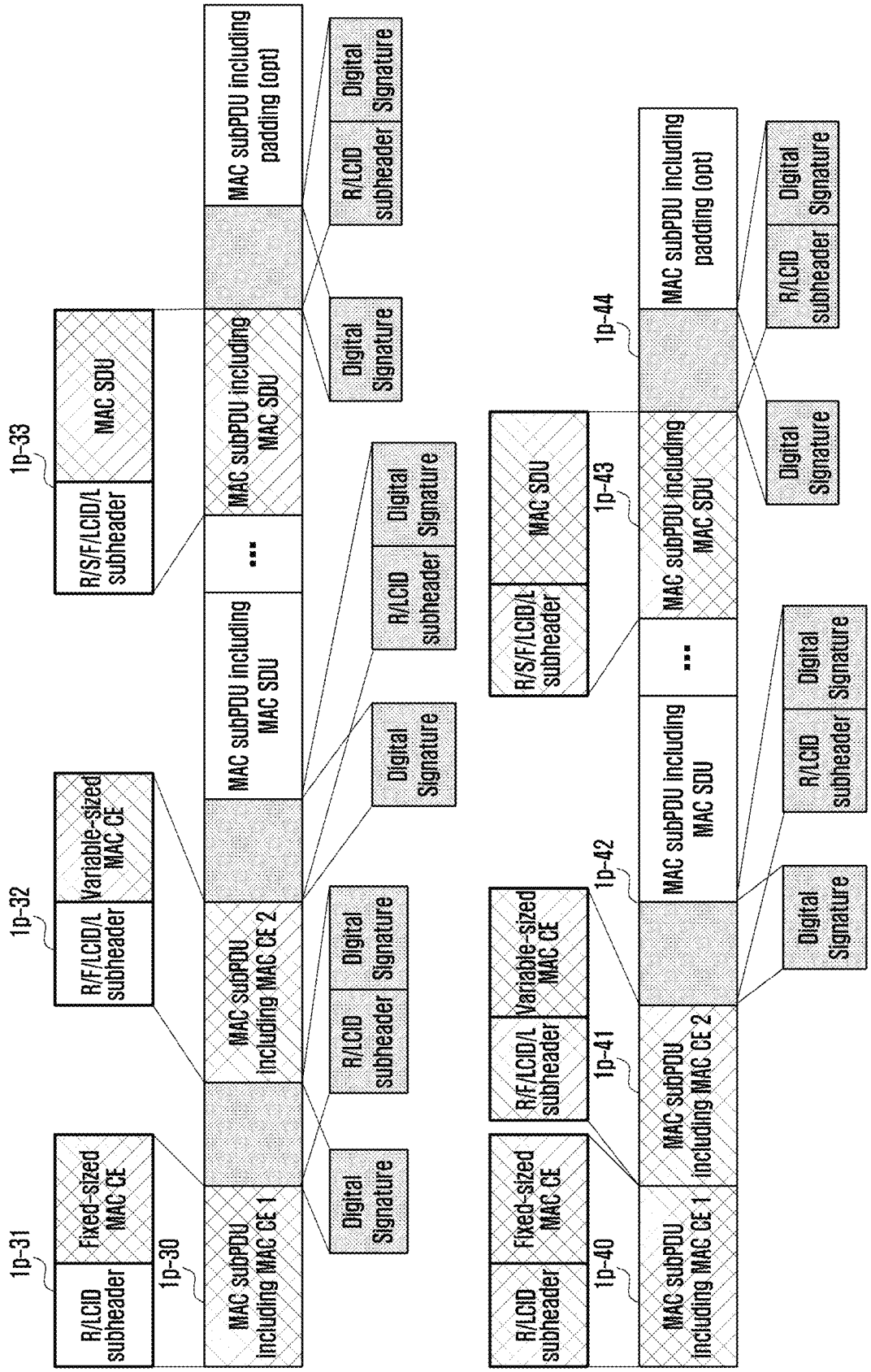
Figure 1P:
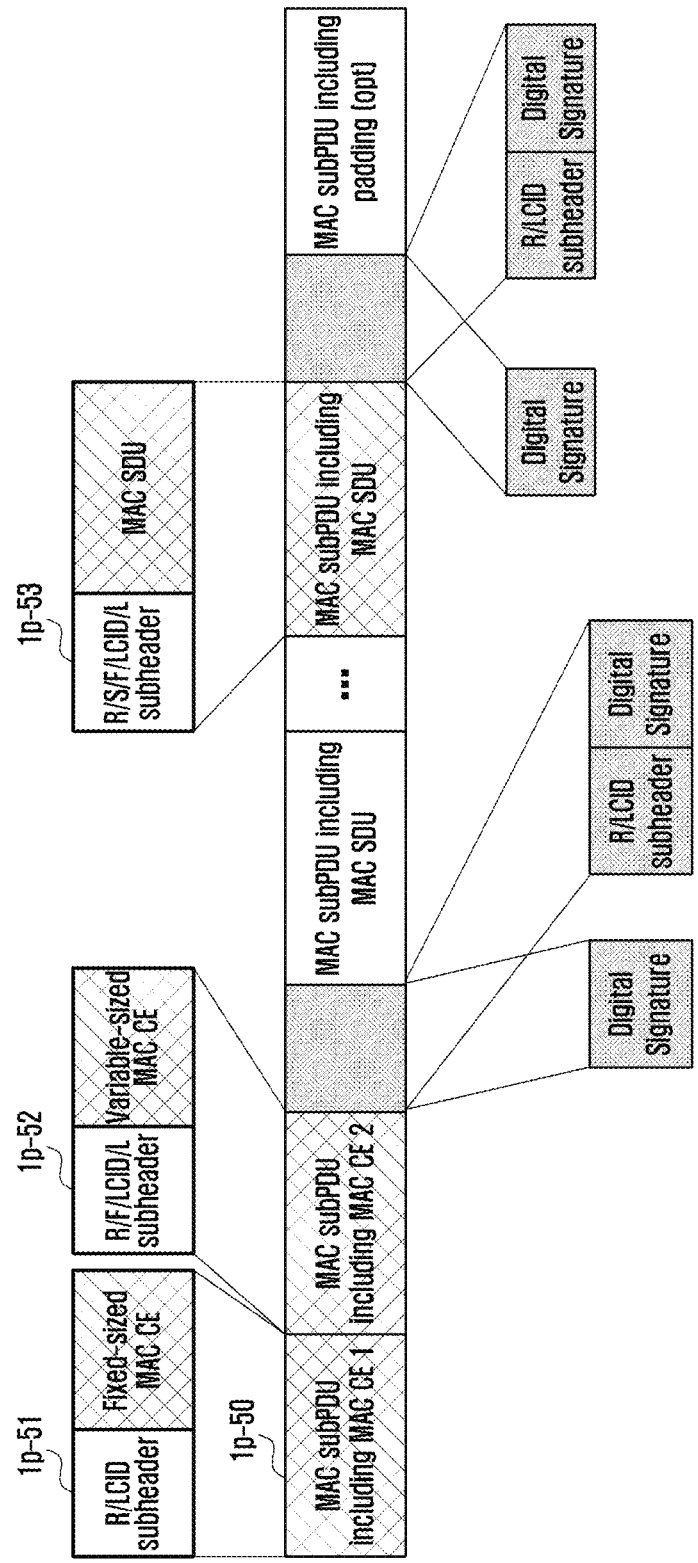
Figure 1R:
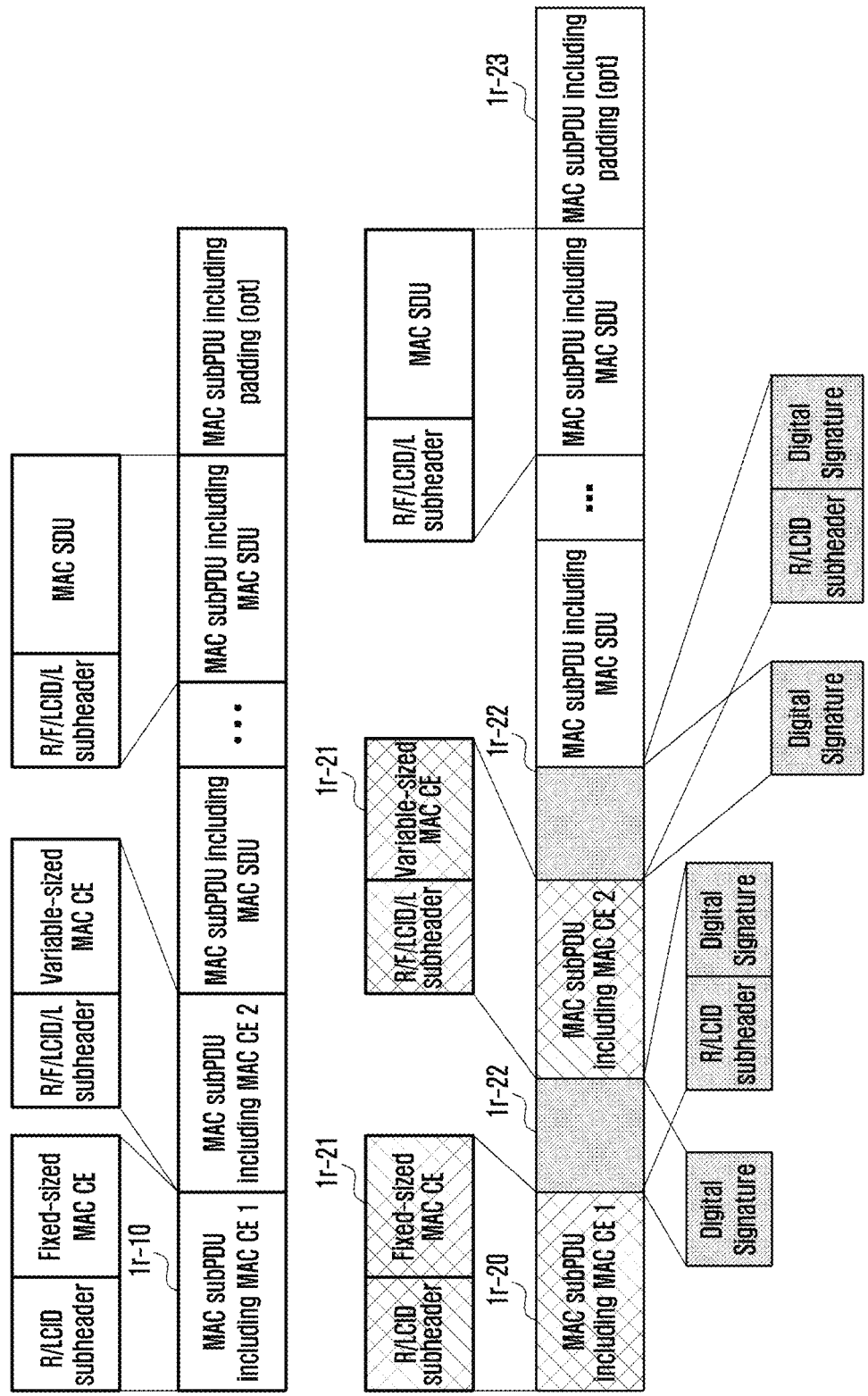
FIG. 1RA illustrates a diagram of a data protection method 2-3 proposed for downlink data according to an embodiment of the disclosure.
Figure 1R:
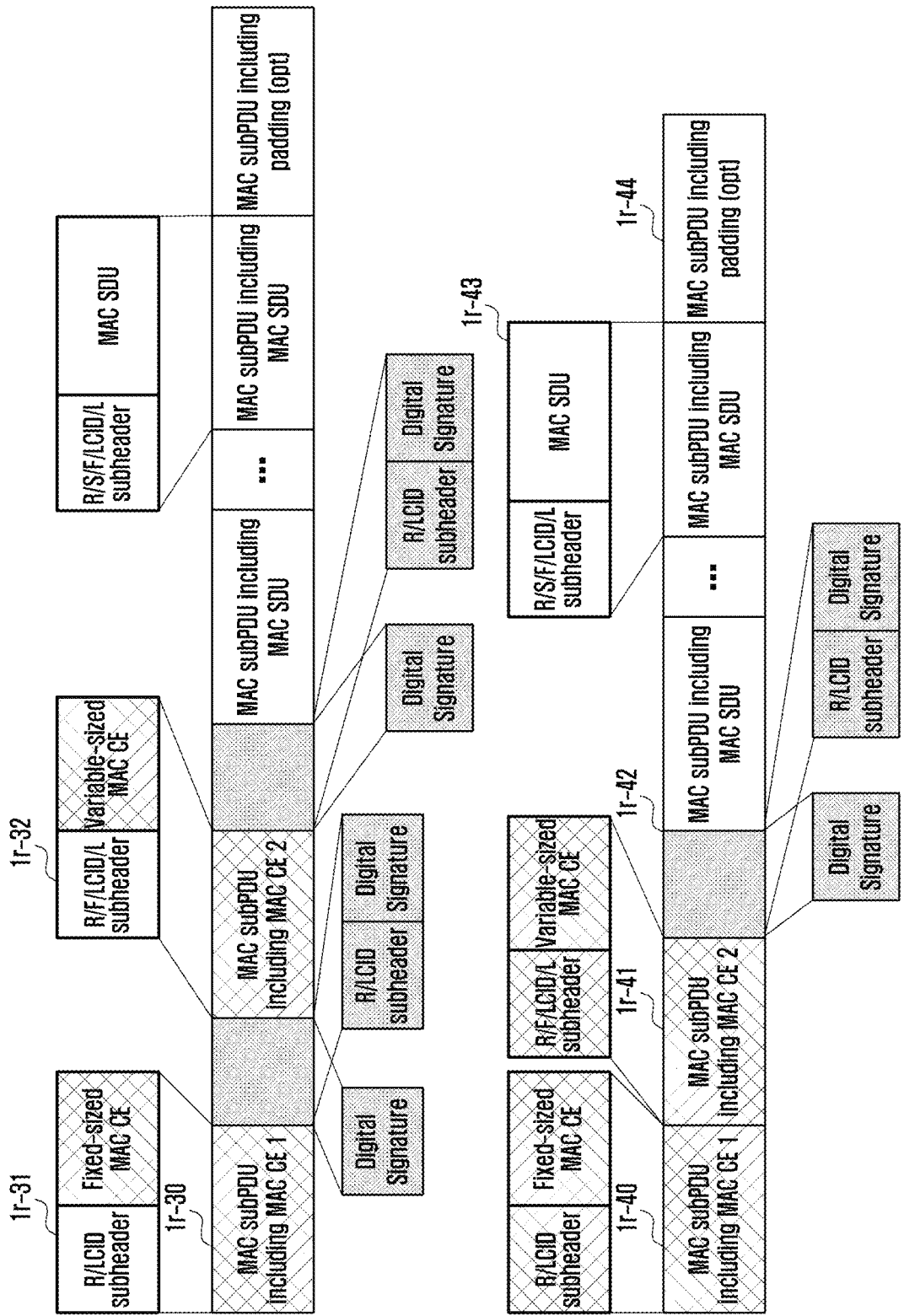
Figure 1R:
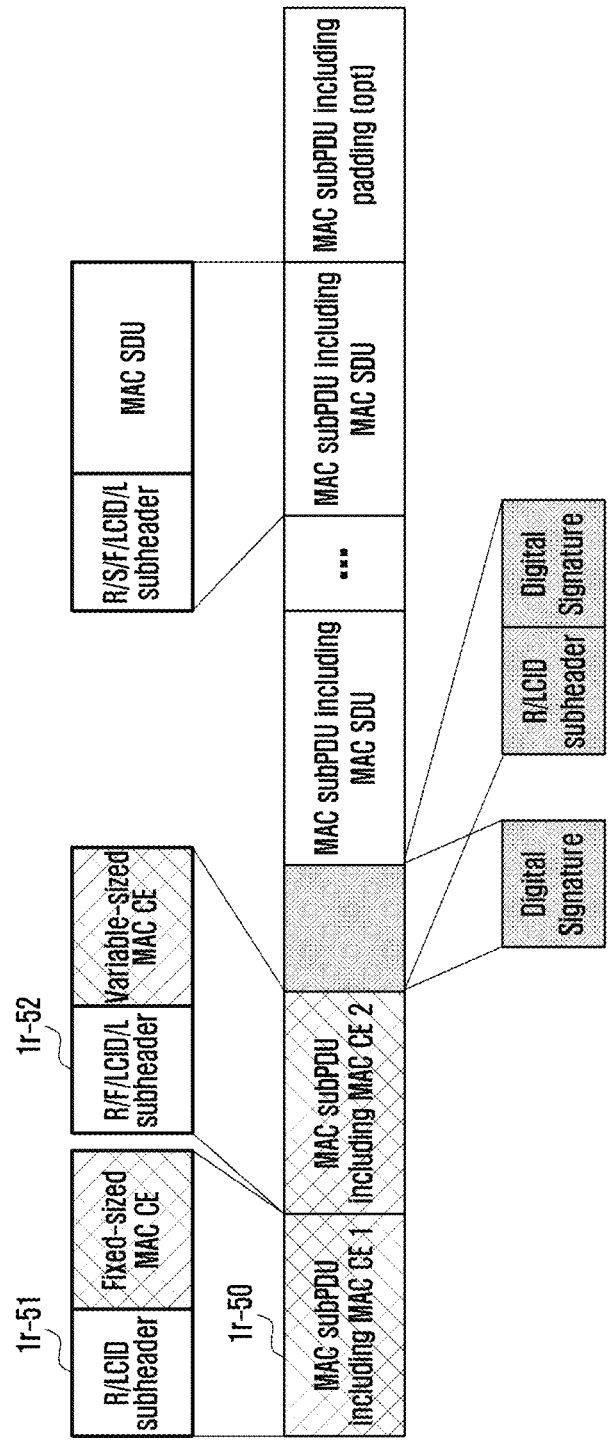
Figure 1S:
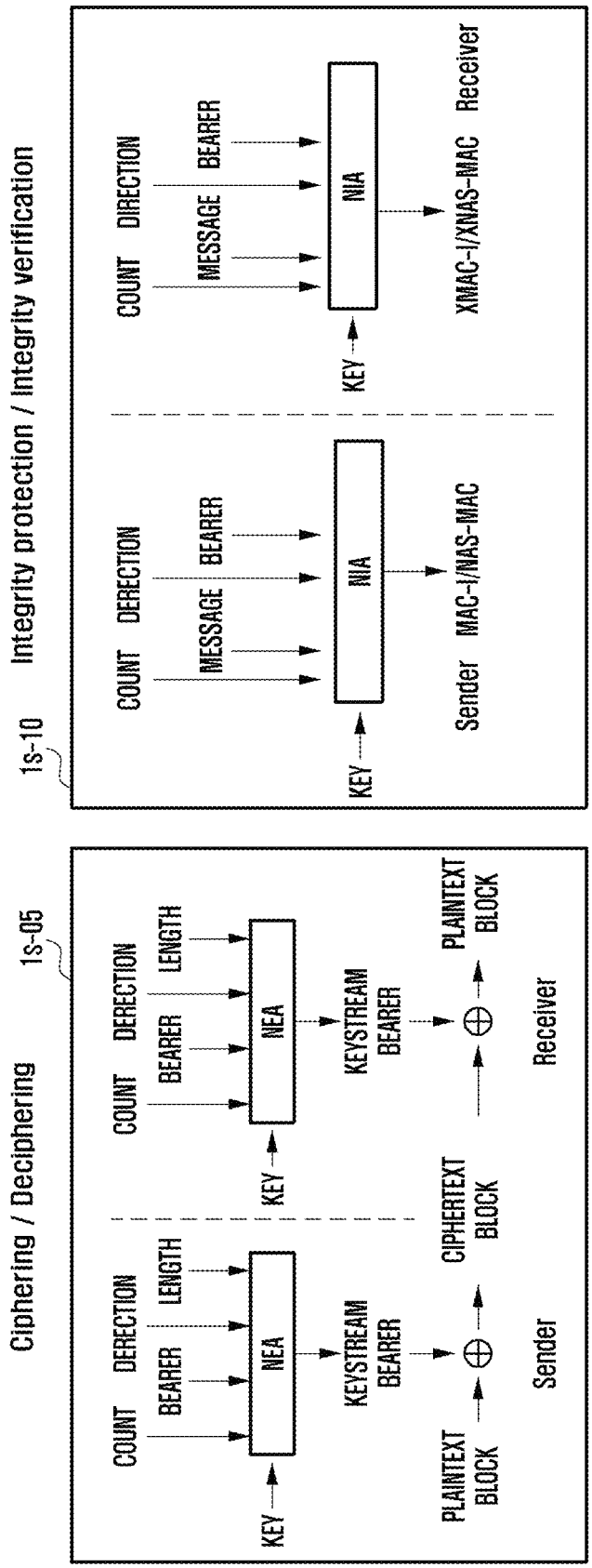
FIG. 1S illustrates a diagram of input values required for a security algorithm when a data protection method is applied according to an embodiment of the disclosure.
Figure 1T:
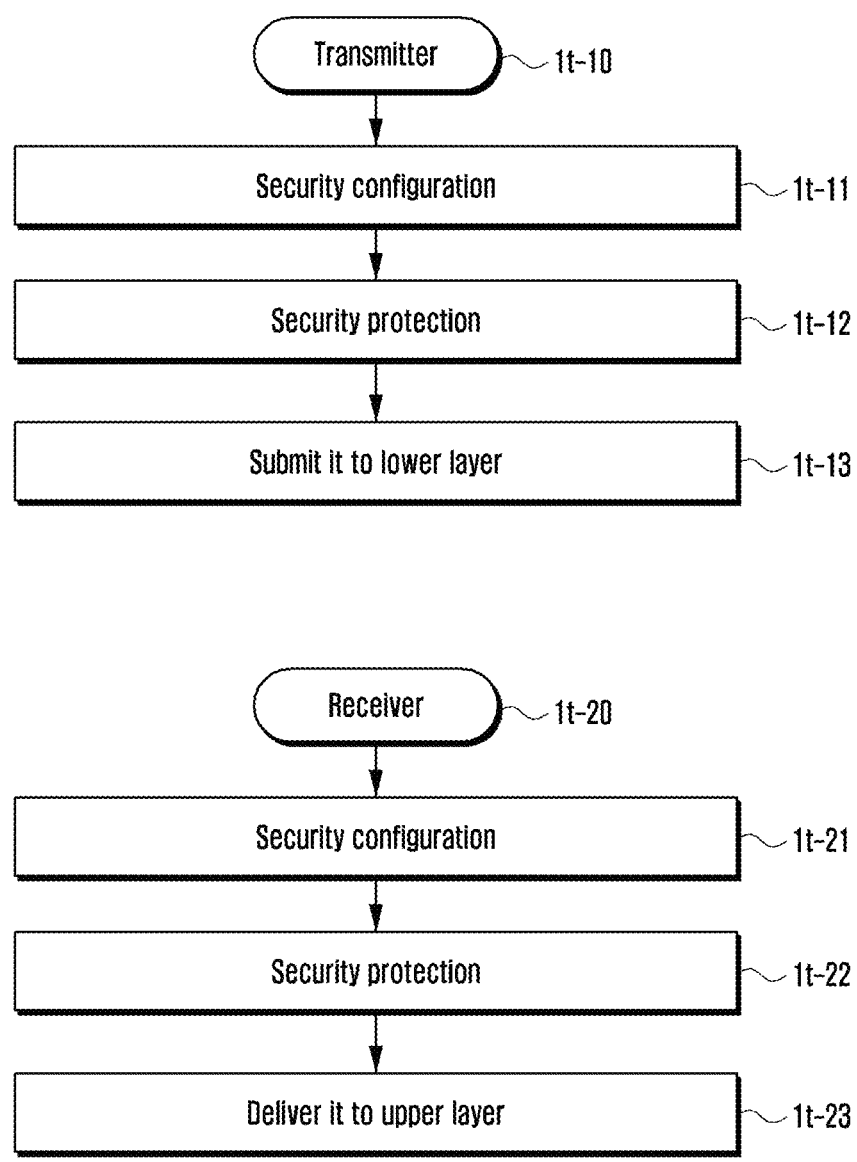
FIG. 1T illustrates a diagram of an operation of a proposed transmitter or a receiver according to an embodiment of the disclosure.
Figure 1U:
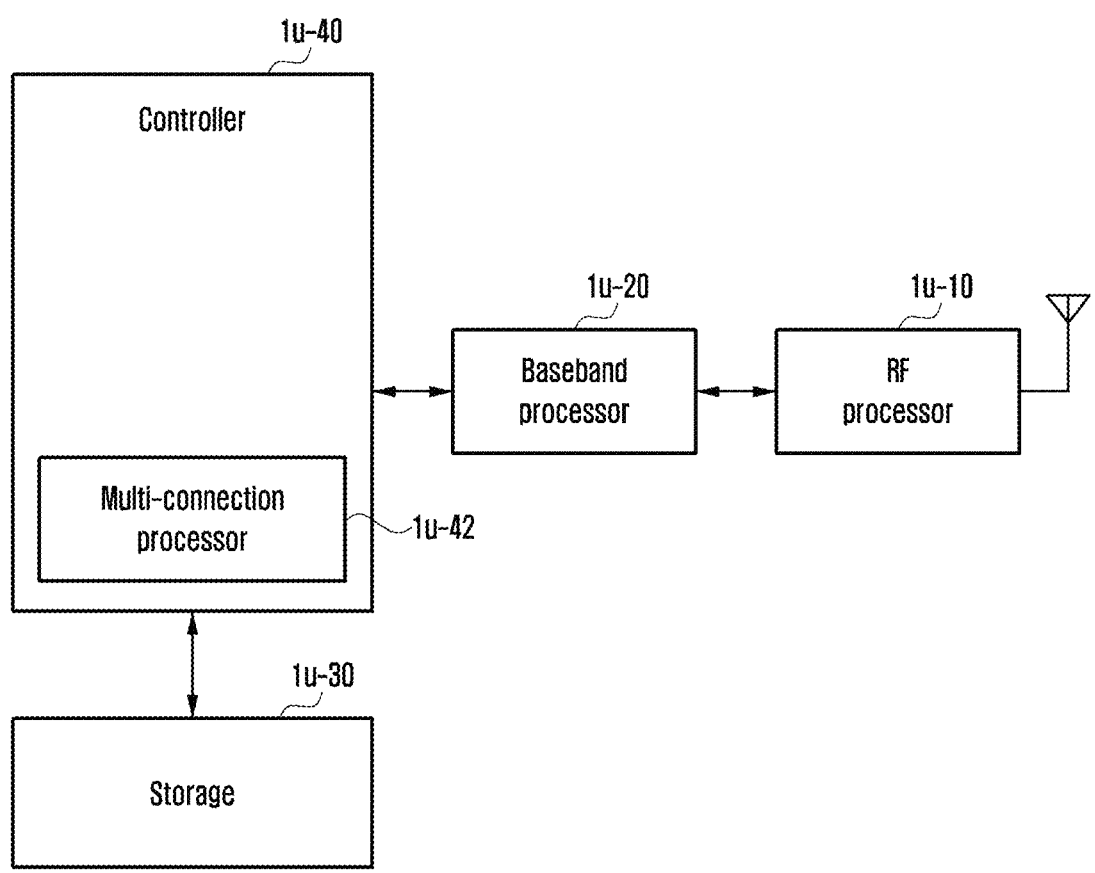
FIG. 1U illustrates the structure of a UE according to an embodiment of the disclosure.
Figure 1V:
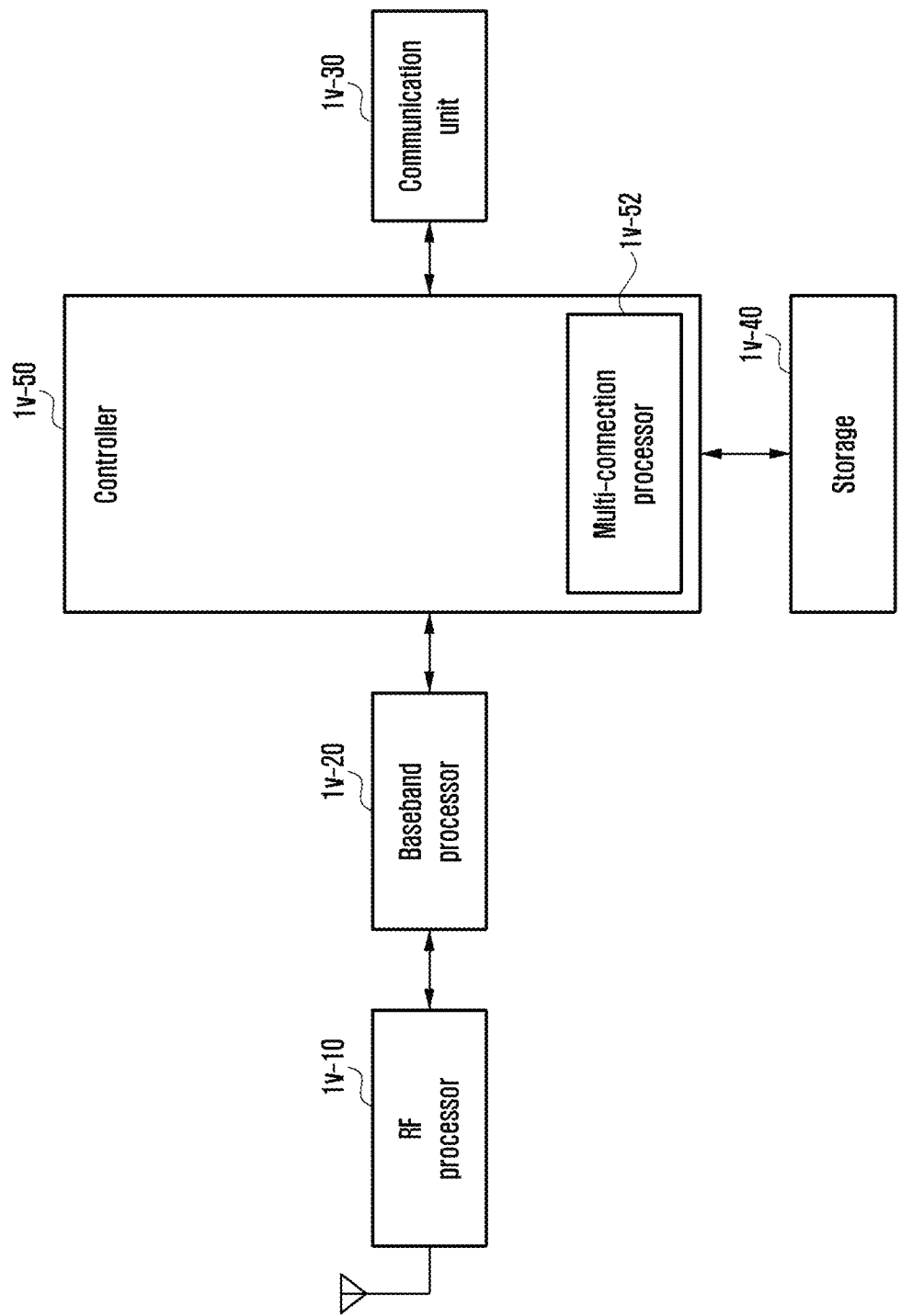
FIG. 1V illustrates a block configuration of a base station in a wireless communication system according to an embodiment of the disclosure.

FIGS. 1A through 1V, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) or 3GPP new radio (3GPP NR) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

In the disclosure, bearer may refer to including SRB and DRB, SRB refers to Signaling Radio Bearer, and DRB refers to Data Radio Bearer. The SRB is mainly used to transmit and receive RRC messages of a radio resource control (RRC) layer (entity), and the DRB is mainly used to transmit and receive user layer data. In addition, UM DRB refers to a DRB using a radio link control (RLC) layer (entity) operating in a unacknowledged mode (UM) mode, and AM DRB refers to a DRB using an RLC layer (entity) operating in an acknowledged mode (AM) mode.

The disclosure proposes security enhancement methods for enhancing security in a next-generation mobile communication system.

In the security enhancement method, the data protection procedure performed by the transmitter to enhance security may include a ciphering procedure or an integrity protection procedure, and the data protection release procedure performed by the receiver to enhance security may include a deciphering procedure or an integrity verification procedure. For example, the data protection procedure may refer to the ciphering procedure or the integrity protection procedure. In addition, the data protection release procedure may refer to the deciphering procedure or the integrity verification procedure.

The object to which the data protection procedure or the data protection release procedure proposed by the disclosure is applied is data, and the data may refer to upper layer data (User traffic), packet data convergence protocol (PDCP) service data unit (SDU), PDCP protocol data unit (PDU), PDCP data PDU, PDCP control PDU, RLC SDU, RLC SDU segment, RLC PDU, RLC data PDU, RLC control PDU, MAC PDU, MAC SDU, medium access control (MAC) subPDU (MAC subheader), Padding, MAC SDU and MAC subheader, MAC control information (MAC control element (CE) and MAC subheader, or MAC control information. In the above, the service data unit (SDU) may indicate data received by each protocol layer (entity) (PDCP, RLC, or MAC) from an upper layer (entity) or data to be transmitted from a lower layer (entity) to an upper layer, and the protocol data unit (PDU) may refer to data in which each protocol layer processes data and attaches a header of each protocol layer to the front of the SDU. In addition, in the disclosure, the MAC subPDU may indicate only the MAC subheader (for example, when indicating padding), the MAC subheader and the MAC SDU, the MAC subheader and MAC control information, or the MAC subheader and padding.

In a next-generation mobile communication system, a UE and a base station may perform a security configuration procedure in the process of establishing an RRC connection, and in the security configuration procedure, a procedure for promising security configuration information such as a security key or security algorithm (e.g., ciphering or deciphering algorithms or integrity protection or integrity protection algorithms, etc.) to be applied in order for a UE and a base station to perform a data protection procedure or a data protection release procedure with each other or a procedure for configuring or activating a security procedure (e.g., data protection procedures or data deprotection procedures) may be performed. The procedure for promising the security configuration information or the procedure for configuring or activating the security procedure may be performed by exchanging the SecurityModeCommand message or the SecurityModeComplete message between the base station and the UE, or may be performed as an authentication and key agreement (AKA) procedure.

After the security procedure is configured and activated as above, when the UE transmits data for the bearer (SRB or DRB), if the integrity protection procedure is configured, the integrity protection procedures (e.g., applying an integrity protection algorithm) may be performed on the data and the headers (PDCP header, SDAP header, headers (e.g., an uplink data compression (UDC) header or an Ethernet header compression (EHC) header) generated by configuring the header (or data) compression function in the PDCP layer (entity), or compressed headers or compressed data depending on the configured compression function) to perform an integrity protection procedure on data (PDCP SDU) received from an upper layer in the PDCP layer (for example, an integrity protection algorithm may be applied to the headers or data, and the generated MAC-I (Message Authentication Code-Integrity) field may be attached to the back of the data, and the integrity protection procedure may be completed). In addition, the ciphering procedure may be performed on the data received from the upper layer above when the ciphering procedure is configured, or on the data to which the integrity protection is applied when the integrity protection is configured above. In the above, the ciphering procedure may be applied to the remaining parts (e.g., PDCP SDU or, if a header compression procedure or a data compression procedure is configured, a UDC header, an EHC header, a compressed header, compressed data, data with integrity protection applied, or a MAC-I field) except for the PDCP header or SDAP header. If the header compression procedure is configured in the PDCP layer in the above, the header compression procedure (e.g., ROHC (Robust Header Compression) or EHC (Ethernet header compression) function or data compression procedure (UDC (Uplink Data Compression)) or the data compression procedure may be performed before the integrity protection procedure or the ciphering procedure. As described above, the PDCP layer may complete data processing according to the configured function, generate a PDCP PDU based on the PDCP header and data, and transmit the PDCP PDU to the lower layer. If necessary in the above (for example, when the condition for generating PDCP control data (PDCP control PDU) is satisfied), the PDCP layer may generate PDCP control data (for example, a PDCP status report (including information indicating successful data reception corresponding to each PDCP serial number with a 1-bit indicator as ACK or NACK), feedback information for header compression protocol, feedback information for a data compression protocol or information for setting a header compression protocol), and may not apply a data protection procedure (e.g., integrity protection procedures or ciphering procedures) to the PDCP control data. This is because, in the past, it is assumed that security threats can be solved by implementing a base station or a UE after the RRC connection is established, so control data between protocol layers may be considered not to be protected.

In the above, the PDCP PDU may be considered as an RLC SDU in the RLC layer, and data processing may be performed in the RLC layer. For example, data division may be performed as needed (e.g., when transmission resources are insufficient). In the above, the RLC layer may configure the RLC header to generate an RLC PDU and transmit the RLC PDU to the MAC layer (entity). If necessary in the above (for example, when a condition for generating RLC control data (RLC control PDU) is satisfied), the RLC layer may generate RLC control data (e.g., RLC status report (including information indicating successful data reception corresponding to each RLC serial number as ACK or NACK)) and transmit the RLC control data as an RLC PDU to a lower layer (entity) to perform transmission. Because only the PDCP layer performs the data protection procedure, the data protection procedure cannot be applied to the RLC control data generated by the RLC layer.

The MAC layer may consider the RLC PDU as a MAC SDU, and the MAC layer may receive RLC PDUs from different RLC layers connected to the MAC layer. In the above, the MAC layer may generate and concatenate a MAC subheader based on different MAC SDUs to generate each MAC subPDU. In addition, if necessary (for example, according to the generation condition of MAC control information), the MAC layer may configure MAC control information, generate a MAC subheader, and concatenate to generate a MAC subPDU, and the MAC subPDU may include a MAC subheader for padding or a padding and MAC subheader. When configuring the MAC PDU (data unit composed of a plurality of MAC subPDUs), the MAC layer configures downlink data (for example, when the base station transmits data to the UE) based on the MAC subPDU generated above, and if padding is required, the padding may be positioned at the end of the MAC PDU composed of MAC subPDUs, and when the MAC layer includes MAC control information or MAC control information, the MAC layer may place the padding at the front of the MAC PDU and place the MAC SDUs behind the MAC control information. In addition, in the MAC subPDU, the MAC subheader may always be positioned in front of the MAC SDU, MAC control information, or padding, and as described above, the MAC PDU may be configured with MAC subPDUs to be transferred to a lower layer to perform transmission. As described above, in the case of downlink data, there is an advantage that important control information such as MAC control information may be placed at the front so that the UE may quickly process control information first. However, because only the PDCP layer performs the data protection procedure, the data protection procedure cannot be applied to the MAC control data generated by the MAC layer.

On the other hand, when configuring uplink data (for example, when the UE transmits data to the base station) based on the MAC subPDU generated from the MAC layer above, if padding is required, the padding may be positioned at the end of a MAC PDU composed of MAC subPDUs, and when the MAC layer includes MAC control information or MAC control information, the MAC layer may place the padding at the end of the MAC PDU, or if there is padding, MAC control information may be positioned in front of the padding, and the MAC SDUs may be positioned in front of the MAC control information. In addition, in the MAC subheader composed of MAC subheader and MAC SDU, or MAC control information or padding, the MAC subheader may always be positioned in front of the MAC SDU or MAC control information or padding, and as described above, the MAC PDU may be configured and transferred to a lower layer to perform transmission. As described above, in the case of uplink data, by placing the MAC control information at the back, the UE generates MAC SDUs in advance and processes them quickly, parallel-processes dynamically generated MAC control information to generate MAC control information, and then attaches MAC control information to the back of the pre-processed MAC SDUs to facilitate the implementation of the UE, and data processing speed may be up due to parallel processing. Because only the PDCP layer performs the data protection procedure, the data protection procedure cannot be applied to the MAC control data generated by the MAC layer.

At the receiver, when the MAC layer receives a MAC PDU from a lower layer, data is processed in units of MAC subPDUs. In addition, if the MAC subPDU includes MAC control information, the receiver reads and removes the MAC subheader, may determine the type of MAC control information based on the logical channel identifier of the MAC subheader, and may interpret the MAC control information instruction and perform a corresponding procedure. In the above, if the MAC subPDU includes the MAC SDU, the receiver reads and removes the MAC subheader, and the MAC SDU may be delivered as an RLC PDU to the upper layer (RLC layer) according to the logical channel identifier included in the MAC subheader. In addition, if the MAC subPDU indicates padding or includes padding, the MAC subPDU corresponding to the padding may be discarded.

The RLC layer that has received the RLC PDU from the MAC layer may read or remove the RLC header and deliver the received RLC SDU as a PDCP PDU to an upper layer (e.g., a PDCP layer). If the RLC PDU received above includes the RLC SDU segment, the RLC layer may configure a complete RLC SDU by performing reassembly based on RLC PDUs received based on the RLC serial number, segment information (SI field) or segment offset information (SO field) of the RLC header, and then transmit the complete RLC SDU to the upper layer as a PDCP PDU. If the RLC PDU received from the RLC layer is RLC control data (RLC control PDU), the RLC layer reads and interprets the RLC control data (e.g., RLC status report), and identifies successfully delivered and unsuccessfully delivered data as ACK or NACK information, and if necessary, a retransmission procedure may be performed for data that has not been successfully transmitted. In addition, based on the RLC serial number of the RLC header in the RLC layer, duplicate received data or data outside the RLC reception window may be discarded.

The PDCP layer receiving the PDCP PDU from the RLC layer may read the PDCP header and derive a COUNT value based on PDCP serial number information of the PDCP header. In addition, the PDCP layer may discard duplicate received data or data outside the PDCP reception window based on the COUNT value. In addition, the PDCP layer may check the indicator of the received PDCP header, and if the PDCP PDU is a PDCP data PDU and the data protection procedure is configured, the data protection release procedure may be performed. For example, when a ciphering procedure or a deciphering procedure is configured in the PDCP layer, the PDCP layer may perform a deciphering procedure on the PDCP SDU except for the PDCP header of the PDCP PDU based on the configured security key, security algorithm, or the COUNT value. In addition, for example, when an integrity protection procedure or integrity verification procedure is configured in the PDCP layer, the PDCP layer may perform an integrity verification procedure on the PDCP PDU or the deciphered PDCP SDU and PDCP header based on the configured security key, security algorithm, or the COUNT value. If the data protection release procedure is successfully performed as above, when a header compression function or a data compression function is configured for the PDCP SDU, the PDCP layer may perform a header decompression procedure or a data decompression procedure on the PDCP SDU, and may deliver the PDCP SDU to an upper layer in an ascending order of COUNT values.

When the PDCP layer checks the indicator of the received PDCP header, if the PDCP PDU is a PDCP control PDU, the PDCP layer may directly read PDCP control data (PDCP control PDU) without applying a data protection release procedure (e.g., deciphering procedure or integrity verification procedure) to the PDCP control PDU.

As described above, when the UE establishes an RRC connection and is connected to a network to transmit or receive data, the data is processed through a PHY (physical) layer (entity), a MAC layer (entity), an RLC layer (entity), or a PDCP layer (entity), and a data protection procedure (ciphering or integrity protection procedure) or data protection release procedure (deciphering or integrity verification procedure) is performed in the PDCP layer. Therefore, the data protection procedure or data protection release procedure cannot be applied to the RLC header, RLC control data (RLC control PDU), MAC subheader, or MAC control information (MAC CE, MAC Control Element) generated in a layer lower than the PDCP layer. In addition, the data protection procedure or the data protection release procedure is not applied to the PDCP control data.

Therefore, in the next-generation mobile communication system as described above, even if the UE establishes an RRC connection with the network, sets security configuration information, and performs a data protection procedure or data protection release procedure in a PDCP layer or an upper layer, there is a security risk because the above procedures cannot be applied to PDCP control data, RLC header, RLC control data (RLC control PDU), MAC subheader, or MAC control information (MAC control element (CE)). For example, any malicious base station or user may configure and transmit incorrect PDCP control data (RLC control PDU), RLC header, RLC control data, MAC subheader, or MAC control information (MAC control element (CE) to a normal UE, thereby performing an attack that causes protocol malfunction, error, or performance degradation. For example, any malicious base station or user may perform an attack such as inactivating some cells with MAC control information to a UE using a plurality of cells to cut off data transmission or reception, requesting a buffer status report that unnecessarily requests a lot of uplink transmission resources from the base station to waste transmission resources, changing important beam related information in a high frequency band to MAC control information to lower the data rate, or transmitting RLC control data or PDCP control data arbitrarily configured to request unnecessary retransmissions or to discard data that was not successfully transmitted.

Therefore, in order to prevent security threats that can be attacked in the next-generation mobile communication system as described above, the disclosure proposes configuring and performing a data protection procedure or a data protection release procedure in a specific layer device (entity) (for example, a MAC layer (entity), a PHY layer (entity), an RRC layer (entity), or a backhaul adaptation protocol (BAP) layer (entity)), and proposes a specific data structure to which the data protection procedure is applied. The disclosure mainly proposes configuring data protection procedure or data protection release procedure on the MAC layer, performing data protection procedure or data protection release procedure on the MAC layer, and a data structure to which a data protection procedure that may improve the ease and efficiency of implementation is applied. The data protection procedure or data protection release procedure proposed by the MAC layer is not limited to the MAC layer, and may be extended or applied to other layers (for example, a PHY layer, an RRC layer, a BAP layer, or layers to be described in FIG. 1D below) described in the disclosure.

FIG. 1A illustrates a diagram of a structure of an LTE system according to an embodiment of the disclosure.

Referring to FIG. 1A, as illustrated, the radio access network of the LTE system includes a next-generation base station (Evolved Node B, hereinafter ENB, Node B or base station) 1A-05, 1A-10, 1A-15, and 1A-20, a mobility management entity (MME) 1A-25, and a serving-gateway (S-GW) 1A-30. The user equipment (hereinafter UE or terminal) 1A-35 accesses the external network through the ENB 1A-05, 1A-10, 1A-15 and 1A-20 and the S-GW 1A-30.

In FIG. 1A, the ENBs 1A-05, 1A-10, 1A-15, and 1A-20 correspond to the existing Node B of the UMTS system. The ENBs 1A-05, 1A-10, 1A-15, and 1A-20 are connected to the UE 1A-35 through a radio channel and perform a more complex role than the existing Node B. In the LTE system, because all user traffic, including real-time services such as Voice over IP (VoIP) through Internet protocol, are serviced through shared channels, a device for scheduling by collecting status information such as buffer status, available transmission power status, and channel status of the UEs 1A-35 is required, and the ENB 1A-05, 1A-10, 1A-15, and 1A-20 is responsible for this. One ENB 1A-05, 1A-10, 1A-15, or 1A-20 typically controls multiple cells. For example, in order to implement a transmission rate of 100 Mbps, the LTE system uses, for example, orthogonal frequency division multiplexing (hereinafter referred to as OFDM) in a 20 MHz bandwidth as a radio access technology. In addition, an adaptive modulation & coding (AMC) method determining a modulation scheme and a channel coding rate based on the channel state of the UE 1A-35 is applied. The S-GW 1A-30 is a device that provides a data bearer, and creates or removes a data bearer under the control of the MME 1A-25. The MME 1A-25 is a device in charge of various control functions as well as a mobility management function for the UE 1A-35, and is connected to a plurality of base stations 1A-05, 1A-10, 1A-15, and 1A-20.

FIG. 1B illustrates a diagram of a radio protocol structure in an LTE system according to an embodiment of the disclosure.

Referring to FIG. 1B, the radio protocol of the LTE system consists of a packet data convergence protocol (PDCP) 1B-05 and 1B-40, a radio link control (RLC) 1B-10 and 1B-35, and medium access control (MAC) 1B-15 and 1B-30 in the UE and ENB, respectively. The packet data convergence protocol (PDCP) 1B-05 and 1B-40 is responsible for IP header compression/decompression operations. The main functions of PDCP 1B-05 and 1B-40 are summarized below.

Header compression and decompression (ROHC only)
    Transfer of user data
    In-sequence delivery of upper layer PDUs at PDCP re-establishment procedure for RLC AM
    For split bearers in DC (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink.

The radio link control (hereinafter referred to as RLC) 1B-10 and 1B-35 performs ARQ operation by reconfiguring a PDCP protocol data unit (PDU) or RLC service data unit (SDU) to an appropriate size. The main functions of RLCs 1B-10 and 1B-35 are summarized below.

Transfer of upper layer PDUs
    Error Correction through ARQ (only for AM data transfer)
    Concatenation, segmentation and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment function The MACs 1B-15 and 1B-30 are connected to several RLC layers configured in one UE, and perform operations of multiplexing RLC PDUs into MAC PDUs and demultiplexing RLC PDUs from MAC PDUs. The main functions of MACs 1B-15 and 1B-30 are summarized as follows.

Mapping between logical channels and transport channels
    Multiplexing/demultiplexing of MAC SDUs belonging to one or different logical channels into/from transport blocks (TB) delivered to/from the physical layer on transport channels
    Scheduling information reporting
    Error correction through HARQ
    Priority handling between logical channels of one UE
    Priority handling between UEs by means of dynamic scheduling
    MBMS service identification
    Transport format selection
    Padding The physical layer (PHY) 1B-20 and 1B-25 channel-codes and modulates upper layer data, makes OFDM symbols and transmits them through a radio channel, or demodulates and channel-decodes the OFDM symbols received through the radio channel and transmits them to upper layers.

FIG. 1C illustrates a diagram of the structure of a next-generation mobile communication system according to an embodiment of the disclosure.

Referring to FIG. 1C, as illustrated, a radio access network of a next-generation mobile communication system (hereinafter referred to as NR or 5G) is composed of a next-generation base station (New Radio Node B, hereinafter NR gNB, NR base station, or gNB) 1C-10 and a new radio core network (NR CN) 1C-05. A new radio user equipment (hereinafter NR UE or UE) 1C-15 accesses an external network through NR gNB 1C-10 and NR CN 1C-05.

In FIG. 1C, an NR gNB 1C-10 corresponds to an Evolved Node B (eNB) of an existing LTE system. The NR gNB 1C-10 is connected to the NR UE 1C-15 through a radio channel and may provide a service superior to that of the existing Node B. In the next-generation mobile communication system, because all user traffic is serviced through the shared channel, a device for scheduling by collecting status information such as buffer status, available transmission power status, and channel status of the UEs 1C-15 is required, and the NR NB 1C-10 is responsible for this. One NR gNB 1C-10 typically controls multiple cells. In order to implement ultra-high-speed data transmission compared to current LTE, the next-generation mobile communication system may have more than the existing maximum bandwidth, and additional beamforming technology may be grafted using orthogonal frequency division multiplexing (hereinafter referred to as OFDM) as a radio access technology. In addition, an adaptive modulation & coding (AMC) method for determining a modulation scheme and a channel coding rate according to the channel state of the UE 1C-15 is applied. The NR CN 1C-05 performs functions such as mobility support, bearer setup, QoS configuration, and the like. The NR CN 1C-05 is a device in charge of various control functions as well as a mobility management function for the UE 1C-15, and is connected to a plurality of base stations 1C-10. In addition, the next-generation mobile communication system may be linked with the existing LTE system, and the NR CN 1C-05 is connected to the MME 1C-25 through a network interface. The MME 1C-25 is connected to the existing base station eNB 1C-30.

FIG. 1D illustrates a diagram of a radio protocol structure of a next-generation mobile communication system according to an embodiment of the disclosure.

Referring to FIG. 1D, a radio protocol of a next-generation mobile communication system consists of NR SDAP 1D-01 and 1D-45, NR PDCP 1D-05 and 1D-40, NR RLC 1D-10 and 1D-35, and NR MAC 1D-15 and 1D-30 in a UE and an NR base station, respectively.

The main functions of the NR SDAPs 1D-01 and 1D-45 may include some of the following functions.

Transfer of user plane data
    Mapping between a QoS flow and a DRB for both DL and UL
    Marking QoS flow ID in both DL and UL packets
    Reflective QoS flow to DRB mapping for the UL SDAP PDUs With respect to the SDAP layer (entity), the UE may be configured with an RRC message whether to use the header of the SDAP layer or the function of the SDAP layer for each PDCP layer, for each bearer, or for each logical channel, and when SDAP header is configured, with the NAS QoS reflection configuration 1-bit indicator (NAS reflective QoS) and the AS QoS reflection configuration 1-bit indicator (AS reflective QoS) in the SDAP header, it is possible to instruct the UE to update or reconfiguring mapping information for uplink and downlink QoS flows and data bearers. The SDAP header may include QoS flow ID information indicating QoS. The QoS information may be used as data processing priority, scheduling information to support a smooth service, etc.

The main function of NR PDCP 1D-05 and 1D-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above, the reordering function of the NR PDCP device refers to a function of reordering PDCP PDUs received from a lower layer in order based on a PDCP sequence number (SN), and may include a function to transmit data to the upper layer in the rearranged order or a function to directly transmit data without considering the order, a function to record lost PDCP PDUs by rearranging the order, a function to report the status of lost PDCP PDUs to the transmitting side, and a function to request retransmission for lost PDCP PDUs.

The main function of the NR RLC 1D-10 and 1D-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, in-sequence delivery of the NR RLC device refers to a function of sequentially delivering RLC SDUs received from a lower layer to an upper layer, and, may include a function to reassemble and deliver divided RLC SDUs when originally one RLC SDU is divided into several RLC SDUs and received, a function of rearranging received RLC PDUs based on RLC sequence number (SN) or PDCP sequence number (SN), a function to reorder and record lost RLC PDUs, a function to report the status of lost RLC PDUs to the transmitting side, a function to request retransmission of lost RLC PDUs, a function of sequentially delivering only the RLC SDUs before the lost RLC SDU to the upper layer when there is a missing RLC SDU, a function of sequentially delivering all RLC SDUs received before the timer starts to the upper layer if a predetermined timer has expired even if there is a lost RLC SDU, or a function of sequentially delivering all RLC SDUs received so far to the upper layer if a predetermined timer has expired even if there is a lost RLC SDU. In addition, the RLC PDUs may be processed in the order (in the order of arrival, out-of-sequence of the serial number and sequence number) in which they are received and delivered to the PDCP device out-of-sequence (out-of-sequence delivery), and in the case of segments, segments stored in the buffer or to be received later are received, reconstructed into one complete RLC PDU, processed, and delivered to the PDCP device. The NR RLC layer may not include a concatenation function, and the function may be performed by the NR MAC layer or replaced with a multiplexing function of the NR MAC layer.

In the above, out-of-sequence delivery of the NR RLC device refers to a function of directly delivering RLC SDUs received from a lower layer to an upper layer regardless of order, and may include a function of reassembling and delivering when originally one RLC SDU is divided into several RLC SDUs and received, and a function of storing the RLC SN or PDCP SN of the received RLC PDUs, arranging the order, and recording the lost RLC PDUs.

The NR MACs 1D-15 and 1D-30 may be connected to several NR RLC layers configured in one UE, and the main function of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1D-20 and 1D-25 channel-codes and modulates the upper layer data, and may perform making an OFDM symbol and transmitting the OFDM symbol through a radio channel, or demodulating an OFDM symbol received through the radio channel, performing channel decoding, and transmitting the OFDM symbol to an upper layer.

FIG. 1E illustrates a diagram of a procedure for a UE to switch from an RRC idle mode to an RRC connected mode in a next-generation mobile communication system according to an embodiment of the disclosure, and is a diagram proposing a method for configuring a protocol layer or functions of the UE.

Referring to FIG. 1E, one cell provided by the base station may service a very wide frequency band. First, the UE may search the entire frequency band provided by the operator (PLMN) in units of a certain resource block (for example, in units of 12 resource blocks (RB)). That is, the UE may start searching for a primary synchronization sequence (PSS)/a secondary synchronization sequence (SSS) in the entire system bandwidth in units of the resource blocks. If the UE detects the signals while searching for the PSS/SSS in units of the resource blocks, the UE may read and interpret (decode) the signals to determine the boundary between the sub-frame and the radio transmission resource frame. In the above, when the synchronization is completed, the UE may read system information of a cell currently camped on. That is, the UE may check master system information block (MIB) or Minimum system information (MSI) to identify control resource set (CORESET) information and read system information to identify initial bandwidth part (BWP) information 1E-01 and 1E-05. In the above, the CORESET information refers to a location of a time/frequency transmission resource through which a control signal is transmitted from a base station, and, for example, indicates a resource location through which a PDCCH channel is transmitted.

As described above, when the UE completes synchronization of the downlink signal with the base station and is ready to receive the control signal, the UE may perform a random access procedure (transmits a random access preamble) in the initial partial bandwidth, receive a random access response (RAR), request RRC connection setup (RRC connection/setup request), and may receive the RRC message (RRC (connection) setup) and perform RRC connection setup (RRC (connection) setup complete) 1E-10, 1E-15, 1E-20, 1E-25, and 1E-30.

When the UE successfully completes the random access procedure with the base station (or cell), the UE may perform a secure connection establishment procedure by transmitting and receiving a non-access stratum (NAS) message, an access stratum (AS) message, or an RRC message with a core network (or base station) through the base station (security mode command and security mode complete) 1E-31 and 1E-32. In the above procedure, the core network or the base station may configure a security key, a security algorithm (e.g., a ciphering algorithm or an integrity protection algorithm), a security algorithm input parameter, a ciphering setting, an integrity protection procedure setting, or an update parameter for security key derivation to the UE.

When the basic RRC connection establishment is completed in the above, the base station may transmit an RRC message inquiring about the capability of the UE to the UE in order to check the capability of the UE (UECapabilityEnquiry) 1E-35. In another method, the base station may ask the MME or AMF for the capability of the UE in order to check the capability of the UE. This is because, if the UE has previously accessed, the MME or AMF may have stored the capability information of the UE.

In the above, when the UE performs a UE capability report procedure 1E-40, the RRC message (e.g., non-access stratum (NAS) message or access stratum (AS) message, and UE capability information) for reporting the UE capability may include some or a plurality of pieces of information among the following information.

- Whether to support integrity protection procedures (or functions) per bearer
- Whether the integrity protection procedure is supported for DRB
- Information on the functions supported by the UE
- Release information supported by the UE. For example, Rel-15 or Rel-16 or Rel-17 and the like. For example, if the UE supports only Rel-15, when the base station or the network supports the integrity protection procedure for the DRB, the integrity protection procedure may be considered that only the data rate of 64 kbps is supported, or the integrity protection procedure function for the DRB may be checked through the UE's capability report message (e.g., non-access stratum (NAS) message or access stratum (AS) message). As another method, if the UE supports Rel-15 or Rel-16, when the base station or the network supports the integrity protection procedure for the DRB, the integrity protection procedure may be considered to always be supported regardless of the data rate, or the integrity protection procedure function for the DRB may be checked through the UE's capability report message (e.g., non-access stratum (NAS) message or access stratum (AS) message).
- Whether to support data protection procedures or data protection release procedures for each tier device. For example, the MAC layer may include information on whether a data protection procedure (ciphering or integrity protection) or a data protection release (deciphering or integrity verification) procedure is supported.

When the base station receives the UE capability report message from the UE in the above 1E-40, the base station or the network may configure the data protection procedure or data protection release procedure to the UE through an RRC message (e.g., RRCReconfiguration message, RRCSetup message, or RRCResume message) for each bearer or each layer 1E-45 and 1E-70.

If there is no UE capability information desired by the base station, the base station may request UE capability from the UE.

The reason why the base station transmits an RRC message to the UE to check the performance of the UE is to check the performance of the UE, for example, to determine how wide of a frequency band the UE can read, the region of the frequency band that can be read, or how the UE supports which function. In addition, the base station may configure an appropriate partial bandwidth (BWP) or appropriate functions to the UE after determining the performance of the UE. When the UE receives the RRC message inquiring about the capability of the UE, the UE may transmit to the base station including UE capability information on the functions supported by the UE in response to the RRC message 1E-40.

In the above, the UE may receive bearer configuration information, cell group configuration information, or cell configuration information or each layer information (e.g., SDAP layer, PDCP layer, RLC layer, MAC layer, or PHY layer) through an RRCSetup message, an RRCResume message 1E-25, an RRCReconfiguration message 1E-45 and 1E-70 of RRC connection establishment, and the RRC message may include configuration information for a PCell, Pscell, or a plurality of cells, and may configure a plurality of partial bandwidths for each cell (PCell, Pscell, or Scell). In the above, when the UE receives the RRCReconfiguration message in which the configuration information of the UE is received 1E-45, 1E-70, the UE may apply the configuration information to the bearer or layer of the UE, configure RRCReconfigurationComplete messages 1E-50, 1E-75 indicating that the reconfiguration is complete, and transmit the RRCReconfigurationComplete messages to the base station.

In addition, when the base station or network instructs the UE to handover to another cell or frequency, a handover message (RRCReconfiguration message) 1E-85 including configuration information of the target base station for handover may be configured and transmitted to the UE, and the UE performs a handover procedure (e.g., random access procedure or synchronization procedure to the target base station, etc.) according to the handover setting 1E-100, and if the handover is successfully performed, the UE may construct and transmit RRCReconfigurationComplete messages (1e-95, 1e-90) to the target base station. The configuration information of the target base station may include bearer configuration information, cell group configuration information, cell configuration information, or each layer information (e.g., SDAP layer, PDCP layer, RLC layer, MAC layer, or PHY layer).

In addition, in the RRC message (RRCSetup message, RRCResume message (1e-25), or RRCReconfiguration message 1E-45 and 1E-70), bearer configuration information, cell group configuration information, cell configuration information, or each layer information (e.g., SDAP layer, PDCP layer, RLC layer, MAC layer, or PHY layer) of the UE may be configured, and the following information may be included 1E-55 and 1E-80.

- An indicator (or enable or disable indicators) indicating whether to configure the data protection procedure or data protection release procedure of each layer (e.g., MAC layers) for each uplink or downlink for each bearer or for each layer.
- Configuration information for performing a data protection procedure or data protection release procedure of each layer (e.g., MAC layer) for downlink or uplink. For example, the configuration information may include information about a security key, security algorithm, update parameter, security algorithm input parameters, or time parameter setting information.

Configuration information indicating whether to activate or deactivate, reconfigure or release the data protection procedure, or data protection release procedure configured in each layer (e.g., MAC layer) for downlink or uplink.

As another method, instead of the RRC message as described above, new MAC control information (MAC CE) is defined for downlink or uplink to MAC CE, and the data protection procedure or data protection release procedure configured in each layer (e.g., MAC layers) may be transmitted by including configuration information indicating whether to activate or deactivate, reconfigure or cancel the data protection procedure. The RRC message may be configured to the UE, including a security key, a security algorithm (e.g., a ciphering algorithm or an integrity protection algorithm), a security algorithm input parameter, whether ciphering is configured, whether an integrity protection procedure is configured, or an update parameter for derivation of a security key.

FIG. 1F illustrates a diagram of the structure of a protocol layer according to an embodiment of the disclosure.

In FIG. 1F, when the UE receives the RRC message from the base station as in FIG. 1E, UE may receive the UE's connection configuration information, bearer configuration information, or protocol layer information, and may establish and configure protocol layers as in 1F-05. For example, one PHY layer and a MAC layer may be established, and a plurality of bearers may be established and connected to the MAC layer to be configured. The bearers may be configured by each RLC layer or a PDCP layer.

FIGS. 1GA to 1GC illustrate a procedure that data received from an upper layer is processed by each protocol layer of a bearer and the data is transmitted, or the data received from a lower layer is processed by each protocol layer of a bearer and the data is delivered to the upper layer in the next-generation mobile communication system according to an embodiment of the disclosure.

As in FIGS. 1GA to 1GC, if a ciphering procedure or security key setting information is configured in the PDCP layer, the UE may perform a ciphering procedure by deriving security keys from the RRC layer and applying the derived security keys when establishing or re-establishing the PDCP layer. As in 1G-05, when the PDCP layer receives data (e.g., PDCP SDU) from the upper layer, if the header compression procedure is configured or the ciphering procedure is configured through the RRC message as in FIG. 1E, a header compression procedure is performed on the data or a ciphering procedure is performed on the data, a PDCP serial number is assigned, and a PDCP header is configured to transmit the data as a PDCP PDU to a lower layer. The data (PDCP PDU) may be delivered to the MAC layer by setting the RLC serial number and header field values, and attaching the RLC header in the RLC layer, and the MAC layer may set the length of the data, set the MAC subheader field values such as the length field and the logical channel identifier corresponding to the data, attach the MAC subheader, and transmit the data to the lower layer 1G-15. The RLC layer may perform a data partitioning procedure if necessary or when uplink transmission resources are insufficient, and may update field values of the RLC header or configure partition information.

In 1G-10, when the UE receives data from the lower layer, the UE may read the MAC subheader and check the length field to separate the data, or check the logical channel identifier and de-multiplex and deliver the data to the corresponding RLC layer. In the above, when the RLC layer receives the data, the RLC layer may read the RLC header and check whether the data is divided, remove the RLC header for undivided data and deliver the data to the PDCP layer, store the divided data in a buffer, and reassemble to form complete data when all the divided data for the RLC serial number corresponding to the divided data are received, and transmit the reassembled data to the PDCP layer. In the above, when the ciphering procedure is configured, the PDCP layer may perform a deciphering procedure, and if the decoded data is sorted in the order of the PDCP serial number or COUNT value, or if the header compression procedure is configured, the PDCP layer may apply a header decompression procedure to the data, and deliver the data to an upper layer in an ascending order of the COUNT value. If the header compression procedure is not configured in the above, the header compression procedure or the header decompression procedure may be omitted.

The ciphering procedure described above may be extended and applied to the data protection procedure of the MAC layer proposed in the disclosure.

When a header compression procedure, an integrity protection procedure, or a ciphering procedure is configured in the PDCP layer as in 1G-20, the transmission PDCP layer may apply a header compression procedure to the upper layer data, perform an integrity protection procedure on header compressed data or PDCP header, attach a 4-byte MAC-I field to the back, and apply a ciphering procedure to the data to which the integrity protection procedure is applied and the MAC-I field. In addition, as in 1G-25, the receiving PDCP layer at the receiver may apply a decoding procedure to the data received from the lower layer, determine whether integrity fails by applying an integrity verification procedure to the decoded data based on the 4-byte MAC-I field attached to the back, discard the data that has failed the integrity verification procedure in the above, and if the data that passed the integrity verification procedure is sorted in the order of the PDCP serial number or COUNT value, or if the header compression procedure is configured, the receiving PDCP layer may apply a header decompression procedure to the data, and transmit the data to an upper layer in an ascending order of the COUNT value. If the header compression procedure is not configured in the above, the header compression procedure or the header decompression procedure may be omitted.

When the header compression procedure or integrity protection procedure is configured in the PDCP layer as in 1G-30, or the ciphering procedure is not configured, the transmitting PDCP layer may apply a header compression procedure to the upper layer data, perform an integrity protection procedure on header compressed data or PDCP header, attach a 4-byte MAC-I field to the back, attach a PDCP header in front of the data to which the integrity protection procedure is applied and the MAC-I field, and deliver the data to the lower layer. In addition, as in 1G-35, the receiving PDCP layer at the receiver may determine whether the integrity fails by applying the integrity verification procedure based on the 4-byte MAC-I field attached to the back of the data received from the lower layer, determine whether integrity fails by applying an integrity verification procedure to the decoded data based on the 4-byte MAC-I field attached at the back, discard the data that has failed the integrity verification procedure in the above, and if the data that passed the integrity verification procedure is sorted in the order of the PDCP serial number or COUNT value, or if the header compression procedure is configured, the receiving PDCP layer may apply a header decompression procedure to the data, and transmit the data to an upper layer in an ascending order of the COUNT value. If the header compression procedure is not configured in the above, the header compression procedure or the header decompression procedure may be omitted.

The data transmitted above is generated and transmitted in a repeated structure of header and data as in 1G-15. For example, the transmitted data has a repeated structure such as header (MAC subheader, RLC header, PDCP header, or SDAP header) and data, header (MAC subheader, RLC header, PDCP header, or SDAP header) and data. Therefore, when generating data having a repeated structure with headers having a fixed size as described above, a hardware accelerator or hardware engine may be applied to reduce data processing time to perform faster data processing. In the above, the hardware accelerator may be applied or called and used when adding or removing the header (MAC subheader, RLC header, PDCP header, or SDAP header) or performing a ciphering procedure, a deciphering procedure, an integrity protection procedure or an integrity verification procedure.

The integrity protection procedure described above may be extended and applied to the data protection procedure of the MAC layer proposed in the disclosure.

FIG. 1H illustrates a diagram of an integrity protection or verification procedure or a ciphering or deciphering procedure in a next-generation mobile communication system according to an embodiment of the disclosure.

When an integrity protection procedure is configured as in 1H-05 of FIG. 1H, the integrity protection procedure may perform the integrity protection procedure based on the security keys derived or applied from the upper layer (e.g., RRC layer or NAS layer), the COUNT value corresponding to the data to which the integrity protection procedure is applied, or the bearer identifiers corresponding to the data. For example, the data to which the integrity protection procedure is to be applied may be calculated according to the integrity protection algorithm in units of 8 bytes (64-bit), and finally a 4-byte (32-bit) MAC-I may be calculated, and the message authentication code for integrity (MAC-I) field may be attached to the end of the data. Conversely, the 4-byte X-MAC field value obtained by applying the integrity verification algorithm to the data received by the receiver is compared with the MAC-I value attached to the data, and if the two values are the same, the integrity verification procedure may determine that integrity verification on the data has been successfully performed. If the two values are different, it may be determined that the integrity verification has failed and the data may be discarded. As such, the integrity protection procedure or the integrity verification procedure is a very complex procedure, has high data processing complexity, and takes a long time to process data.

The data on which the integrity protection procedure has been performed as described above does not change the data itself, but maintains the original data, but adds an additional new field (e.g., MAC-I field) to the back and transmits the data. Accordingly, the data to which the integrity protection procedure is applied may be read by an unspecified number of people, not by a receiving target. However, when an intermediary with arbitrary malicious intent modulates (or compromises) the data, the main purpose is to enable a target receiving the data to check whether the data has been modulated with by checking the new field. For example, if it is determined that the data has been modulated (falsified), the receiving target may discard the data without reading the data. That is, the receiver may read and process only data that has successfully passed the integrity verification procedure.

As in 1H-10, the ciphering procedure may be performed when the ciphering procedure is configured. For example, a key stream having the same length as the data may be generated through a ciphering algorithm based on the security keys derived or applied from the upper layer (e.g., RRC layer or NAS layer), the COUNT value corresponding to the data to which ciphering is applied, or the bearer identifiers corresponding to the data. In addition, ciphered data may be generated by performing an XOR procedure on the generated key stream and the data to be ciphered. As in 1H-15, the deciphering procedure may generate a key stream having the same length as the data through a ciphering (or deciphering) algorithm on the ciphered data based on the security keys derived or applied from the upper layer (e.g., RRC layer or NAS layer) and the COUNT value corresponding to the data to be deciphered or the bearer identifiers corresponding to the data. In addition, original data may be generated by performing an XOR procedure on the generated key stream and the data to be deciphered. That is, on the contrary, the receiver may perform the deciphering procedure by performing an XOR procedure on the ciphered data that has received the key stream generated through the deciphering algorithm. As such, the ciphering procedure or the deciphering procedure is a very complex procedure, the data processing complexity is high, and the data processing time is long.

As described above, data to which the ciphering procedure has been performed changes the data itself. That is, the original data is changed into a new bit stream according to the ciphering algorithm. Accordingly, the data to which the ciphering procedure is applied cannot be read by an unspecified number of people, not by a receiving target. Therefore, the main purpose is to protect personal information by preventing an intermediary with arbitrary malicious intent from reading the data in the middle. That is, only the receiving target can decipher the data to which the ciphering procedure has been applied, change the data to original data, and read the original data.

As described above, the security key used when using the data protection procedure may be a symmetric key or an asymmetric key. The symmetric key refers to a security key used by sharing separate parameters when the transmitter and the receiver have the same master key (e.g., provisioning) and inducing a new key based on their own master key, and when data protection procedure is performed on the data to be transmitted with the security key derived from the transmitter, if the data protection release procedure is successfully performed on the received data with the key derived from the receiver, the security threat may be defended by reading or forwarding the data. In the above, because the symmetric key is shared only with the transmitter and the receiver, the symmetric key may be referred to as a shared key. Because the symmetric key shares the same key between the transmitter and the receiver, a data protection procedure or a data protection release procedure may be performed in both directions.

In addition, an asymmetric key generates a pair of a private key or a secret key and a public key, the receiver has the private key so that it is not disclosed for security, and the public key may be shared with the receiver as a key that does not pose a security threat even if the public key is disclosed to a large number of people. Therefore, if the transmitter performs data protection procedures with the private key on the data to be transmitted, and the receiver successfully performs the data protection release procedure with the public key on the received data, the data may be read or delivered to defend against security threats. In the above, in the asymmetric key, the data protection procedure may be applied only with the private key, and only the data protection release procedure may be performed with the public key. Therefore, data protection procedure may be performed and delivered in only one direction, and if data protection procedure or data protection release procedure needs to be performed in both directions, an additional pair of asymmetric keys may be required.

The data protection procedure or data protection release procedure proposed in the disclosure may be used by applying the above-described symmetric key or asymmetric key as a security key, and may be extended to another security key method.

FIG. 1I illustrates a diagram of a security risk that may occur in a next-generation mobile communication system.

Referring to FIG. 1I, in 1I-01 as described above of the disclosure, the UE may establish an RRC connection with the network (base station or next-generation communication system) and configure security configuration information 1I-05 to perform a data protection procedure or a data protection release procedure in a PDCP layer or an upper layer. The PDCP layer may be configured in the SRB or DRB to enhance security by applying a data protection procedure or data protection release procedure to an RRC message, a user traffic, an application layer data, or data of an upper layer 1I-10.

However, in the next-generation mobile communication system as described above of the disclosure, because the PDCP layer or upper layer performs the data protection procedure or data protection release procedure, there is a security risk because the above procedures cannot be applied to the PDCP control data 1I-15, RLC header, RLC control data (RLC control PDU) 1I-20, MAC subheader, or MAC control information (MAC CE, MAC Control Element) 1I-25. For example, a base station or user with any malicious intent may configure and transmit incorrect PDCP control data, RLC header, RLC control data (RLC control PDU), MAC subheader or MAC control information (MAC CE, MAC Control Element) to a normal UE, thereby performing an attack that causes protocol malfunction or error, or performance degradation. For example, a base station or a user with arbitrary malicious intent may disable some cells with MAC control information to a UE using a plurality of cells to interrupt data transmission or reception, waste transmission resources by requesting a buffer status report that unnecessarily requests a large number of uplink transmission resources from the base station, change the beam-related information important in the high frequency band to MAC control information, thereby lowering the data rate, or configure and transmit RLC control data or PDCP control data arbitrarily to request unnecessary retransmission or to discard data that has not been successfully transmitted. In addition, a user with arbitrary malicious intent may read MAC control information in the middle to grasp and abuse information or location information of another UE.

FIG. 1J illustrates a diagram of a procedure for processing data in protocol layers of a UE or a base station in a next-generation mobile communication system according to an embodiment of the disclosure.

Referring to FIG. 1j, in a next-generation mobile communication system, the UE and the base station may perform a security configuration procedure in the process of establishing the RRC connection as illustrated in FIG. 1E, and in the security configuration procedure, the UE and the base station may perform a procedure for promising security configuration information, such as a security key or security algorithm (e.g., ciphering or deciphering algorithms or integrity protection or integrity protection algorithms, etc.) to be applied in order to perform a data protection procedure or data protection release procedure, or a procedure for configuring or activating a security procedure (e.g., data protection procedures or data protection release procedures). The procedure for promising the security configuration information or the procedure for configuring or activating the security procedure may be performed by exchanging a SecurityModeCommand message or a SecurityModeComplete message between the base station and the UE, or may be performed as an authentication and key agreement (AKA) procedure.

After the security procedure is configured and activated as above, when the UE transmits data for the bearer (SRB or DRB), if the integrity protection procedure is configured, the integrity protection procedures (e.g., applying an integrity protection algorithm) may be performed on the data and the headers (PDCP header, SDAP header, headers (e.g., an uplink data compression (UDC) header or an Ethernet header compression (EHC) header) generated by configuring the header (or data) compression function, or compressed headers or compressed data depending on the configured compression function) to perform an integrity protection procedure on data (PDCP SDU) received from an upper layer by the PDCP layer 1J-10 in the PDCP layer (for example, an integrity protection algorithm may be applied to the headers or data, and the generated MAC-I (Message Authentication Code-Integrity) field may be attached to the back of the data, and the integrity protection procedure may be completed). In addition, the ciphering procedure may be performed on the data received from the upper layer above when the ciphering procedure is configured, or on the data to which the integrity protection is applied when the integrity protection is configured above. In the above, the ciphering procedure may be applied to the remaining parts (e.g., PDCP SDU or, if header compression procedure or data compression procedure is configured, UDC header, EHC header, compressed header, compressed data, data with integrity protection applied, or MAC-I field) except for the PDCP header or SDAP header. If the header compression procedure is configured in the PDCP layer 1J-10 in the above, the header compression procedure (e.g., ROHC (Robust Header Compression) or EHC (Ethernet header compression) function or data compression procedure (UDC (Uplink Data Compression)) or the data compression procedure may be performed before the integrity protection procedure or the ciphering procedure. As described above, the PDCP layer 1J-10 may complete data processing according to the configured function, generate a PDCP PDU based on the PDCP header and data, and transmit the PDCP PDU to the lower layer. If necessary in the above (for example, when the condition for generating PDCP control data (PDCP control PDU) is satisfied), the PDCP layer 1J-10 may generate PDCP control data (for example, a PDCP status report (including information indicating successful data reception corresponding to each PDCP serial number with a 1-bit indicator as ACK or NACK), feedback information for header compression protocol, feedback information for a data compression protocol or information for setting a header compression protocol), and may not apply a data protection procedure (e.g., integrity protection procedures or ciphering procedures) to the PDCP control data. This is because, in the past, it is assumed that security threats can be solved by implementing a base station or a UE after the RRC connection is established, so control data between protocol layers may be considered not to be protected.

In the above, the PDCP PDU may be considered as an RLC SDU in the RLC layer, and data processing may be performed in the RLC layer 1J-20. For example, the RLC layer 1J-20 may perform data division as needed (e.g., when transmission resources are insufficient). In the above, the RLC layer 1J-20 may configure the RLC header to generate an RLC PDU and transmit the RLC PDU to the MAC layer 1J-30. If necessary in the above (for example, when a condition for generating RLC control data (RLC control PDU) is satisfied), the RLC layer 1J-20 may generate RLC control data (e.g., RLC status report (including information indicating successful data reception corresponding to each RLC serial number as ACK or NACK)) and transmit the RLC control data as an RLC PDU to a lower layer to perform transmission. Because only the PDCP layer 1J-10 performs the data protection procedure, the data protection procedure cannot be applied to the RLC control data generated by the RLC layer 1J-20.

The MAC layer 1J-30 may consider the RLC PDU as a MAC SDU, and the MAC layer 1J-30 may receive RLC PDUs from different RLC layers 1J-20 connected to the MAC layer 1J-30. In the above, the MAC layer 1J-30 may generate and concatenate a MAC subheader based on different MAC SDUs to generate each MAC subPDU. In addition, if necessary (for example, according to the generation condition of MAC control information), the MAC layer 1J-30 may configure MAC control information, generate a MAC subheader, and concatenate to generate a MAC subPDU, and the MAC subPDU may include a MAC subheader for padding or a padding and MAC subheader. When configuring the MAC PDU (data unit composed of a plurality of MAC subPDUs), the MAC layer 1J-30 configures downlink data (for example, when the base station transmits data to the UE) based on the MAC subPDU generated above, and if padding is required, the padding may be positioned at the end of the MAC PDU composed of MAC subPDUs, and when the MAC layer includes MAC control information or MAC control information, the MAC layer may place the padding at the front of the MAC PDU and place the MAC SDUs behind the MAC control information. In addition, in the MAC subPDU, the MAC subheader may always be positioned in front of the MAC SDU, MAC control information, or padding, and as described above, the MAC PDU may be configured with MAC subPDUs to be transferred to a lower layer to perform transmission. As described above, in the case of downlink data, important control information, such as MAC control information, is placed first, so that the UE can quickly process the control information. However, because only the PDCP layer 1J-10 performs the data protection procedure, the data protection procedure cannot be applied to the MAC control data generated by the MAC layer 1J-30.

On the other hand, when configuring uplink data (for example, when the UE transmits data to the base station) based on the MAC subPDU generated from the MAC layer 1J-30 above, if padding is required, the padding may be positioned at the end of a MAC PDU composed of MAC subPDUs, and when the MAC layer includes MAC control information or MAC control information, the MAC layer may place the padding at the end of the MAC PDU or if there is padding, MAC control information may be positioned in front of the padding, and the MAC SDUs may be positioned in front of the MAC control information. In addition, in the MAC subheader composed of MAC subheader and MAC SDU, or MAC control information or padding, the MAC subheader may always be positioned in front of the MAC SDU or MAC control information or padding, and as described above, the MAC PDU may be configured with the MAC subPDUs and transferred to a lower layer to perform transmission. As described above, in the case of uplink data, by placing the MAC control information at the back, the UE generates MAC SDUs in advance and processes them quickly, parallel-processes dynamically generated MAC control information to generate MAC control information, and then attaches MAC control information to the back of the pre-processed MAC SDUs to facilitate the implementation of the UE, and data processing speed may be up due to parallel processing. Because only the PDCP layer 1J-10 performs the data protection procedure, the data protection procedure cannot be applied to the MAC control data generated by the MAC layer 1J-30.

At the receiver, when the MAC layer 1J-30 receives a MAC PDU from a lower layer, data is processed in units of MAC subPDUs, and if the MAC subPDU includes MAC control information, the receiver reads and removes the MAC subheader, may determine the type of MAC control information based on the logical channel identifier of the MAC subheader, and may interpret the MAC control information instruction and perform a corresponding procedure. In the above, if the MAC subPDU includes the MAC SDU, the receiver reads and removes the MAC subheader, and the MAC SDU may be delivered as an RLC PDU to the upper layer (RLC layer 1J-20) according to the logical channel identifier included in the MAC subheader. In addition, if the MAC subPDU indicates padding or includes padding, the MAC subPDU corresponding to the padding may be discarded.

The RLC layer 1J-20 that has received the RLC PDU from the MAC layer 1J-30 may read or remove the RLC header and deliver the received RLC SDU as a PDCP PDU to an upper layer (e.g., a PDCP layer 1J-10). If the RLC PDU received above includes the RLC SDU segment, the RLC layer 1J-20 may configure a complete RLC SDU by performing reassembly based on RLC PDUs received based on the RLC serial number, segment information (SI field) or segment offset information (SO field) of the RLC header, and then transmits the complete RLC SDU to the upper layer as a PDCP PDU. If the RLC PDU received from the RLC layer 1J-20 is RLC control data (RLC control PDU), the RLC layer reads and interprets the RLC control data (e.g., RLC status report), and identifies successfully delivered and unsuccessfully delivered data as ACK or NACK information, and if necessary, a retransmission procedure may be performed for data that has not been successfully transmitted. In addition, based on the RLC serial number of the RLC header in the RLC layer 1J-20, duplicate received data or data outside the RLC reception window may be discarded.

The PDCP layer 1J-10 receiving the PDCP PDU from the RLC layer 1J-20 may read the PDCP header and derive a COUNT value based on PDCP serial number information of the PDCP header. In addition, the PDCP layer 1J-10 may discard duplicate received data or data outside the PDCP reception window based on the COUNT value. In addition, the PDCP layer 1J-10 may check the indicator of the received PDCP header, and if the PDCP PDU is a PDCP data PDU and the data protection procedure is configured, the data protection release procedure may be performed. For example, when a ciphering procedure or a deciphering procedure is configured in the PDCP layer 1J-10, the PDCP layer 1J-10 may perform a deciphering procedure on the PDCP SDU except for the PDCP header of the PDCP PDU based on the configured security key, security algorithm, or the COUNT value. In addition, for example, when an integrity protection procedure or integrity verification procedure is configured in the PDCP layer 1J-10, the PDCP layer 1J-10 may perform an integrity verification procedure on the PDCP PDU or the deciphered PDCP SDU and PDCP header based on the configured security key, security algorithm, or the COUNT value. If the data protection release procedure is successfully performed as above, when a header compression function or a data compression function is configured for the PDCP SDU, the PDCP layer 1J-10 may perform a header decompression procedure or a data decompression procedure on the PDCP SDU, and may deliver the PDCP SDU to an upper layer in an ascending order of COUNT values.

When the PDCP layer 1J-10 checks the indicator of the received PDCP header, if the PDCP PDU is a PDCP control PDU, the PDCP layer may directly read PDCP control data (PDCP control PDU) without applying a data protection release procedure (e.g., deciphering procedure or integrity verification procedure) to the PDCP control PDU.

In the above, the PDCP control data may indicate a PDCP status report indicating successful delivery by indicating ACK or NACK information as a bitmap or feedback (interspersed ROHC feedback or EHC feedback) for a header compression function (e.g., robust header compression (ROHC) or ethernet header compression (EHC)) or feedback for a data compression function (e.g., uplink data compression (UDC)).

In the ARQ procedure of the RLC layer 1j-20 operating in the AM mode, RLC control data may indicate an RLC status report indicating including RLC serial number, segment offset (SO), range of RLC serial number (NACK_Range), or RLC serial number successfully received ACK or NACK information.

In the above, MAC control information may indicate MAC control information defined differently according to each logical channel identifier (LCID, Logical Channel Identity, or eLCID (extended LCD)) for downlink or uplink as illustrated in the following tables. For example, the MAC control information may indicate MAC control information defined in the following tables ([Table 1]-[Table 6]) for buffer status report, power headroom report, path loss report, downlink beam setup or uplink beam setup, cell status (activated or deactivated) setup, replication status (activated or deactivated) setup, DRX setup or random access procedure, timing advance (TA) value setting, or channel status report, etc.

TABLE 1

Values of LCID for DL-SCH

| Codepoint/Index | LCID values |
| --- | --- |
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |

TABLE 1-continued

Values of LCID for DL-SCH

| Codepoint/Index | LCID values |
| --- | --- |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

TABLE 2

Values of two-octet eLCID for DL-SCH

| Codepoint | Index | LCID values |
| --- | --- | --- |
| 0 to ($2^{16}$ − 1) | 320 to ($2^{16}$ + 319) | Identity of the logical channel |

TABLE 3

Values of one-octet eLCID for DL-SCH

| Codepoint | Index | LCID values |
| --- | --- | --- |
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

TABLE 4

Values of LCID for UL-SCH

| Codepoint/Index | LCID values |
| --- | --- |
| 0 | CCCH of size 64 bits (referred to as "CCCH1" in TS 38.331 [5]) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |

TABLE 4-continued

Values of LCID for UL-SCH

| Codepoint/Index | LCID values |
| --- | --- |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

TABLE 5

Values of two-octet eLCID for UL-SCH

| Codepoint | Index | LCID values |
| --- | --- | --- |
| 0 to ($2^{16}$ − 1) | 320 to ($2^{16}$ + 319) | Identity of the logical channel |

TABLE 6

Values of one-octet eLCID for UL-SCH

| Codepoint | Index | LCID values |
| --- | --- | --- |
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

As described in FIG. 1J, it can be seen that data protection procedures (ciphering or integrity protection), or data deprotection procedures (deciphering or integrity verification) for PDCP control data (PDCP control PDU), RLC control data (RLC control PDU), MAC control information (MAC CE (Control Element)), RLC header, or MAC subheaders are not applied in the next-generation mobile communication system (LTE system or new radio (NR) system), so it is exposed to security threats.

In addition, according to the protocol structure described in FIG. 1J, it may be seen that all PDCP control data (PDCP control PDU), RLC control PDU, MAC control information (MAC CE (Control Element)), RLC header or MAC subheaders exposed to the security threat must be data processed through the MAC layer. In other words, the most suitable layer to perform the data protection procedure or the data protection release procedure for PDCP control data (PDCP control PDU), RLC control data (RLC control PDU), MAC control information (MAC CE (Control Element)), RLC header, or MAC subheaders may be the MAC layer 1J-30.

Therefore, the disclosure proposes to perform a data protection procedure (ciphering or integrity protection) or a data protection release procedure (deciphering or integrity verification) on the data exposed to the security threat in the MAC layer 1J-30, and when the data protection procedure or the data protection release procedure is performed in the MAC layer 1j-30, it is proposed to configure different data structures for downlink data or uplink data, respectively, and when each data structure is proposed, a data structure suitable for a UE implementation or a base station implementation is described and proposed.

In addition, different data protection procedures or data protection release procedures and different data structures are proposed according to the degree of security risk or the type of data that needs to be strengthened.

Data protection method 1-1: A method of applying a data protection procedure or data protection release procedure to all MAC PDUs for uplink data and a data structure suitable for UE implementation or base station implementation Data protection method 1-2: A method of applying a data protection procedure or data protection release procedure to PDCP control data (PDCP control PDU), RLC control data (RLC control PDU), MAC control information (MAC CE (Control Element)), MAC SDU corresponding to RLC header, or MAC subPDU (e.g., MAC subheader and MAC SDU) for uplink data and a data structure suitable for UE implementation or base station implementation Data protection method 1-3: A method of applying a data protection procedure or data protection release procedure to MAC SDU corresponding to MAC control information (MAC CE (Control Element)) or MAC subPDU (e.g., MAC subheader and MAC SDU) for uplink data, and a data structure suitable for a UE implementation or a base station implementation Data protection method 2-1: A method of applying a data protection procedure or data protection release procedure to all MAC PDUs for downlink data and a data structure suitable for UE implementation or base station implementation Data protection method 2-2: A method of applying a data protection procedure or data protection release procedure to PDCP control data (PDCP control PDU), RLC control data (RLC control PDU), MAC control information (MAC CE (Control Element)), MAC SDU corresponding to RLC header, or MAC subPDU (e.g., MAC subheader and MAC SDU) for downlink data and a data structure suitable for UE implementation or base station implementation Data protection method 2-3: A method of applying a data protection procedure or data protection release procedure to MAC SDU corresponding to MAC control information (MAC CE (Control Element)) or MAC subPDU (e.g., MAC subheader and MAC SDU) for downlink data, and a data structure suitable for a UE implementation or a base station implementation In the following of the disclosure, a method of applying different data protection procedures or data protection release procedures to uplink data and downlink data in a MAC layer is proposed.

For example, if the data to which the data protection procedure or data protection release procedure is applied in the MAC layer is uplink data (e.g., data transmitted from the UE or data received by the base station), the data protection method of Article 1-1, the data protection method of 1-2, or the data protection method of Article 1-3 may be applied, and if the data to which the data protection procedure or data protection release procedure is applied in the MAC layer is downlink data (e.g., data received by the UE or data transmitted from the base station), the data protection method of Article 2-1, the data protection method of 2-2, or the data protection method of Article 2-3 may be applied.

As another method, the integrity protection procedure (or integrity verification procedure) or the ciphering procedure (or deciphering procedure) performed in the MAC layer in the disclosure may be different from among the proposed methods. For example, when the data protection method is applied to uplink data, the data protection method of 1-1 may be applied to the integrity protection procedure and the data protection method 1-3 may be applied to the ciphering procedure. Similarly, for example, when the data protection method is applied to downlink data, the data protection method of 2-1 can be applied to the integrity protection procedure and the data protection method 2-3 can be applied to the ciphering procedure.

FIGS. 1KA to 1KC illustrate the data protection method 1-1 proposed for uplink data according to an embodiment of the disclosure.

FIGS. 1KA to 1KC suggest that the MAC layer perform a data protection procedure or a data protection release procedure in order to strengthen the security for PDCP control data (PDCP control PDU), RLC control data (RLC control PDU), MAC control information (MAC CE (Control Element)), RLC header, or MAC subheaders exposed to the security threat described in the disclosure.

As in 1K-10, when the MAC layer generates MAC subPDUs and configures uplink data (for example, when the UE transmits data to the base station) based on the MAC subPDUs, if padding is required, the padding may be positioned at the end of a MAC PDU composed of MAC subPDUs, and in the case of including MAC control information or pieces of MAC control information, the MAC control information may be located at the end of the MAC PDU, or if there is padding, the MAC control information may be placed before padding, and the MAC SDUs may be located before MAC control information. In addition, in a MAC subPDU consisting of a MAC subheader, and MAC, MAC control information or padding, the MAC subheader may always be placed in front of the MAC SDU, MAC control information or padding, and as described above, a MAC PDU may be composed of MAC subPDUs and delivered to a lower layer to perform transmission. As described above, in the case of uplink data, by placing the MAC control information at the back, the UE generates MAC SDUs in advance and processes them quickly, parallel-processes dynamically generated MAC control information to generate MAC control information, and then attaches MAC control information to the back of the pre-processed MAC SDUs to facilitate the implementation of the UE, and data processing speed may be up due to parallel processing.

As in 1K-15, if the data protection procedure (ciphering procedure or integrity protection procedure) is configured in the MAC layer, for example, when the integrity protection procedure is configured, the MAC layer may apply an integrity protection procedure to all MAC PDUs 1K-16, generate a first field (e.g., digital signature (DS) field or MAC-I (Message Authentication Code-Integrity) field) generated as a result of the integrity protection procedure, and place the first field at the beginning of the MAC PDU. In the above, the MAC layer may allocate or define a separate logical channel identifier (LCID) so that the receiving MAC layer can distinguish the first field, consider the first field as a MAC SDU, generate a MAC subheader including a logical channel identifier indicating the first field, attach the MAC subheader to the front of the first field to configure a MAC subPDU, and then place the MAC subPDU at the beginning of the MAC PDU. As another method, when the integrity protection procedure is configured in the MAC layer, while performing the procedure proposed above, without allocating or defining a logical channel identifier for the first field, without configuring the MAC subheader, only the first field of a constant size is always attached to the front of the MAC PDU, so that the receiver may read the first field of the constant size at the front. In this way, it is possible to reduce the overhead by the size of the MAC subheader.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer.

As another method, as in 1K-20, if the data protection procedure (ciphering procedure or integrity protection procedure) is configured in the MAC layer, for example, if the integrity protection procedure is configured, the MAC layer may apply an integrity protection procedure to all MAC PDUs 1K-23, generate a first field (e.g., digital signature (DS) field or MAC-I (Message Authentication Code-Integrity) field) generated as a result of the integrity protection procedure, and place the first field at the beginning of the MAC PDU. In the above, if the MAC PDU includes padding or MAC subheaders 1K-24 corresponding to padding, processing complexity may be reduced by not applying the integrity protection procedure to the padding (or MAC SDU) or the MAC subheader corresponding to the padding. In the above, the MAC layer may allocate or define a separate logical channel identifier (LCD) so that the receiving MAC layer can distinguish the first field, consider the first field as a MAC SDU 1K-22, generate a MAC subheader 1K-21 including a logical channel identifier indicating the first field, attach the MAC subheader to the front of the first field to configure a MAC subPDU, and then place the MAC subPDU at the beginning of the MAC PDU. As another method, when the integrity protection procedure is configured in the MAC layer, while performing the procedure proposed above, without allocating or defining a logical channel identifier for the first field, without configuring the MAC subheader, only the first field 1K-25 of a constant size is always attached to the front of the MAC PDU, so that the receiver may read the first field of the constant size at the front. In this way, it is possible to reduce the overhead by the size of the MAC subheader.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. As another method, when padding or a subheader corresponding to padding is included in the entire MAC PDU, processing complexity may be reduced by not performing a ciphering procedure on the padding or subheader corresponding to padding.

As another method, in the above, if the data protection procedure (ciphering procedure or integrity protection procedure) is configured in the MAC layer, for example, when integrity protection procedures are configured, the MAC layer may apply an integrity protection procedure to all MAC PDUs, generate a first field (e.g., DS (Digital Signature) field or MAC-I (Message Authentication Code-Integrity) field) generated as a result of the integrity protection procedure, and place the first field at the end of the MAC PDU. In the above, the MAC layer may allocate or define a separate logical channel identifier so that the receiving MAC layer can distinguish the first field, consider the first field as a MAC SDU, generate a MAC subheader including a logical channel identifier indicating the first field, attach the MAC subheader to the front of the first field to construct a MAC subPDU, and then place the MAC subPDU at the end of the MAC PDU. As another method, when the integrity protection procedure is configured in the MAC layer, while performing the procedure proposed above, without allocating or defining a logical channel identifier for the first field, without configuring the MAC subheader, only the first field of a constant size is always attached to the end of the MAC PDU, so that the receiver may read the first field of the constant size at the front. In this way, it is possible to reduce the overhead by the size of the MAC subheader. When a padding or a header for padding is included in the MAC PDU, because the L field (length field) is not included in the MAC subheader, for the padding, the receiving MAC layer cannot distinguish the first field attached to the end of the MAC PDU. That is, because the size of the padding cannot be known, the first field attached back to the padding cannot be distinguished. Therefore, when the data protection procedure is configured in the MAC layer as described above, if padding is included in the MAC PDU, a length field or a new field may be introduced to transmit information indicating the location of the first field. For example, the indication information may be included in a MAC subheader (e.g., a MAC subheader for padding).

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. For example, when a header for padding or padding is included in the MAC PDU so as to maximize implementation convenience by directly applying a decoding procedure to all data received by the receiver, a ciphering procedure may be performed including the padding or a header for padding. As another method, when padding or a subheader corresponding to padding is included in the entire MAC PDU, processing complexity may be reduced by not performing a ciphering procedure on the padding or subheader corresponding to padding.

As another method, like 1K-30 in the above, if the data protection procedure (ciphering procedure or integrity protection procedure) is configured in the MAC layer, for example, when integrity protection procedures are configured, the MAC layer may apply an integrity protection procedure to all MAC PDUs 1K-32, generate a first field (e.g., DS (Digital Signature) field or MAC-I (Message Authentication Code-Integrity) field) generated as a result of the integrity protection procedure, and place the first field at the end of the MAC PDU. In the above, if the MAC PDU includes padding or MAC subheaders 1k-33 corresponding to padding, processing complexity may be reduced by not applying the integrity protection procedure to the padding (or MAC SDU) or the MAC subheader corresponding to the padding, and the first field may be positioned in front 1K-31 and 1K-34 of the padding or MAC subheader corresponding to the padding. Because when a padding or a header for padding is included in the MAC PDU, because the L field (length field) is not included in the MAC subheader, for the padding, the receiving MAC layer cannot distinguish the first field attached to the end of the MAC PDU. That is, because the size of the padding cannot be known, the first field attached back to the padding cannot be distinguished, so the first field must be positioned before the padding. In the above, the MAC layer may allocate or define a separate logical channel identifier (LCID) so that the receiving MAC layer can distinguish the first field, consider the first field as a MAC SDU 1K-31, generate a MAC subheader 1K-31 including a logical channel identifier indicating the first field, attach the MAC subheader to the front of the first field to configure a MAC subPDU, and then place the MAC subPDU 1K-31 at the end of the MAC PDU. As another method, when the integrity protection procedure is configured in the MAC layer, while performing the procedure proposed above, without allocating or defining a logical channel identifier for the first field, without configuring the MAC subheader, only the first field 1K-34 of a constant size is always attached to the end 1K-34 of the MAC PDU, so that the receiver may read the first field of the constant size at the end. In this way, it is possible to reduce the overhead by the size of the MAC subheader. In the above, if the MAC PDU includes padding or a MAC subheader corresponding to padding, processing complexity may be reduced by not applying an integrity protection procedure to the padding (or MAC SDU) or the MAC subheader corresponding to the padding, and the first field may be positioned in front 1K-34 of the MAC subheader corresponding to the padding or padding.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. For example, when a header for padding or padding is included in the MAC PDU so as to maximize implementation convenience by directly applying a decoding procedure to all data received by the receiver, a ciphering procedure may be performed including the padding or a header for padding. As another method, when padding or a subheader corresponding to padding is included in the entire MAC PDU, processing complexity may be reduced by not performing a ciphering procedure on the padding or subheader corresponding to padding.

If the receiving MAC layer receives data (e.g., MAC PDU) to which the data protection method 1-1 for uplink data proposed in FIGS. 1KA to 1KC is applied, when a ciphering procedure or a deciphering procedure is configured in the MAC layer, the receiving MAC layer may apply the deciphering procedure to the entire MAC PDU or the data part to which ciphering is applied to the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the MAC PDU may be discarded.

FIGS. 1LA to 1LC illustrate the data protection method 1-2 proposed for uplink data according to an embodiment of the disclosure.

FIGS. 1LA to 1LC suggest that the MAC layer performs a data protection procedure or a data protection release procedure in order to strengthen the security for PDCP control data (PDCP control PDU), RLC control data (RLC control PDU), MAC control information (MAC CE (Control Element)), RLC header, or MAC subheaders exposed to the security threat described in the disclosure.

As in 1L-10, when the MAC layer generates MAC subPDUs and configures uplink data (for example, when the UE transmits data to the base station) based on the MAC subPDUs, if padding is required, the padding may be positioned at the end of a MAC PDU composed of MAC subPDUs, and in the case of including MAC control information or pieces of MAC control information, the MAC control information may be located at the end of the MAC PDU, or if there is padding, the MAC control information may be placed before padding, and the MAC SDUs may be located before MAC control information. In addition, in a MAC subPDU consisting of a MAC subheader, and MAC, MAC control information or padding, the MAC subheader may always be placed in front of the MAC SDU, MAC control information or padding, and as described above, a MAC PDU may be composed of MAC subPDUs and delivered to a lower layer to perform transmission. As described above, in the case of uplink data, by placing the MAC control information at the back, the UE generates MAC SDUs in advance and processes them quickly, parallel-processes dynamically generated MAC control information to generate MAC control information, and then attaches MAC control information to the back of the pre-processed MAC SDUs to facilitate the implementation of the UE, and data processing speed may be up due to parallel processing.

As in 1L-20, if the data protection procedure (ciphering procedure or integrity protection procedure) is configured in the MAC layer, for example, when the integrity protection procedure is configured, the MAC layer may apply an integrity protection procedure to data (e.g., PDCP control data (PDCP control PDU), RLC control data (RLC control PDU), MAC control information (MAC CE (Control Element)), RLC header, MAC subheader, PDCP header, type of data configured in RRC, MAC SDU, or MAC subPDU) 1L-21 and 1L-23 to which the integrity protection procedure should be applied, generate a first field (for example, DS (Digital Signature) field or MAC-I (Message Authentication Code-Integrity) field) generated as a result of the integrity protection procedure, and place the first field after 1L-22 and 1L-24 or before the data (MAC SDU or MAC subPDU). For example, the integrity protection procedure may be selectively applied only to a specific MAC subPDU as described above among MAC subPDUs included in the MAC PDU. Considering that the size of the MAC PDU transmitted in the next-generation mobile communication system may be up to 150,000 bytes, if the data protection procedure is applied only to data selectively exposed to security threats as described above, the data protection procedure only needs to be applied to about 1,000 bytes, so that processing complexity may be reduced and data processing speed may be increased. In the above, if the MAC PDU includes padding or MAC subheaders 1L-25 corresponding to padding, processing complexity may be reduced by not applying the integrity protection procedure to the padding (or MAC SDU) or the MAC subheader 1L-25 corresponding to the padding. In the above, the MAC layer may allocate or define a separate logical channel identifier so that the receiving MAC layer can distinguish the first field, consider the first field as a MAC SDU 1L-22, generate a MAC subheader 1L-26 including a logical channel identifier indicating the first field, attach the MAC subheader to the front of the first field to construct a MAC subPDU, and then place the MAC subPDU after 1L-22 and 1L-24 or before the data (data with integrity protection applied, MAC SDU or MAC subPDU). In another method, when the integrity protection procedure is configured in the MAC layer, the receiver may read the first field of the constant size before or after each data to which integrity protection is applied, while performing the procedure proposed above, by without assigning or defining the logical channel identifier for the first field, without configuring the MAC subheader, always attaching only the first field 1L-27 of a constant size to before or after 1L-22 and 1L-24 the data (data with Integrity Protection applied, MAC SDU or MAC subPDU), defining a new second field in the MAC subheader 1L-21 of the data to indicate whether the integrity protection procedure has been applied (or whether data protection procedures have been applied), and indicating that the first field exists before or after the data. In this way, it is possible to reduce the overhead by the size of the MAC subheader. As described above, if the first field 1L-22 and 1L-24 is placed after the MAC SDU or MAC subPDU 1L-20 and 1L-23, the structure may be suitable for implementing parallel processing because each MAC subPDU can be read and the first field value calculated later can be placed at back while applying the data protection procedure. On the other hand, if the first field 1L-22 and 1L-24 is placed at the beginning of the MAC SDU or MAC subPDU 1L-20 and 1L-23, there is an advantage that the receiving MAC layer can read the first field first.

As another method, when performing the procedure proposed above, for uplink data such as 1L-40 or 1L-50, because MAC control information 1L-42 and 1L-52 is positioned at the end of the MAC PDU or before the padding 1L-43, the integrity protection procedure may be applied to the plurality of MAC control information 1L-42 and 1L-52 or to the plurality of MAC control information to which the integrity protection procedure is to be applied as a group, and the first field may be positioned after the last MAC control information among the plurality of MAC control information 1L-42 and 1L-52 or before the padding. As another method, the first field may be positioned in front of the first MAC control information among the plurality of MAC control information 1L-42 and 1L-52. In this way, implementation complexity may be reduced by allowing the integrity protection procedure to be applied to a plurality of pieces of MAC control information at the same time, and overhead may also be reduced by reducing the number of first fields.

In the above, if the ciphering procedure is configured in the MAC layer, the ciphering procedure may be performed on data (for example, PDCP control data (PDCP control PDU) or RLC control data (RLC control PDU) or MAC control information (MAC CE (Control Element)) or RLC header or MAC subheader or PDCP header or type of data configured through RRC or MAC SDU or MAC subPDU) to which the ciphering procedure should be applied (or, if the integrity protection procedure is configured, the integrity-protected MAC SDU or the first field). In addition, data (MAC PDU) including data to which integrity protection or ciphering procedure is applied may be transmitted to a lower layer. As another method, when padding or a subheader corresponding to padding is included in the MAC PDU, processing complexity may be reduced by not performing a ciphering procedure on the padding or subheader corresponding to padding.

As another method, when performing the procedure suggested above, because MAC control information 1L-42 and 1L-52 is located at the end of the MAC PDU or before padding for uplink data such as 1L-40 or 1L-50, a ciphering procedure may be applied as a group to the plurality pieces of MAC control information 1L-42 and 1L-52 or the plurality pieces of MAC control information 1L-42 and 1L-52 to which a ciphering procedure should be applied. In this way, the implementation complexity may be reduced by allowing the ciphering procedure to be applied to a plurality of MAC control information at the same time.

When applying the data protection method 1-2 proposed above in the MAC layer, the integrity protection procedure is applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the integrity protection procedure should be applied, that is, the integrity protection procedure or the integrity verification procedure is applied in units of MAC subPDUs 1L-21, 1L-23, 1L-40, and 1L-41, thereby enhancing security. As another method, when applying the data protection method 1-2 proposed above in the MAC layer, the integrity protection procedure may be applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the integrity protection procedure should be applied, that is, the integrity protection procedure or the integrity verification procedure may be applied in units of MAC SDUs 1L-30, 1L-31, 1L-32, 1L-33, 1L-50, and 1L-51 except for the MAC subheader, thereby reducing implementation complexity.

When applying the data protection method 1-2 proposed above in the MAC layer, the ciphering procedure is applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the ciphering procedure should be applied, that is, the ciphering procedure or deciphering procedure is applied in units of MAC subPDUs 1L-21, 1L-23, 1L-40, and 1L-41, thereby enhancing security. As another method, when applying the data protection method 1-2 proposed above in the MAC layer, the ciphering procedure may be applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the ciphering procedure should be applied, that is, the ciphering procedure or deciphering procedure may be applied in units of MAC SDUs 1L-30, 1L-31, 1L-32, 1L-33, 1L-50, and 1L-51 except for the MAC subheader, thereby reducing implementation complexity.

In the above, the data (for example, PDCP control data (PDCP control PDU), RLC control data (RLC control PDU), MAC control information (MAC CE (Control Element)), RLC header, MAC subheader, PDCP header, MAC SDU, or MAC subPDU) to which the data protection procedure should be applied may be defined or promised as specific data between the UE and the base station, or may be configured as an RRC message as illustrated in FIG. 1E. For example, a data protection procedure or a data protection release procedure may be applied only to specific MAC CEs (or MAC SDUs) or MAC subPDUs corresponding to specific MAC CEs (for example, MAC control information (MAC CE) for instructing activation or deactivation of each SCell to a UE in which a plurality of SCells are configured for carrier aggregation or one or a plurality of MAC CEs among the MAC CEs listed in the disclosure) among PDCP control data (PDCP control PDU), RLC control data (RLC control PDU), MAC control information (MAC CE (Control Element)), RLC header, MAC subheader, PDCP header, MAC SDU, or MAC subPDU. As another method, if the data protection procedure is applied only to specific MAC CEs among the MAC CEs included in the uplink data, by positioning MAC CEs to which the data protection procedure is applied at the back of the MAC PDU than the MAC CEs to which the data protection procedure is not applied, the receiver may read MAC CEs to which the data protection release procedure is not applied first, so that the receiver can speed up data processing and read MAC control information quickly. This is because MAC CEs to which the data protection release procedure is applied may be read only after the data protection release procedure is completed. In the above, data to which the data protection procedure should be applied may be classified in the UE and the base station based on PDCP header, RLC header, or field information (e.g., D/C field (data/control) or logical channel identifier) of the MAC header.

If the receiving MAC layer receives data (e.g., MAC PDU) to which the data protection method 1-2 for uplink data proposed in FIGS. 1LA to 1LC is applied, and if a ciphering procedure or a deciphering procedure is configured in the MAC layer, the receiving MAC layer may apply the deciphering procedure to the data part to which ciphering is applied in the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the failed MAC PDU may be discarded.

As described above, if the MAC layer applies the data protection method 1-2 proposed in the disclosure to MAC SDU or MAC subPDU including specific data (e.g., RLC control PDU, PDCP control PDU, or MAC CE), the receiver may indicate whether data protection methods are applied or not by introducing an indicator in the MAC subheader so that the receiver can check whether the data protection method is applied to the MAC SDU or MAC subPDU and decide whether to apply the data protection release procedure. For example, if data protection procedure is applied to MAC SDU or MAC subPDU including specific data (e.g., RLC control PDU or PDCP control PDU or MAC CE) when transmitting data (MAC PDU), the MAC layer may indicate whether a data protection procedure has been applied by setting an indicator in the MAC subheader of the specific data, and if data protection procedures are not applied to some data, the MAC layer may indicate that the data protection procedure is not applied by setting (or un-setting) an indicator in the MAC subheader. In addition, for example, when the MAC layer processes the received data (MAC PDU) and applies the data protection release procedure, the MAC layer checks the MAC subheader of each MAC subPDU, when the indicator indicates that the data protection procedure is applied, the MAC layer applies the data protection release procedure to the MAC SDU or MAC subPDU corresponding to the MAC subheader, and if the indicator indicates that the data protection procedure is not applied, the MAC layer may not apply the data protection release procedure to the MAC SDU or MAC subPDU corresponding to the MAC subheader.

FIGS. 1MA to 1MC illustrate the data protection method 1-3 proposed for uplink data according to an embodiment of the disclosure.

FIGS. 1MA to 1MC suggest that the MAC layer perform a data protection procedure or a data protection release procedure in order to strengthen the security for MAC control information (MAC CE (Control Element)) or MAC subheaders exposed to the security threat described in the disclosure.

As in 1M-10, when the MAC layer generates MAC subPDUs and configures uplink data (for example, when the UE transmits data to the base station) based on the MAC subPDUs, if padding is required, the padding may be positioned at the end of a MAC PDU composed of MAC subPDUs, and in the case of including MAC control information or pieces of MAC control information, the MAC control information may be located at the end of the MAC PDU, or if there is padding, the MAC control information may be placed before padding, and the MAC SDUs may be located before MAC control information. In addition, in a MAC subPDU consisting of a MAC subheader, and MAC, MAC control information or padding, the MAC subheader may always be placed in front of the MAC SDU, MAC control information or padding, and as described above, a MAC PDU may be composed of MAC subPDUs and delivered to a lower layer to perform transmission. As described above, in the case of uplink data, by placing the MAC control information at the back, the UE generates MAC SDUs in advance and processes them quickly, parallel-processes dynamically generated MAC control information to generate MAC control information, and then attaches MAC control information to the back of the pre-processed MAC SDUs to facilitate the implementation of the UE, and data processing speed may be up due to parallel processing.

As in 1M-20, if the data protection procedure (ciphering procedure or integrity protection procedure) is configured in the MAC layer, for example, when the integrity protection procedure is configured, the MAC layer may apply an integrity protection procedure to data (e.g., MAC control information (MAC CE (Control Element)), MAC subheader, type of data configured in RRC, MAC SDU, or MAC subPDU) 1M-21 to which the integrity protection procedure should be applied, generate a first field (for example, DS (Digital Signature) field or MAC-I (Message Authentication Code-Integrity) field) generated as a result of the integrity protection procedure, and place the first field after 1M-22 or before the data (MAC SDU or MAC subPDU). For example, the integrity protection procedure may be selectively applied only to a specific MAC subPDU 1M-21 (e.g., specific data including MAC CE) (for example, MAC control information (MAC CE) for instructing activation or deactivation of each SCell to a UE in which a plurality of SCells are configured for carrier aggregation or one or a plurality of MAC CEs among the MAC CEs listed in the disclosure) as described above among MAC subPDUs (e.g., data including MAC CE) included in the MAC PDU. Considering that the size of the MAC PDU transmitted in the next-generation mobile communication system may be up to 150,000 bytes, if the data protection procedure is applied only to data selectively exposed to security threats as described above, the data protection procedure only needs to be applied to about 1,000 bytes, so that processing complexity may be reduced and data processing speed may be increased. In the above, if the MAC PDU includes padding or MAC subheaders 1M-23 corresponding to padding, processing complexity may be reduced by not applying the integrity protection procedure to the padding (or MAC SDU) or the MAC subheader corresponding to the padding. In the above, the MAC layer may allocate or define a separate logical channel identifier so that the receiving MAC layer can distinguish the first field, consider the first field as a MAC SDU 1M-22, generate a MAC subheader 1L-26 including a logical channel identifier indicating the first field, attach the MAC subheader to the front of the first field to construct a MAC subPDU, and then place the MAC subPDU after 1M-22 or before the data (data with integrity protection applied, MAC CE, MAC SDU or MAC subPDU). In another method, when the integrity protection procedure is configured in the MAC layer, the receiver may read the first field of the constant size before or after each data to which integrity protection is applied, while performing the procedure proposed above, by without assigning or defining the logical channel identifier for the first field, without configuring the MAC subheader, always attaching only the first field 1M-22 of a constant size to before or after 1M-22 the data (MAC CE with Integrity Protection applied, MAC SDU or MAC subPDU), defining a new second field in the MAC subheader 1L-21 of the data to indicate whether the integrity protection procedure has been applied (or whether data protection procedures have been applied), and indicating that the first field exists before or after the data (in another method, even if the second field is not defined, when a data protection procedure is promised or defined or configured for a specific MAC CE (for example, MAC control information (MAC CE) instructing a UE to which a plurality of SCells are configured for carrier aggregation to activate or deactivate each SCell or one or a plurality of MAC CEs from among the MAC CEs listed in the disclosure), for the MAC CE, the UE or the base station may know that the first field may be located before or after the MAC subPDU including the MAC CE). In this way, it is possible to reduce the overhead by the size of the MAC subheader. As described above, if the first field is placed after the MAC CE or MAC subPDU, the structure may be suitable for implementing parallel processing because each MAC subPDU can be read and the first field value calculated later can be placed at back while applying the data protection procedure. On the other hand, if the first field is placed at the beginning of the MAC SDU or MAC subPDU, there is an advantage that the receiving MAC layer can read the first field first.

As another method, when performing the procedure proposed above, for uplink data such as 1M-40 or 1M-50, because MAC control information 1M-41 and 1M-51 is positioned at the end of the MAC PDU or before the padding 1M-43, the integrity protection procedure may be applied to the plurality of MAC control information 1M-41 and 1M-51 or to the plurality of MAC control information 1M-41 and 1M-51 to which the integrity protection procedure should be applied as a group, and the first field 1M-42 may be positioned after the last MAC control information among the plurality of MAC control information 1M-41 and 1M-51 or before the padding 1M-43. As another method, the first field may be positioned in front of the first MAC control information among the plurality of MAC control information 1M-41 and 1M-51. In this way, implementation complexity may be reduced by allowing the integrity protection procedure to be applied to a plurality of pieces of MAC control information 1M-41 and 1M-51 at the same time, and overhead may also be reduced by reducing the number of first fields.

In the above, if the ciphering procedure is configured in the MAC layer, the ciphering procedure may be performed on data (for example, MAC control information (MAC CE (Control Element)), MAC subheader, type of data configured through RRC, MAC SDU, or MAC subPDU) to which the ciphering procedure should be applied (or, if the integrity protection procedure is configured, the integrity-protected MAC CE or the first field). In addition, data (MAC PDU) including data to which integrity protection or ciphering procedure is applied may be transmitted to a lower layer. As another method, when padding or a subheader corresponding to padding is included in the MAC PDU, processing complexity may be reduced by not performing a ciphering procedure on the padding or subheader corresponding to padding.

As another method, when performing the procedure suggested above, because MAC control information 1M-41 and 1M-51 is located at the end of the MAC PDU or before padding 1M-43 for uplink data such as 1M-40 and 1M-50, when a ciphering procedure should be applied for the plurality of MAC control information 1M-41 and 1M-51, a ciphering procedure may be applied as a group to the plurality pieces of MAC control pieces of information 1M-41 and 1M-51. In this way, the implementation complexity may be reduced by allowing the ciphering procedure to be applied to a plurality of MAC control information at the same time.

When applying the data protection method 1-3 proposed above in the MAC layer, the integrity protection procedure is applied to data (for example, MAC control information (MAC CE (Control Element)), MAC subheader, or type of data configured through RRC (e.g., type of MAC CE)) to which the integrity protection procedure should be applied, that is, the integrity protection procedure or the integrity verification procedure is applied in units of MAC subPDUs 1M-20, 1M-21, 1M-40, and 1M-41, thereby enhancing security. As another method, when applying the data protection method 1-3 proposed above in the MAC layer, the integrity protection procedure may be applied to data (for example, MAC control information (MAC CE (Control Element)) or type of data configured through RRC (e.g., type of MAC CE)) to which the integrity protection procedure should be applied, that is, the integrity protection procedure or the integrity verification procedure may be applied in units of MAC SDUs 1M-30, 1M-31, 1M-50, and 1M-51 except for the MAC subheader, thereby reducing implementation complexity.

When applying the data protection method 1-3 proposed above in the MAC layer, the ciphering procedure is applied to data (for example, MAC control information (MAC CE (Control Element)), MAC subheader, or type of data configured through RRC (e.g., type of MAC CE)) to which the ciphering procedure should be applied, that is, the integrity protection procedure or the integrity verification procedure is applied in units of MAC subPDUs 1M-20 1M-21, 1M-40, and 1M-41, thereby enhancing security. As another method, when applying the data protection method 1-3 proposed above in the MAC layer, the ciphering procedure may be applied to data (for example, MAC control information (MAC CE (Control Element)) or type of data configured through RRC (e.g., type of MAC CE)) to which the ciphering procedure should be applied, that is, the ciphering procedure or the deciphering procedure may be applied in units of MAC SDUs 1M-30, 1M-31, 1M-50, and 1M-51 except for the MAC subheader, thereby reducing implementation complexity.

In the above, the data (for example, RLC control data (RLC control PDU), MAC control information (MAC CE (Control Element)), MAC subheader, or type of data configured through RRC (e.g., type of MAC CE)) to which the data protection procedure should be applied may be defined or promised as specific data between the UE and the base station, or may be configured as an RRC message as illustrated in FIG. 1E. For example, a data protection procedure or a data protection release procedure may be applied only to specific MAC CEs (or MAC SDUs) or MAC subPDUs corresponding to specific MAC CEs among MAC control information (MAC CE (Control Element)), MAC subheader, or type of data configured through RRC (e.g., type of MAC CE). As another method, if the data protection procedure is applied only to specific MAC CEs (for example, MAC control information (MAC CE) for instructing activation or deactivation of each SCell to a UE in which a plurality of SCells are configured for carrier aggregation or one or a plurality of MAC CEs among the MAC CEs listed in the disclosure) among the MAC CEs included in the uplink data, by positioning MAC CEs to which the data protection procedure is applied at the back of the MAC PDU than the MAC CEs to which the data protection procedure is not applied, the receiver may read MAC CEs to which the data protection release procedure is not applied first, so that the receiver can speed up data processing and read MAC control information quickly. This is because MAC CEs to which the data protection release procedure is applied may be read only after the data protection release procedure is completed. In the above, data to which the data protection procedure should be applied may be classified in the UE and the base station based on PDCP header, RLC header, or field information (e.g., D/C field (data/control) or logical channel identifier) of the MAC header.

If the receiving MAC layer receives data (e.g., MAC PDU) to which the data protection method 1-3 for uplink data proposed in FIGS. 1MA to 1MC is applied, and if a ciphering procedure or a deciphering procedure is configured in the MAC layer, the receiving MAC layer may apply the deciphering procedure to the data part to which ciphering is applied in the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the failed MAC PDU may be discarded.

As described above, if the MAC layer applies the data protection method 1-3 proposed in the disclosure to MAC SDU or MAC subPDU including specific data (e.g., RLC control PDU, PDCP control PDU, or MAC CE), the receiver may indicate whether data protection methods are applied or not by introducing an indicator in the MAC subheader so that the receiver can check whether the data protection method is applied to the MAC SDU or MAC subPDU and decide whether to apply the data protection release procedure. For example, if data protection procedure is applied to MAC SDU or MAC subPDU including specific data (e.g., RLC control PDU or PDCP control PDU or MAC CE) when transmitting data (MAC PDU), the MAC layer may indicate whether a data protection procedure has been applied by setting an indicator in the MAC subheader of the specific data, and if data protection procedures are not applied to some data, the MAC layer may indicate that the data protection procedure is not applied by setting (or un-setting) an indicator in the MAC subheader. In addition, for example, when the MAC layer processes the received data (MAC PDU) and applies the data protection release procedure, the MAC layer checks the MAC subheader of each MAC subPDU, when the indicator indicates that the data protection procedure is applied, the MAC layer applies the data protection release procedure to the MAC SDU or MAC subPDU corresponding to the MAC subheader, and if the indicator indicates that the data protection procedure is not applied, the MAC layer may not apply the data protection release procedure to the MAC SDU or MAC subPDU corresponding to the MAC subheader.

FIGS. 1OA to 1OC illustrate the data protection method 2-1 proposed for downlink data according to an embodiment of the disclosure.

FIGS. 1OA to 1OC suggest that the MAC layer performs a data protection procedure or a data protection release procedure in order to strengthen the security for PDCP control data (PDCP control PDU), RLC control data (RLC control PDU), MAC control information (MAC CE (Control Element)), RLC header, or MAC subheaders exposed to the security threat described in the disclosure.

As in 1O-10, in the above, the MAC layer may generate and concatenate a MAC subheader based on different MAC SDUs to generate each MAC subPDU. In addition, if necessary (for example, according to the generation condition of MAC control information), the MAC layer may configure MAC control information, generate a MAC subheader, and concatenate to generate a MAC subPDU, and the MAC subPDU may include a MAC subheader for padding or a padding and MAC subheader. When configuring the MAC PDU (data unit composed of a plurality of MAC subPDUs), the MAC layer configures downlink data (for example, when the base station transmits data to the UE) based on the MAC subPDU generated above, and if padding is required, the padding may be positioned at the end of the MAC PDU composed of MAC subPDUs, and when the MAC layer includes MAC control information or MAC control information, the MAC layer may place the padding at the front of the MAC PDU and place the MAC SDUs behind the MAC control information. In addition, in the MAC subPDU, the MAC subheader may always be positioned in front of the MAC SDU, MAC control information, or padding, and as described above, the MAC PDU may be configured with MAC subPDUs to be transferred to a lower layer to perform transmission. As described above, in the case of downlink data, there is an advantage that important control information such as MAC control information may be placed at the front so that the UE may quickly process control information first.

As in 1O-15, if the data protection procedure (ciphering procedure or integrity protection procedure) is configured in the MAC layer, for example, when the integrity protection procedure is configured, the MAC layer may apply an integrity protection procedure to all MAC PDUs 1O-16, generate a first field (e.g., digital signature (DS) field or MAC-I (Message Authentication Code-Integrity) field) generated as a result of the integrity protection procedure, and place the first field at the beginning of the MAC PDU. In the above, the MAC layer may allocate or define a separate logical channel identifier (LCID) so that the receiving MAC layer can distinguish the first field, consider the first field as a MAC SDU, generate a MAC subheader including a logical channel identifier indicating the first field, attach the MAC subheader to the front of the first field to configure a MAC subPDU, and then place the MAC subPDU at the beginning of the MAC PDU. As another method, when the integrity protection procedure is configured in the MAC layer, while performing the procedure proposed above, without allocating or defining a logical channel identifier for the first field, without configuring the MAC subheader, only the first field of a constant size is always attached to the front of the MAC PDU, so that the receiver may read the first field of the constant size at the front. In this way, it is possible to reduce the overhead by the size of the MAC subheader.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer.

As another method, as in 1O-20, if the data protection procedure (ciphering procedure or integrity protection procedure) is configured in the MAC layer, for example, if the integrity protection procedure is configured, the MAC layer may apply an integrity protection procedure to all MAC PDUs 1O-22, generate a first field (e.g., digital signature (DS) field or MAC-I (Message Authentication Code-Integrity) field) generated as a result of the integrity protection procedure, and place the first field at the beginning of the MAC PDU. In the above, if the MAC PDU includes padding or MAC subheaders 1O-23 corresponding to padding, processing complexity may be reduced by not applying the integrity protection procedure to the padding (or MAC SDU) or the MAC subheader corresponding to the padding. In the above, the MAC layer may allocate or define a separate logical channel identifier so that the receiving MAC layer can distinguish the first field, consider the first field as a MAC SDU 1O-21, generate a MAC subheader 1O-21 including a logical channel identifier indicating the first field, attach the MAC subheader to the front of the first field to configure a MAC subPDU, and then place the MAC subPDU at the beginning of the MAC PDU. As another method, when the integrity protection procedure is configured in the MAC layer, while performing the procedure proposed above, without allocating or defining a logical channel identifier for the first field, without configuring the MAC subheader, only the first field 1O-24 of a constant size is always attached to the front of the MAC PDU, so that the receiver may read the first field of the constant size at the front. In this way, it is possible to reduce the overhead by the size of the MAC subheader.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. As another method, when padding or a subheader 1O-23 corresponding to padding is included in the entire MAC PDU, processing complexity may be reduced by not performing a ciphering procedure on the padding or subheader corresponding to padding.

As another method, in the above, if the data protection procedure (ciphering procedure or integrity protection procedure) is configured in the MAC layer, for example, when integrity protection procedures are configured, the MAC layer may apply an integrity protection procedure to all MAC PDUs, generate a first field (e.g., DS (Digital Signature) field or MAC-I (Message Authentication Code-Integrity) field) generated as a result of the integrity protection procedure, and place the first field at the end of the MAC PDU 1O-31 and 1O-34. In the above, the MAC layer may allocate or define a separate logical channel identifier so that the receiving MAC layer can distinguish the first field, consider the first field as a MAC SDU, generate a MAC subheader including a logical channel identifier indicating the first field, attach the MAC subheader to the front of the first field to construct a MAC subPDU, and then place the MAC subPDU at the end of the MAC PDU. As another method, when the integrity protection procedure is configured in the MAC layer, while performing the procedure proposed above, without allocating or defining a logical channel identifier for the first field, without configuring the MAC subheader, only the first field of a constant size is always attached to the end of the MAC PDU, so that the receiver may read the first field of the constant size at the front. In this way, it is possible to reduce the overhead by the size of the MAC subheader. When a padding or a header for padding is included in the MAC PDU, because the L field (length field) is not included in the MAC subheader, for the padding, the receiving MAC layer cannot distinguish the first field attached to the end of the MAC PDU. That is, because the size of the padding cannot be known, the first field attached back to the padding cannot be distinguished. Therefore, when the data protection procedure is configured in the MAC layer as described above, if padding 1O-32 is included in the MAC PDU, a length field or a new field may be introduced to transmit information indicating the location of the first field. For example, the indication information may be included in a MAC subheader (e.g., a MAC subheader for padding).

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. For example, when a header for padding or padding is included in the MAC PDU so as to maximize implementation convenience by directly applying a decoding procedure to all data received by the receiver, a ciphering procedure may be performed including the padding or a header for padding. As another method, when padding or a subheader corresponding to padding is included in the entire MAC PDU, processing complexity may be reduced by not performing a ciphering procedure on the padding or subheader corresponding to padding.

As another method, like 1O-30 in the above, if the data protection procedure (ciphering procedure or integrity protection procedure) is configured in the MAC layer, for example, when integrity protection procedures are configured, the MAC layer may apply an integrity protection procedure to all MAC PDUs 1O-33, generate a first field (e.g., DS (Digital Signature) field or MAC-I (Message Authentication Code-Integrity) field) generated as a result of the integrity protection procedure, and place the first field at the end of the MAC PDU 1O-31 and 1O-34. In the above, if the MAC PDU includes padding or MAC subheaders 1O-32 corresponding to padding, processing complexity may be reduced by not applying the integrity protection procedure to the padding (or MAC SDU) or the MAC subheader 1O-32 corresponding to the padding, and the first field 1O-31 and 1O-34 may be positioned in front 1O-32 of the padding or MAC subheader corresponding to the padding. Because when a padding or a header for padding is included in the MAC PDU, because the L field (length field) is not included in the MAC subheader, for the padding, the receiving MAC layer cannot distinguish the first field 1O-31 and 1O-34 attached to the end of the MAC PDU. That is, because the size of the padding cannot be known, the first field attached back to the padding cannot be distinguished, so the first field must be positioned before the padding. In the above, the MAC layer may allocate or define a separate logical channel identifier so that the receiving MAC layer can distinguish the first field, consider the first field as a MAC SDU 1O-31, generate a MAC subheader 1O-31 including a logical channel identifier indicating the first field, attach the MAC subheader to the front of the first field to configure a MAC subPDU, and then place the MAC subPDU at the end 1O-31 of the MAC PDU. As another method, when the integrity protection procedure is configured in the MAC layer, while performing the procedure proposed above, without allocating or defining a logical channel identifier for the first field, without configuring the MAC subheader, only the first field 1O-34 of a constant size is always attached to the end 1O-34 of the MAC PDU, so that the receiver may read the first field of the constant size at the end. In this way, it is possible to reduce the overhead by the size of the MAC subheader. In the above, if the MAC PDU includes padding or a MAC subheader corresponding to padding, processing complexity may be reduced by not applying an integrity protection procedure to the padding (or MAC SDU) or the MAC subheader corresponding to the padding, and the first field may be positioned in front 1O-34 of the MAC subheader corresponding to the padding or padding.

In the above, if the ciphering procedure is configured in the MAC layer, the ciphering procedure may be performed on the entire MAC PDU (or the integrity-protected MAC PDU or the first field if the integrity protection procedure is configured). In addition, the ciphered data (MAC PDU or the first field) may be transmitted to a lower layer. For example, when a header for padding or padding is included in the MAC PDU so as to maximize implementation convenience by directly applying a decoding procedure to all data received by the receiver, a ciphering procedure may be performed including the padding or a header for padding. As another method, when padding or a subheader corresponding to padding is included in the entire MAC PDU, processing complexity may be reduced by not performing a ciphering procedure on the padding or subheader corresponding to padding.

If the receiving MAC layer receives data (e.g., MAC PDU) to which the data protection method 2-1 for uplink data proposed in FIGS. 1OA to 1OC is applied, when a ciphering procedure or a deciphering procedure is configured in the MAC layer, the receiving MAC layer may apply the deciphering procedure to the entire MAC PDU or the data part to which ciphering is applied to the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the MAC PDU may be discarded.

FIGS. 1PA to 1PC illustrate the data protection method 2-2 proposed for downlink data according to an embodiment of the disclosure.

FIGS. 1PA to 1PC suggest that the MAC layer performs a data protection procedure or a data protection release procedure in order to strengthen the security for PDCP control data (PDCP control PDU), RLC control data (RLC control PDU), MAC control information (MAC CE (Control Element)), RLC header, or MAC subheaders exposed to the security threat described in the disclosure.

As in 1P-10, In the above, the MAC layer may generate and concatenate a MAC subheader based on different MAC SDUs to generate each MAC subPDU. In addition, if necessary (for example, according to the generation condition of MAC control information), the MAC layer may configure MAC control information, generate a MAC subheader, and concatenate to generate a MAC subPDU, and the MAC subPDU may include a MAC subheader for padding or a padding and MAC subheader. When configuring the MAC PDU (data unit composed of a plurality of MAC subPDUs), the MAC layer configures downlink data (for example, when the base station transmits data to the UE) based on the MAC subPDU generated above, and if padding is required, the padding may be positioned at the end of the MAC PDU composed of MAC subPDUs, and when the MAC layer includes MAC control information or MAC control information, the MAC layer may place the padding at the front of the MAC PDU and place the MAC SDUs behind the MAC control information. In addition, in the MAC subPDU, the MAC subheader may always be positioned in front of the MAC SDU, MAC control information, or padding, and as described above, the MAC PDU may be configured with MAC subPDUs to be transferred to a lower layer to perform transmission. As described above, in the case of downlink data, there is an advantage that important control information such as MAC control information may be placed at the front so that the UE may quickly process control information first.

As in 1L-20, if the data protection procedure (ciphering procedure or integrity protection procedure) is configured in the MAC layer, for example, when the integrity protection procedure is configured, the MAC layer may apply an integrity protection procedure to data (e.g., PDCP control data (PDCP control PDU), RLC control data (RLC control PDU), MAC control information (MAC CE (Control Element)), RLC header, MAC subheader, PDCP header, type of data configured in RRC, MAC SDU, or MAC subPDU) 1P-21 and 1P-23 to which the integrity protection procedure should be applied, generate a first field (for example, DS (Digital Signature) field or MAC-I (Message Authentication Code-Integrity) field) generated as a result of the integrity protection procedure, and place the first field after 1P-22 or before the data (MAC SDU or MAC subPDU). For example, the integrity protection procedure may be selectively applied only to a specific MAC subPDU as described above among MAC subPDUs included in the MAC PDU. Considering that the size of the MAC PDU transmitted in the next-generation mobile communication system may be up to 150,000 bytes, if the data protection procedure is applied only to data selectively exposed to security threats as described above, the data protection procedure only needs to be applied to about 1,000 bytes, so that processing complexity may be reduced and data processing speed may be increased. In the above, if the MAC PDU includes padding or MAC subheaders 1P-24 corresponding to padding, processing complexity may be reduced by not applying the integrity protection procedure to the padding (or MAC SDU) or the MAC subheader 1P-24 corresponding to the padding. In the above, the MAC layer may allocate or define a separate logical channel identifier so that the receiving MAC layer can distinguish the first field, consider the first field as a MAC SDU 1P-22, generate a MAC subheader 1P-22 including a logical channel identifier indicating the first field, attach the MAC subheader to the front of the first field to construct a MAC subPDU, and then place the MAC subPDU after 1P-22 or before the data (data with integrity protection applied, MAC SDU or MAC subPDU). In another method, when the integrity protection procedure is configured in the MAC layer, the receiver may read the first field of the constant size before or after each data to which integrity protection is applied, while performing the procedure proposed above, by without assigning or defining the logical channel identifier for the first field, without configuring the MAC subheader, always attaching only the first field 1P-22 of a constant size to before or after 1P-22 the data (data with Integrity Protection applied, MAC SDU or MAC subPDU), defining a new second field in the MAC subheader 1L-21 of the data to indicate whether the integrity protection procedure has been applied (or whether data protection procedures have been applied), and indicating that the first field exists before or after the data. In this way, it is possible to reduce the overhead by the size of the MAC subheader. As described above, if the first field is placed after the MAC SDU or MAC subPDU, the structure may be suitable for implementing parallel processing because each MAC subPDU can be read and the first field value calculated later can be placed at back while applying the data protection procedure. On the other hand, if the first field is placed at the beginning of the MAC SDU or MAC subPDU, there is an advantage that the receiving MAC layer can read the first field first.

As another method, when performing the procedure proposed above, for downlink data such as 1P-40 or 1P-50, because MAC control information 1P-41 is positioned at the beginning of the MAC PDU, the integrity protection procedure may be applied to the plurality of MAC control information 1P-41 or to the plurality of MAC control information 1P-41 to which the integrity protection procedure should be applied as a group, and the first field 1P-42 may be positioned after the last MAC control information among the plurality of MAC control information 1P-41 or before the padding. As another method, the first field may be positioned in front of the first MAC control information among the plurality of MAC control information. In this way, implementation complexity may be reduced by allowing the integrity protection procedure to be applied to a plurality of pieces of MAC control information at the same time, and overhead may also be reduced by reducing the number of first fields.

In the above, if the ciphering procedure is configured in the MAC layer, the ciphering procedure may be performed on data (for example, PDCP control data (PDCP control PDU) or RLC control data (RLC control PDU) or MAC control information (MAC CE (Control Element)) or RLC header or MAC subheader or PDCP header or type of data configured through RRC or MAC SDU or MAC subPDU) to which the ciphering procedure should be applied (or, if the integrity protection procedure is configured, the integrity-protected MAC SDU or the first field). In addition, data (MAC PDU) including data to which integrity protection or ciphering procedure is applied may be transmitted to a lower layer. As another method, when padding or a subheader corresponding to padding is included in the MAC PDU, processing complexity may be reduced by not performing a ciphering procedure on the padding or subheader corresponding to padding.

As another method, when performing the procedure suggested above, for downlink data such as 1P-40 or 1P-50, because MAC control information 1P-41 is located at the beginning of the MAC PDU, a ciphering procedure may be applied as a group to the plurality pieces of MAC control information 1P-41 or to the plurality pieces of MAC control information 1P-41. In this way, the implementation complexity may be reduced by allowing the ciphering procedure to be applied to a plurality of MAC control information 1P-41 at the same time.

When applying the data protection method 2-2 proposed above in the MAC layer, the integrity protection procedure is applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the integrity protection procedure should be applied, that is, the integrity protection procedure or the integrity verification procedure is applied in units of MAC subPDUs 1P-21, 1P-23, 1P-40, 1P-41, and 1P-43, thereby enhancing security. As another method, when applying the data protection method 2-2 proposed above in the MAC layer, the integrity protection procedure may be applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the integrity protection procedure should be applied, that is, the integrity protection procedure or the integrity verification procedure may be applied in units of MAC SDUs 1P-30, 1P-31, 1P-32, 1P-33, 1P-50, 1P-51, 1P-52, and 1P-53 except for the MAC subheader, thereby reducing implementation complexity.

When applying the data protection method 2-2 proposed above in the MAC layer, the ciphering procedure is applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the ciphering procedure should be applied, that is, the ciphering procedure or deciphering procedure is applied in units of MAC subPDUs 1P-21, 1P-23, 1P-40, 1P-41, and 1P-43, thereby enhancing security. As another method, when applying the data protection method 2-2 proposed above in the MAC layer, the ciphering procedure may be applied to data (for example, PDCP control data (PDCP control PDU), RLC control data (RLC control PDU), MAC control information (MAC CE (Control Element)), RLC header, MAC subheader, PDCP header, type of data configured through RRC, or MAC SDU) to which the ciphering procedure should be applied, that is, the ciphering procedure or deciphering procedure may be applied in units of MAC SDUs 1P-30, 1P-31, 1P-32, 1P-33, 1P-50, 1P-51, 1P-52, and 1P-53 except for the MAC subheader, thereby reducing implementation complexity.

In the above, the data (for example, PDCP control data (PDCP control PDU), RLC control data (RLC control PDU), MAC control information (MAC CE (Control Element)), RLC header, MAC subheader, PDCP header, MAC SDU, or MAC subPDU) to which the data protection procedure should be applied may be defined or promised as specific data between the UE and the base station, or may be configured as an RRC message as illustrated in FIG. 1E. For example, a data protection procedure or a data protection release procedure may be applied only to specific MAC CEs (or MAC SDUs) or MAC subPDUs corresponding to specific MAC CEs (for example, MAC control information (MAC CE) for instructing activation or deactivation of each SCell to a UE in which a plurality of SCells are configured for carrier aggregation or one or a plurality of MAC CEs among the MAC CEs listed in the disclosure) among PDCP control data (PDCP control PDU), RLC control data (RLC control PDU), MAC control information (MAC CE (Control Element)), RLC header, MAC subheader, PDCP header, MAC SDU, or MAC subPDU. As another method, if the data protection procedure is applied only to specific MAC CEs among the MAC CEs included in the downlink data, by positioning MAC CEs to which the data protection procedure is applied at the back of the MAC CEs to which the data protection procedure is not applied, the receiver may read MAC CEs to which the data protection release procedure is not applied first, so that the receiver can speed up data processing and read MAC control information quickly. This is because MAC CEs to which the data protection release procedure is applied may be read only after the data protection release procedure is completed. In the above, data to which the data protection procedure should be applied may be classified in the UE and the base station based on PDCP header, RLC header, or field information (e.g., D/C field (data/control) or logical channel identifier) of the MAC header.

If the receiving MAC layer receives data (e.g., MAC PDU) to which the data protection method 2-2 for downlink data proposed in FIGS. 1PA to 1PC is applied, and if a ciphering procedure or a deciphering procedure is configured in the MAC layer, the receiving MAC layer may apply the deciphering procedure to the data part to which ciphering is applied in the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the MAC PDU may be discarded.

As described above, if the MAC layer applies the data protection method 2-2 proposed in the disclosure to MAC SDU or MAC subPDU including specific data (e.g., RLC control PDU, PDCP control PDU, or MAC CE), the receiver may indicate whether data protection methods are applied or not by introducing an indicator in the MAC subheader so that the receiver can check whether the data protection method is applied to the MAC SDU or MAC subPDU and decide whether to apply the data protection release procedure. For example, if data protection procedure is applied to MAC SDU or MAC subPDU including specific data (e.g., RLC control PDU or PDCP control PDU or MAC CE) when transmitting data (MAC PDU), the MAC layer may indicate whether a data protection procedure has been applied by setting an indicator in the MAC subheader of the specific data, and if data protection procedures are not applied to some data, the MAC layer may indicate that the data protection procedure is not applied by setting (or un-setting) an indicator in the MAC subheader. In addition, for example, when the MAC layer processes the received data (MAC PDU) and applies the data protection release procedure, the MAC layer checks the MAC subheader of each MAC subPDU, when the indicator indicates that the data protection procedure is applied, the MAC layer applies the data protection release procedure to the MAC SDU or MAC subPDU corresponding to the MAC subheader, and if the indicator indicates that the data protection procedure is not applied, the MAC layer may not apply the data protection release procedure to the MAC SDU or MAC subPDU corresponding to the MAC subheader.

FIGS. 1RA to 1RC illustrate the data protection method 2-3 proposed for downlink data according to an embodiment of the disclosure.

FIGS. 1RA to 1RC suggest that the MAC layer performs a data protection procedure or a data protection release procedure in order to strengthen the security for MAC control information (MAC CE (Control Element)) or MAC subheaders exposed to the security threat described in the disclosure.

As in 1R-10, in the above, the MAC layer may generate and concatenate a MAC subheader based on different MAC SDUs to generate each MAC subPDU. In addition, if necessary (for example, according to the generation condition of MAC control information), the MAC layer may configure MAC control information, generate a MAC subheader, and concatenate to generate a MAC subPDU, and the MAC subPDU may include a MAC subheader for padding or a padding and MAC subheader. When configuring the MAC PDU (data unit composed of a plurality of MAC subPDUs), the MAC layer configures downlink data (for example, when the base station transmits data to the UE) based on the MAC subPDU generated above, and if padding is required, the padding may be positioned at the end of the MAC PDU composed of MAC subPDUs, and when the MAC layer includes MAC control information or MAC control information, the MAC layer may place the padding at the front of the MAC PDU and place the MAC SDUs behind the MAC control information. In addition, in the MAC subPDU, the MAC subheader may always be positioned in front of the MAC SDU, MAC control information, or padding, and as described above, the MAC PDU may be configured with MAC subPDUs to be transferred to a lower layer to perform transmission. As described above, in the case of downlink data, there is an advantage that important control information such as MAC control information may be placed at the front so that the UE may quickly process control information first.

As in 1M-20, if the data protection procedure (ciphering procedure or integrity protection procedure) is configured in the MAC layer, for example, when the integrity protection procedure is configured, the MAC layer may apply an integrity protection procedure to data (e.g., MAC control information (MAC CE (Control Element)), MAC subheader, type of data configured in RRC, MAC SDU, or MAC subPDU) 1R-21 to which the integrity protection procedure should be applied, generate a first field (for example, DS (Digital Signature) field or MAC-I (Message Authentication Code-Integrity) field) generated as a result of the integrity protection procedure, and place the first field after 1M-22 or before the data (MAC SDU or MAC subPDU). For example, the integrity protection procedure may be selectively applied only to a specific MAC subPDU 1R-21 (e.g., specific data including MAC CE) as described above among MAC subPDUs (e.g., data including MAC CE) included in the MAC PDU. Considering that the size of the MAC PDU transmitted in the next-generation mobile communication system may be up to 150,000 bytes, if the data protection procedure is applied only to data selectively exposed to security threats as described above, the data protection procedure only needs to be applied to about 1,000 bytes, so that processing complexity may be reduced and data processing speed may be increased. In the above, if the MAC PDU includes padding or MAC subheaders 1R-23 corresponding to padding, processing complexity may be reduced by not applying the integrity protection procedure to the padding (or MAC SDU) or the MAC subheader corresponding to the padding. In the above, the MAC layer may allocate or define a separate logical channel identifier so that the receiving MAC layer can distinguish the first field, consider the first field as a MAC SDU 1R-22, generate a MAC subheader 1L-26 including a logical channel identifier indicating the first field, attach the MAC subheader to the front of the first field to construct a MAC subPDU, and then place the MAC subPDU after 1R-22 or before the data (data with integrity protection applied, MAC CE, MAC SDU or MAC subPDU). In another method, when the integrity protection procedure is configured in the MAC layer, the receiver may read the first field of the constant size before or after each data to which integrity protection is applied, while performing the procedure proposed above, by without assigning or defining the logical channel identifier for the first field, without configuring the MAC subheader, always attaching only the first field 1R-22 of a constant size to before or after 1R-22 the data (MAC CE with Integrity Protection applied, MAC SDU or MAC subPDU), defining a new second field in the MAC subheader 1L-21 of the data to indicate whether the integrity protection procedure has been applied (or whether data protection procedures have been applied), and indicating that the first field exists before or after the data (in another method, even if the second field is not defined, when a data protection procedure is promised or defined or configured for a specific MAC CE (for example, MAC control information (MAC CE) instructing a UE to which a plurality of SCells are configured for carrier aggregation to activate or deactivate each SCell or one or a plurality of MAC CEs from among the MAC CEs listed in the disclosure), for the MAC CE, the UE or the base station may know that the first field may be located before or after the MAC subPDU including the MAC CE). In this way, it is possible to reduce the overhead by the size of the MAC subheader. As described above, if the first field is placed after the MAC CE or MAC subPDU, the structure may be suitable for implementing parallel processing because each MAC subPDU can be read and the first field value calculated later can be placed at back while applying the data protection procedure. On the other hand, if the first field is placed at the beginning of the MAC SDU or MAC subPDU, there is an advantage that the receiving MAC layer can read the first field first.

As another method, when performing the procedure proposed above, for downlink data such as 1R-40 or 1R-50, because MAC control information is positioned at the beginning of the MAC PDU, the integrity protection procedure may be applied to the plurality of MAC control information or to the plurality of MAC control information to which the integrity protection procedure should be applied as a group, and the first field 1R-42 may be positioned after the last MAC control information among the plurality of MAC control information. As another method, the first field may be positioned in front of the first MAC control information among the plurality of MAC control information. In this way, implementation complexity may be reduced by allowing the integrity protection procedure to be applied to a plurality of pieces of MAC control information at the same time, and overhead may also be reduced by reducing the number of first fields.

In the above, if the ciphering procedure is configured in the MAC layer, the ciphering procedure may be performed on data (for example, MAC control information (MAC CE (Control Element)), MAC subheader, type of data configured through RRC, MAC SDU, or MAC subPDU) to which the ciphering procedure should be applied (or, if the integrity protection procedure is configured, the integrity-protected MAC CE or the first field). In addition, data (MAC PDU) including data to which integrity protection or ciphering procedure is applied may be transmitted to a lower layer. As another method, when padding or a subheader corresponding to padding is included in the MAC PDU, processing complexity may be reduced by not performing a ciphering procedure on the padding or subheader corresponding to padding.

As another method, when performing the procedure suggested above 1R-40 or 1R-50, because MAC control information is located at the beginning of the MAC PDU for downlink data, a ciphering procedure may be applied as a group to the plurality pieces of MAC control information or the plurality pieces of MAC control information to which a ciphering procedure should be applied. In this way, the implementation complexity may be reduced by allowing the ciphering procedure to be applied to a plurality of MAC control information at the same time.

When applying the data protection method 2-3 proposed above in the MAC layer, the integrity protection procedure is applied to data (for example, MAC control information (MAC CE (Control Element)), MAC subheader, or type of data configured through RRC (e.g., type of MAC CE)) to which the integrity protection procedure should be applied, that is, the integrity protection procedure or the integrity verification procedure is applied in units of MAC subPDUs 1R-20, 1R-21, 1R-40, and 1R-41, thereby enhancing security. As another method, when applying the data protection method 2-3 proposed above in the MAC layer, the integrity protection procedure may be applied to data (for example, MAC control information (MAC CE (Control Element)) or type of data configured through RRC (e.g., type of MAC CE)) to which the integrity protection procedure should be applied, that is, the integrity protection procedure or the integrity verification procedure may be applied in units of MAC SDUs 1R-30, 1R-31, 1R-32, 1R-50, 1R-51, and 1R-52 except for the MAC subheader, thereby reducing implementation complexity.

When applying the data protection method 2-3 proposed above in the MAC layer, the ciphering procedure is applied to data (for example, MAC control information (MAC CE (Control Element)), MAC subheader, or type of data configured through RRC (e.g., type of MAC CE)) to which the ciphering procedure should be applied, that is, the integrity protection procedure or the integrity verification procedure is applied in units of MAC subPDUs 1R-20, 1R-21, 1R-40, and 1R-41, thereby enhancing security. As another method, when applying the data protection method 2-3 proposed above in the MAC layer, the ciphering procedure may be applied to data (for example, MAC control information (MAC CE (Control Element)) or type of data configured through RRC (e.g., type of MAC CE)) to which the ciphering procedure should be applied, that is, the ciphering procedure or the deciphering procedure may be applied in units of MAC SDUs 1R-30, 1R-31, 1R-32, 1R-50, 1R-51, and 1R-52 except for the MAC subheader, thereby reducing implementation complexity.

In the above, the data (for example, MAC control information (MAC CE (Control Element)), MAC subheader, or type of data configured through RRC (e.g., type of MAC CE)) to which the data protection procedure should be applied may be defined or promised as specific data between the UE and the base station, or may be configured as an RRC message as illustrated in FIG. 1E. For example, a data protection procedure or a data protection release procedure may be applied only to specific MAC CEs (or MAC SDUs) or MAC subPDUs corresponding to specific MAC CEs among type of data (e.g., type of MAC CE) configured through MAC control information (MAC CE (Control Element)), MAC subheader, or RRC. As another method, if the data protection procedure is applied only to specific MAC CEs (for example, MAC control information (MAC CE) for instructing activation or deactivation of each SCell to a UE in which a plurality of SCells are configured for carrier aggregation or one or a plurality of MAC CEs among the MAC CEs listed in the disclosure) among the MAC CEs included in the downlink data, by positioning MAC CEs to which the data protection procedure is applied at the back of the MAC PDU than the MAC CEs to which the data protection procedure is not applied, the receiver may read MAC CEs to which the data protection release procedure is not applied first, so that the receiver can speed up data processing and read MAC control information quickly. This is because MAC CEs to which the data protection release procedure is applied may be read only after the data protection release procedure is completed. In the above, data to which the data protection procedure should be applied may be classified in the UE and the base station based on PDCP header, RLC header, or field information (e.g., D/C field (data/control) or logical channel identifier) of the MAC header.

If the receiving MAC layer receives data (e.g., MAC PDU) to which the data protection method 2-3 for uplink data proposed in FIGS. 1RA to 1RC is applied, and if a ciphering procedure or a deciphering procedure is configured in the MAC layer, the receiving MAC layer may apply the deciphering procedure to the data part to which ciphering is applied in the received MAC PDU. In addition, if an integrity protection procedure or integrity verification procedure is configured in the MAC layer, a first field (DS field or MAC-I field) included in the MAC PDU may be checked or read (for example, the logical identifier of the MAC subheader may be checked and the first field may be checked, or the first field may be checked at a specific location (the front or the back of the MAC PDU)), and an integrity verification procedure may be applied to the entire MAC PDU or the data portion to which integrity protection is applied to determine integrity. If the integrity verification fails, the MAC PDU may be discarded.

As described above, if the MAC layer applies the data protection method 2-3 proposed in the disclosure to MAC SDU or MAC subPDU including specific data (e.g., RLC control PDU, PDCP control PDU, or MAC CE), the receiver may indicate whether data protection methods are applied or not by introducing an indicator in the MAC subheader so that the receiver can check whether the data protection method is applied to the MAC SDU or MAC subPDU and decide whether to apply the data protection release procedure. For example, if data protection procedure is applied to MAC SDU or MAC subPDU including specific data (e.g., RLC control PDU or PDCP control PDU or MAC CE) when transmitting data (MAC PDU), the MAC layer may indicate whether a data protection procedure has been applied by setting an indicator in the MAC subheader of the specific data, and if data protection procedures are not applied to some data, the MAC layer may indicate that the data protection procedure is not applied by setting (or un-setting) an indicator in the MAC subheader. In addition, for example, when the MAC layer processes the received data (MAC PDU) and applies the data protection release procedure, the MAC layer checks the MAC subheader of each MAC subPDU, when the indicator indicates that the data protection procedure is applied, the MAC layer applies the data protection release procedure to the MAC SDU or MAC subPDU corresponding to the MAC subheader, and if the indicator indicates that the data protection procedure is not applied, the MAC layer may not apply the data protection release procedure to the MAC SDU or MAC subPDU corresponding to the MAC subheader.

In the following of the disclosure, a third data protection method is proposed.

The third data protection method proposes to establish a separate bearer to perform a data protection procedure or a data protection release procedure on the data (for example, PDCP control data (PDCP control PDU), RLC control data (RLC control PDU), MAC control information (MAC CE (Control Element)), RLC header, or MAC subheader) exposed to the security threat. That is, it is proposed to perform a data protection procedure or a data protection release procedure on the data exposed to the security threat in the PDCP layer of the separate bearer as suggested in FIGS. 1GA to 1GC. For example, if the MAC layer needs to perform a data protection procedure (ciphering or integrity protection) or data protection release procedure (deciphering or integrity verification) for the MAC CE (or MAC subPDU or MAC SDU including MAC CE), the MAC CE (or MAC subPDU or MAC SDU including MAC CE) may be transmit to the PDCP layer of the separate bearer to perform the data protection procedure or data protection release procedure. In addition, the PDCP layer may deliver the MAC CE (or MAC subPDU or MAC SDU including MAC CE) to which the data protection procedure or data protection release procedure is applied again to the MAC layer. The procedure described for the MAC CE in the above example may be applied to other data (for example, PDCP control data (PDCP control PDU), RLC control data (RLC control PDU), MAC control information (MAC CE (Control Element)), RLC header, or MAC subheader) as well.

In the following of the disclosure, a fourth data protection method is proposed.

The fourth data protection method uses the data protection method 1-1, the data protection method 1-2, the data protection method 1-3, the data protection method 2-1, the data protection method 2-2, the data protection method 2-3, or the data protection method 3 proposed in the disclosure to perform a data protection procedure or a data protection release procedure on the data (for example, PDCP control data (PDCP control PDU) or RLC control data (RLC control PDU) or MAC control information (MAC CE (Control Element)) or RLC header or MAC subheader) exposed to the security threat, but may be applied only to a specific bearer (e.g., SRB or DRB) or a specific logical channel identifier. For example, the data protection method proposed in the disclosure may be applied only to a specific bearer (e.g., a bearer corresponding to a bearer identifier that requires enhanced security) configured with RRC or a specific logical channel identifier (e.g., logical channel identifiers that require increased security).

For example, as the data protection method 4-1, the data protection method may be applied only in the RRC connected mode in which the UE establishes an RRC connection. That is, the data protection method proposed in the disclosure may not be applied to data corresponding to the common control channel (CCCH) logical channel identifier (e.g., uplink), data transmitted before RRC connection or on RRC connection failure (RRCSetupRequest or RRCReestablishmentRequest or RRCReject), data used in a random access procedure, or data corresponding to message 3 (MSG3), and the data protection method proposed in the disclosure may be applied to other data. Because the data corresponding to the common control channel (CCCH) logical channel identifier (e.g., uplink), data transmitted before RRC connection or on RRC connection failure (RRCSetupRequest or RRCReestablishmentRequest or RRCReject), data used in a random access procedure, or data corresponding to message 3 are in a state where security configuration information is not shared between the transmitter and the receiver, unnecessary data protection procedures may cause data processing load, and errors may occur if data protection cannot be released at the receiver.

For example, as the data protection method 4-2, the data protection methods proposed in the disclosure may be applied to data transmitted or delivered in an integrated access and backhaul (IAB) wireless node. For example, the data protection methods proposed in the disclosure may be applied to data (e.g., MAC SDU or MAC CE) corresponding to an extended logical channel identifier (eLCID). The extended logical channel identifier may be configured as a logical channel identifier set in a radio base station node (IAB node or IAB MT (Mobile Terminal), IAB DU (distributed Node), IAB CU (Central Unit), or IAB donor configured as a radio network, such as BH-LogicalChannelIdentity-Ext in the RRC message described with reference to FIG. 1E. In addition, for example, the data protection methods proposed in the disclosure may be applied to a case that if the logical channel identifier value is 34, one byte is added to the MAC subheader and the extended logical channel identifier is used, or, a case that if the logical channel identifier value is 33, 2 bytes are added to the MAC subheader and the extended logical channel identifier is used. The extended logical channel identifier (eLCID) may indicate data for a MAC SDU or MAC CE corresponding to a downlink shared channel (DL-SCH) or an uplink shared channel (UL-SCH), and the length of the extended logical channel identifier may be 8 bits or 16 bits. The data protection method 4-2 above may enhance security in a wireless connection between wireless nodes that route data using a backhaul adaptation protocol (BAP) in a wireless network composed of wireless nodes.

For example, as the data protection method 4-3, before the UE establishes the RRC connection, the data protection method may be applied in the RRC idle mode or the RRC deactivation mode. That is, the data protection method proposed in the disclosure may be applied to data corresponding to the common control channel (CCCH) logical channel identifier (e.g., uplink), data (e.g., RRC message or RRCSetupRequest or paging message) transmitted before RRC connection, data used in a random access procedure, data corresponding to message 3, or broadcast system information. However, because the transmitter and the receiver do not share security configuration information with each other before the RRC connection is established in the above, the data protection method proposed in the disclosure may be applied by sharing and setting security configuration information based on information broadcast through system information or time information for synchronization between the transmitter and the receiver. For example, it is possible to apply the data protection method proposed in the disclosure based on system information or a security key (e.g., public key or private key) recorded (or shared) inside the UE (or base station) using an asymmetric key. As another method, the security of L1 signaling may be strengthened by applying the data protection methods proposed in the disclosure to the DCI of the PDCCH. For example, the data protection methods proposed in the disclosure may be applied to a downlink control information (DCI) format, and the first field value proposed by the disclosure may be applied as a cyclic redundancy check (CRC) value.

FIG. 1S illustrates a diagram of input values required for a security algorithm when a data protection method is applied according to an embodiment of the disclosure.

As in FIG. 1S, the data protection method may include a ciphering/deciphering procedure 1S-05 or an integrity protection/integrity verification procedure 1S-10, and when applying each security algorithm (e.g., ciphering algorithm, deciphering algorithm, integrity protection algorithm, or integrity verification algorithm), a bearer identifier value, a UE identifier value, a beam-related set value (e.g., synchronization signal block (SSB) related indicator, identifier, or information), a logical channel identifier value, a length value, a direction value (uplink or downlink), a count value (e.g., a system frame number (SFN) that is calculated when synchronizing with a value that is incremented by 1 or a time count value after applying to the data as a numbering value, or a time value indicating a time slot, subframe or time symbol), a security key value, or a value for security algorithm update may be used as an input value. In the above, the input value information may be reconfigured or updated by an RRC message (e.g., an RRCReconfiguration message) in FIG. 1E. As another method, the input value information may be updated periodically (e.g., a timer value is set and updated for each timer expiration) or for each data. In addition, when the data protection methods proposed in the disclosure are applied, if the base station instructs the UE to handover, the input value information or some of the input value information may be reconfigured or updated. For example, when handover is performed in a wireless backhaul network (a network having a base station or radio node that implements integrated access and backhaul (IAB)), for example, when performing inter-CU handover, because the PDCP layer is changed, the security configuration information needs to be updated to the UE, and as described above, the security configuration information or input values may be reconfigured or updated by the RRC message (e.g., RRCReconfiguration message) in FIG. 1E. In addition, when performing inter-DU handover or intra-CU handover, because the PDCP layer does not change, but the RLC layer or the MAC layer may change, if the data protection procedure in the MAC layer proposed in the disclosure is configured and applied, because it is necessary to update security configuration information or input values for security enhancement, the security configuration information or input values may be reconfigured or updated by the RRC message (e.g., RRCReconfiguration message) in FIG. 1E as described above, and the CU base station may transmit an F1 interface, an RRC message or an F1 interface application protocol (FLAP) message to the DU base station to update or reconfigure security configuration information or an input value for a data protection procedure in the MAC layer. When implemented as a base station having a CU-DU split structure in the wireless backhaul network in the above, the central unit (CU) may drive and manage the PDCP layer and the application layers above the PDCP layer, the distributed unit (DU) may drive and manage the RLC layer, MAC layer or PHY layer, and the intermediate wireless nodes may drive and manage a backhaul adaptation protocol (BAP) layer (a protocol that maps or processes data so that intermediate wireless nodes can route data), an RLC layer, a MAC layer or a PHY layer. In addition, when applying the data protection methods proposed by the disclosure in the wireless backhaul network as described above, the security key may be set as a security key determined (or set) by the CU or a security key determined (or set) by the DU.

The data protection methods proposed in the disclosure may be configured (or reconfigured) to be activated, deactivated, stopped or released when the MAC layer is established, initialized, or reset, and as illustrated in FIG. 1E, stopping, deactivation, activation, or release of the data protection methods may be configured (or instructed) with an RRC message. In another method, stopping, deactivating, or activating or releasing the data protection methods may define new control data (e.g., RLC control PDU, PDCP control PDU, or MAC CE) and transmit the data including an indicator so that stopping, deactivating, or activating or releasing the data protection methods may be dynamically configured (or instructed).

When the data protection methods proposed in the disclosure are applied in the MAC layer, if the MAC layer performs a logical channel prioritization (LCP) procedure, the LCP procedure may be performed on uplink transmission resources except for the size of the first field (DS field or MAC-I field) proposed in the disclosure. In the above, the LCP procedure is a procedure for distributing uplink transmission resources for data corresponding to different logical channel identifiers. In addition, when performing the LCP procedure in the above, if the data protection methods proposed above are configured in the MAC layer, the UE may be characterized in that the highest priority is given to the first field. That is, the first field may be always included or included in the transmitted data. For example, the priority of each data may be considered as follows from the highest priority.

- C-RNTI MAC CE or data from UL-CCCH;
- Configured Grant Confirmation MAC CE or BFR MAC CE or Multiple Entry Configured Grant
- Sidelink Configured Grant Confirmation MAC CE;
- LBT failure MAC CE;
- MAC CE for SL-BSR prioritized according to clause 5.22.1.6;
- MAC CE for BSR, with exception of BSR included for padding;
- Single Entry PHR MAC CE or Multiple Entry PHR MAC CE;
- MAC CE for the number of Desired Guard Symbols;
- MAC CE for Pre-emptive BSR;
- MAC CE for SL-BSR, with exception of SL-BSR prioritized according to clause 5.22.1.6 and SL-BSR
- data from any Logical Channel, except data from UL-CCCH;
- MAC CE for Recommended bit rate query;
- MAC CE for BSR included for padding;
- MAC CE for SL-BSR included for padding.

At this time, it is proposed to perform the LCP procedure by considering the priority of the first field proposed in the disclosure as the highest priority, considering as a higher priority than MAC control information, or considering as a higher priority than data corresponding to any logical channel except for data corresponding to the UL-CCCH. Therefore, according to the LCP procedure proposed above, when the data protection methods proposed above are configured in the MAC layer, the UE may give a high priority to the first field so that the transmitted data must include the first field.

In the disclosure, when the data protection methods are not configured in the MAC layer, the UE may not allow the MAC layer to transmit only the padding or padding buffer status report when there is data to be transmitted when the given uplink transmission resource is equal to or greater than a certain size (e.g., 8 bytes). That is, the MAC layer may transmit only a padding or padding buffer status report when the size is smaller than the predetermined size. For example, as an embodiment, if MAC security protection is not configured and/or if the MAC entity is given a UL grant size that is equal to or larger than 8 bytes while having data available and allowed (according to clause 5.4.3.1) for transmission, the MAC entity shall not transmit only padding BSR and/or process uplink transmission resources according to padding.

In addition, in the disclosure, when the data protection methods are configured in the MAC layer, the UE may not allow the MAC layer to transmit only the padding or padding buffer status report when there is data to be transmitted when the given uplink transmission resource is equal to or greater than a certain size (e.g., 8 bytes or sum of the 8 bytes and the size of the first field). That is, the MAC layer may transmit only a padding or padding buffer status report when the size is smaller than the predetermined size. For example, in one embodiment, if MAC security protection is configured and/or if the MAC entity is given a UL grant size that is equal to or larger than sum of the 8 bytes and the size of DS field (MAC-I field) while having data available and allowed (according to clause 5.4.3.1) for transmission, the MAC entity shall not transmit only padding BSR and/or process uplink transmission resources according to padding.

In addition, in the disclosure, when the data protection methods are configured in the MAC layer, or use a logical channel identifier or do not use an extended logical channel identifier, the UE may not allow the MAC layer to transmit only the padding or padding buffer status report when there is data to be transmitted when the given uplink transmission resource is equal to or greater than a certain size (e.g., 8 bytes or sum of the 8 bytes and the size of the first field). That is, the MAC layer may transmit only a padding or padding buffer status report when the size is smaller than the predetermined size. For example, in one embodiment, if MAC security protection is configured and/or if the MAC entity is given a UL grant size that is equal to or larger than sum of the 8 bytes and the size of DS field (MAC-I field) while having data available and allowed (according to clause 5.4.3.1) for transmission, the MAC entity shall not transmit only padding BSR and/or process uplink transmission resources according to padding.

In addition, in the disclosure, when the data protection methods are not configured in the MAC layer, use a logical channel identifier, or do not use an extended logical channel identifier, the UE may not allow the MAC layer to transmit only the padding or padding buffer status report when there is data to be transmitted when the given uplink transmission resource is equal to or greater than a certain size (e.g., 8 bytes). That is, the MAC layer may transmit only a padding or padding buffer status report when the size is smaller than the predetermined size. For example, in one embodiment, if MAC security protection is not configured and/or if the MAC entity using LCID is given a UL grant size that is equal to or larger than 8 bytes while having data available and allowed (according to clause 5.4.3.1) for transmission, the MAC entity shall not transmit only padding BSR and/or process uplink transmission resources according to padding.

In addition, in the disclosure, when the data protection methods are not configured in the MAC layer, do not use a logical channel identifier, or use an extended logical channel identifier, the UE may not allow the MAC layer to transmit only the padding or padding buffer status report when there is data to be transmitted when the given uplink transmission resource is equal to or greater than a certain size (e.g., 8 bytes or sum (12 bytes) of 8 bytes and the size of the MAC subheader (e.g., 4 bytes) when the extended logical channel identifier is used). That is, the MAC layer may transmit only a padding or padding buffer status report when the size is smaller than the predetermined size. For example, in one embodiment, if MAC security protection is not configured and/or if the MAC entity using eLCID is given a UL grant size that is equal to or larger than 12 byte (8 byte+4 byte (the size of the MAC subheader using eLCID)) while having data available and allowed (according to clause 5.4.3.1) for transmission, the MAC entity shall not transmit only padding BSR and/or process uplink transmission resources according to padding.

In addition, in the disclosure, when the data protection methods are configured in the MAC layer, do not use a logical channel identifier, or use an extended logical channel identifier, the UE may not allow the MAC layer to transmit only the padding or padding buffer status report when there is data to be transmitted when the given uplink transmission resource is equal to or greater than a certain size (e.g., 8 bytes or sum of 8 bytes, the size of the first field, and the size of the MAC subheader (e.g., 4 bytes) when the extended logical channel identifier is used). That is, the MAC layer may transmit only a padding or padding buffer status report when the size is smaller than the predetermined size. For example, in one embodiment, if MAC security protection is configured and/or if the MAC entity using eLCID is given a UL grant size that is equal to or larger than X byte (8 byte+4 byte (the size of the MAC subheader using eLCID)+ the size of DS field (MAC-I field)) while having data available and allowed (according to clause 5.4.3.1) for transmission, the MAC entity shall not transmit only padding BSR and/or process uplink transmission resources according to padding.

In the disclosure, the size of the first field may be defined as 1 byte, 2 bytes, 3 bytes, 4 bytes, 5 bytes, 6 bytes, or 8 bytes.

In the disclosure, when the UE or the base station configures and uses the data protection procedure proposed in the disclosure in order to reduce the data processing load (for example, to avoid duplicating data protection procedures in the PDCP layer and the MAC layer to the same data), the data protection procedure of the PDCP layer may not be used. For example, only when ciphering or integrity protection procedures are not configured in the PDCP layer, the data protection procedure (ciphering or integrity protection procedure) proposed in the disclosure may be configured and used in the MAC layer. Alternatively, for example, only when the data protection procedure (ciphering or integrity protection procedure) proposed in the disclosure is not configured in the MAC layer, the ciphering or integrity protection procedure may be configured and used in the PDCP layer.

As another method, when the data protection procedure or data protection release procedure is applied only to a specific MAC SDU or a specific MAC subPDU as illustrated in the data protection method 1-2, 2-2, 1-3, or 2-3 proposed in the disclosure, the ciphering procedure or integrity protection procedure of the PDCP layer may be configured and used together with the data protection procedure of the MAC layer. This is because, in the above case, the PDCP layer and the MAC layer do not repeatedly perform data protection procedures on the same data.

FIG. 1T illustrates a diagram of an operation of a transmitter or a receiver according to an embodiment of the disclosure.

Referring to FIG. 1T, the transmitter (e.g., a UE or a base station) 1T-10 may configure the security configuration procedure based on the RRC message, system information, the security configuration information, or input value recorded inside the transmitter 1T-11, apply the data protection release method proposed in the disclosure 1T-12, and transmit the data to a lower layer 1T-13.

The receiver (e.g., a UE or a base station) 1T-20 may configure the security configuration procedure based on the RRC message, system information, the security configuration information, or input value recorded inside the transmitter 1T-21, apply the data protection release method proposed in the disclosure 1T-22, and transmit the data to an upper layer 1T-23.

FIG. 1U illustrates a structure of a UE according to an embodiment of the disclosure.

Referring to FIG. 1U, the UE includes a radio frequency (RF) processor 1U-10, a baseband processor 1U-20, a storage 1U-30, and a controller 1U-40.

The RF processor 1U-10 performs a function for transmitting and receiving a signal through a wireless channel, such as band conversion and amplification of the signal. That is, the RF processor 1U-10 up-converts the baseband signal provided from the baseband processor 1U-20 into an RF band signal, transmits it through an antenna, and down-converts the RF band signal received through the antenna into a baseband signal. For example, the RF processor 1U-10 may include a transmit filter, a receive filter, an amplifier, a mixer, an oscillator, a digital to analog converter (DAC), an analog to digital converter (ADC), etc. Although only one antenna is illustrated in FIG. 1U, the UE may include a plurality of antennas. In addition, the RF processor 1U-10 may include a plurality of RF chains. Furthermore, the RF processing unit 1U-10 may perform beamforming. For the beamforming, the RF processor 1U-10 may adjust the phase and magnitude of each of signals transmitted and received through a plurality of antennas or antenna elements. In addition, the RF processor 1U-10 may perform MIMO, and may receive multiple layers when performing MIMO operation. The RF processor 1U-10 may perform reception beam sweeping by appropriately setting a plurality of antennas or antenna elements under the control of the control unit 1U-40, or adjust the direction and the beam width of the reception beam so that the reception beam is coordinated with the transmission beam.

The baseband processor 1U-20 performs a function of converting between a baseband signal and a bit stream according to a physical layer standard of the system. For example, when transmitting data, the baseband processor 1U-20 generates complex symbols by encoding and modulating a transmitted bit stream. In addition, when receiving data, the baseband processor 1U-20 restores a received bit stream by demodulating and decoding the baseband signal provided from the RF processor 1U-10. For example, according to the orthogonal frequency division multiplexing (OFDM) scheme, when transmitting data, the baseband processor 1U-20 generates complex symbols by encoding and modulating a transmitted bit stream, maps the complex symbols to subcarriers, and configures OFDM symbols through an inverse fast Fourier transform (IFFT) operation and a cyclic prefix (CP) insertion. In addition, when receiving data, the baseband processor 1U-20 divides the baseband signal provided from the RF processor 1U-10 into OFDM symbol units, restores signals mapped to subcarriers through a fast Fourier transform (FFT) operation, and then restores a received bit stream through demodulation and decoding.

The baseband processor 1U-20 and the RF processor 1U-10 transmit and receive signals as described above. Accordingly, the baseband processor 1U-20 and the RF processor 1U-10 may be referred to as a transmitter, a receiver, a transceiver, or a communication unit. Furthermore, at least one of the baseband processor 1U-20 and the RF processor 1U-10 may include a plurality of communication modules to support a plurality of different radio access technologies. In addition, at least one of the baseband processor 1U-20 and the RF processor 1U-10 may include different communication modules to process signals of different frequency bands. For example, the different radio access technologies may include an LTE network, an NR network, and the like. In addition, the different frequency bands may include a super high frequency (SHF) (e.g., 2.5 GHz and 5 GHz) band and a millimeter wave (e.g., 60 GHz) band.

The storage 1U-30 stores data such as a basic program, an application program, and configuration information for the operation of the UE. The storage 1U-30 provides stored data according to the request of the controller 1U-40.

The controller 1U-40 controls overall operations of the UE. For example, the controller 1U-40 transmits and receives signals through the baseband processor 1U-20 and the RF processor 1U-10. In addition, the controller 1U-40 writes and reads data in the storage 1U-30. To this end, the controller 1U-40 may include at least one processor. For example, the controller 1U-40 may include a communication processor (CP) that controls for communication and an application processor (AP) that controls an upper layer such as an application program.

FIG. 1V illustrates a block configuration of a base station in a wireless communication system according to an embodiment of the disclosure.

As illustrated in FIG. 1V, the base station is configured to include an RF processor 1V-10, a baseband processor 1V-20, a backhaul communication unit 1V-30, a storage 1V-40, and a controller 1V-50.

The RF processor 1V-10 performs a function for transmitting and receiving a signal through a wireless channel, such as band conversion and amplification of the signal. That is, the RF processor 1V-10 up-converts the baseband signal provided from the baseband processor 1V-20 into an RF band signal, transmits it through an antenna, and down-converts the RF band signal received through the antenna into a baseband signal. For example, the RF processor 1V-10 may include a transmit filter, a receive filter, an amplifier, a mixer, an oscillator, a DAC, an ADC, etc. Although only one antenna is illustrated in FIG. 1V, the base station may include a plurality of antennas. In addition, the RF processor 1V-10 may include a plurality of RF chains. Furthermore, the RF processing unit 1V-10 may perform beamforming. For the beamforming, the RF processor 1V-10 may adjust the phase and magnitude of each of signals transmitted and received through a plurality of antennas or antenna elements. The RF processor 1V-10 may perform a downlink MIMO operation by transmitting one or more layers.

The baseband processor 1V-20 performs a function of converting between a baseband signal and a bit stream according to a physical layer standard of the first wireless access technology. For example, when transmitting data, the baseband processor 1V-20 generates complex symbols by encoding and modulating a transmitted bit stream. In addition, when receiving data, the baseband processor 1V-20 restores a received bit stream by demodulating and decoding the baseband signal provided from the RF processor 1V-10. For example, according to the OFDM scheme, when transmitting data, the baseband processor 1V-20 generates complex symbols by encoding and modulating a transmitted bit stream, maps the complex symbols to subcarriers, and configures OFDM symbols through an IFFT operation and a CP insertion. In addition, when receiving data, the baseband processor 1V-20 divides the baseband signal provided from the RF processor 1V-10 into OFDM symbol units, restores signals mapped to subcarriers through a FFT operation, and then restores a received bit stream through demodulation and decoding. The baseband processor 1V-20 and the RF processor 1V-10 transmit and receive signals as described above. Accordingly, the baseband processor 1V-20 and the RF processor 1V-10 may be referred to as a transmitter, a receiver, a transceiver, a communication unit, or a wireless communication unit.

The backhaul communication unit 1V-30 provides an interface for communicating with other nodes in the network.

The storage 1V-40 stores data such as a basic program, an application program, and configuration information for the operation of the base station. In particular, the storage 1V-40 may store information on a bearer allocated to an accessed UE, a measurement result reported from the accessed UE, and the like. In addition, the storage 1V-40 may store information serving as a criterion for determining whether to provide or stop multiple connections to the UE. In addition, the storage 1V-40 provides stored data according to the request of the controller 1V-50.

The controller 1V-50 controls overall operations of the base station. For example, the controller 1V-50 transmits and receives signals through the baseband processor 1V-20 and the RF processor 1V-10, or through the backhaul communication unit 1V-30. In addition, the controller 1V-50 writes and reads data in the storage 1V-40. To this end, the controller 1V-50 may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a transmitting apparatus in a wireless communication system, the method comprising:
generating at least one medium access control (MAC) sub protocol data unit (subPDU);
generating a first field, by applying an integrity protection procedure configured in a MAC layer of the transmitting apparatus, to the at least one MAC subPDU;
generating a MAC PDU including the at least one MAC subPDU and the first field; and
transmitting, to a receiving apparatus, the MAC PDU,
wherein the MAC PDU further includes an indicator indicating that the at least one MAC subPDU is integrity protected.

2. The method of claim 1, wherein transmitting the MAC PDU comprises:
ciphering the MAC PDU including the at least one MAC subPDU and the first field; and
transmitting, to the receiving apparatus, the ciphered MAC PDU.

3. The method of claim 1, wherein the at least one MAC subPDU comprises at least one of a packet data convergence protocol (PDCP) control PDU, a radio link control (RLC) control PDU, a MAC control element (CE), a PDCP header, an RLC header, a MAC sub-header, a radio resource control (RRC) message, or system information.

4. The method of claim 1, wherein the first field is placed after the at least one MAC subPDU or before the at least one MAC subPDU.

5. A method performed by a receiving apparatus in a wireless communication system, the method comprising:
receiving, from a transmitting apparatus, a medium access control (MAC) protocol data unit (PDU) including at least one MAC subPDU and a first field;
identifying the first field; and
verifying, by a MAC layer of the receiving apparatus, an integrity protection of the at least one MAC subPDU based on the first field,
wherein the MAC PDU further includes an indicator indicating that the at least one MAC subPDU is integrity protected.

6. The method of claim 5, further comprising:
deciphering the MAC PDU in case that the MAC PDU including at least one MAC subPDU and the first field is ciphered.

7. The method of claim 5, wherein the at least one MAC subPDU comprises at least one of a packet data convergence protocol (PDCP) control PDU, a radio link control (RLC) control PDU, a MAC control element (CE), a PDCP header, an RLC header, a MAC sub-header, a radio resource control (RRC) message, or system information.

8. The method of claim 5, wherein the first field is placed after the at least one MAC subPDU or before the at least one MAC subPDU.

9. A transmitting apparatus in a wireless communication system, the transmitting apparatus comprising:
a transceiver; and
a controller coupled with the transceiver and configured to:
generate at least one medium access control (MAC) sub protocol data unit (subPDU),
generate a first field, by applying an integrity protection procedure configured in a MAC layer of the transmitting apparatus, to the at least one MAC subPDU,
generate a MAC PDU including the at least one MAC subPDU and the first field, and
transmit, to a receiving apparatus, the MAC PDU,
wherein the MAC PDU further includes an indicator indicating that the at least one MAC subPDU is integrity protected.

10. The transmitting apparatus of claim 9, wherein the controller is further configured to:
cipher the MAC PDU including the at least one MAC subPDU and the first field, and
transmit, to the receiving apparatus, the ciphered MAC PDU.

11. The transmitting apparatus of claim 9, wherein the at least one MAC subPDU comprises at least one of a packet data convergence protocol (PDCP) control PDU, a radio link control (RLC) control PDU, a MAC control element (CE), a PDCP header, an RLC header, a MAC sub-header, a radio resource control (RRC) message, or system information.

12. The transmitting apparatus of claim 9, wherein the first field is placed after the at least one MAC subPDU or before the at least one MAC subPDU.

13. A receiving apparatus in a wireless communication system, the receiving apparatus comprising:
a transceiver; and
a controller coupled with the transceiver and configured to:
receive, from a transmitting apparatus, a medium access control (MAC) protocol data unit (PDU) including at least one MAC subPDU and a first field,
identify the first field, and
verifying, by a MAC layer of the receiving apparatus, an integrity protection of the at least one MAC subPDU based on the first field,
wherein the MAC PDU further includes an indicator indicating that the at least one MAC subPDU is integrity protected.

14. The receiving apparatus of claim 13, wherein the controller is further configured to:
decipher the MAC PDU in case that the MAC PDU including at least one MAC subPDU and the first field is ciphered.

15. The receiving apparatus of claim 13, wherein the at least one MAC subPDU comprises at least one of a packet data convergence protocol (PDCP) control PDU, a radio link control (RLC) control PDU, a MAC control element (CE), a PDCP header, an RLC header, a MAC sub-header, a radio resource control (RRC) message, or system information.

16. The receiving apparatus of claim 13, wherein the first field is placed after the at least one MAC subPDU or before the at least one MAC subPDU.

* * * * *